Dec. 31, 1957 R. T. BLAKELY 2,818,322

SORTER FOR TAPE RECORDED DATA

Filed May 26, 1953

42 Sheets-Sheet 1

INVENTOR
ROBERT T. BLAKELY

BY

ATTORNEY

Dec. 31, 1957 R. T. BLAKELY 2,818,322

SORTER FOR TAPE RECORDED DATA

Filed May 26, 1953 42 Sheets-Sheet 2

INVENTOR
ROBERT T. BLAKELY
BY
ATTORNEY

Dec. 31, 1957 R. T. BLAKELY 2,818,322

SORTER FOR TAPE RECORDED DATA

Filed May 26, 1953 42 Sheets-Sheet 3

UNITS SORT

WEIGHTS

1 Wt SORT

REWIND T1

REWIND AND ERASE T1 REWIND T2

WEIGHTS

2 Wt. SORT

REWIND T2

INVENTOR
ROBERT T. BLAKELY
BY [signature]
ATTORNEY

UNITS SORT

REWIND AND ERASE T2 REWIND T1

FIG. 5

| WEIGHTS | | | | | | | | | |
|---|---|---|---|---|---|---|---|---|---|
| 1 | 0 0 | 1 0 | 1 0 | 1 1 | 1 1 | 1 0 | 1 1 | 0 1 | 1 1 |
| 2 | 2 0 | 2 0 | 2 0 | 0 0 | 0 0 | 2 2 | 0 2 | 2 2 | 2 2 |
| 4 | 4 0 | 4 4 | 4 4 | 4 4 | 0 0 | 4 4 | 0 0 | 0 0 | 0 4 |
| 8 | 0 8 | 0 8 | 0 0 | 0 0 | 8 8 | 0 0 | 8 0 | 8 8 | 8 0 |
| T1 | 35 | 49 | 41 | 22 | 66 | 43 | 60 | 78 | 84 |
| T2 | 35 | 66 | 60 | 78 | | | | | |

4 Wt. SORT

REWIND T1

FIG. 5a

| | | | | | | | | | |
|---|---|---|---|---|---|---|---|---|---|
| T1 | 35 | 49 | 41 | 22 | 66 | 43 | 60 | 78 | 84 |
| T2 | 35 | 66 | 60 | 78 | 49 | 41 | 22 | 43 | 84 |

REWIND AND ERASE T1 REWIND T2

FIG. 6

| WEIGHTS | | | | | | | | | |
|---|---|---|---|---|---|---|---|---|---|
| 1 | 0 0 | 1 1 | 1 1 | 0 1 | 1 0 | 1 0 | 1 1 | 1 0 | 1 1 |
| 2 | 2 0 | 0 0 | 0 2 | 2 2 | 2 0 | 2 0 | 0 0 | 2 2 | 2 2 |
| 4 | 4 0 | 0 0 | 0 0 | 0 0 | 4 4 | 4 4 | 4 4 | 4 4 | 0 4 |
| 8 | 0 8 | 8 8 | 8 0 | 8 8 | 0 8 | 0 0 | 0 0 | 0 0 | 8 0 |
| T2 | 35 | 66 | 60 | 78 | 49 | 41 | 22 | 43 | 84 |
| T1 | 60 | 41 | 22 | 43 | 84 | | | | |

8 Wt SORT

REWIND T2

FIG. 6a

| | | | | | | | | | |
|---|---|---|---|---|---|---|---|---|---|
| T2 | 35 | 66 | 60 | 78 | 49 | 41 | 22 | 43 | 84 |
| T1 | 60 | 41 | 22 | 43 | 84 | 35 | 66 | 78 | 49 |

INVENTOR
ROBERT T. BLAKELY
BY [signature]
ATTORNEY

TENS-SORT

1 Wt. SORT

REWIND T1

REWIND AND ERASE T1 REWIND T2

2 Wt. SORT

REWIND T2

INVENTOR
ROBERT T. BLAKELY
BY [signature]
ATTORNEY

TENS SORT

REWIND AND ERASE T2 REWIND T1

FIG. 9

| | | | | | | | | | |
|---|---|---|---|---|---|---|---|---|---|
| WEIGHTS | 1 1 | 1 1 | 1 1 | 0 0 | 0 1 | 1 0 | 1 0 | 1 1 | 1 0 |
| | 0 2 | 0 0 | 0 0 | 2 0 | 2 2 | 2 0 | 2 2 | 2 2 | 2 0 |
| | 0 0 | 4 4 | 0 0 | 4 0 | 0 0 | 4 4 | 4 4 | 0 4 | 4 4 |
| | 8 0 | 0 0 | 8 8 | 0 8 | 8 8 | 0 0 | 0 0 | 8 0 | 0 8 |
| T1 | 60 | 22 | 66 | 35 | 78 | 41 | 43 | 84 | 49 |
| T2 | 60 | 66 | 78 | 84 | | | | | |

4 Wt SORT

REWIND T1

FIG. 9a

| | | | | | | | | | |
|---|---|---|---|---|---|---|---|---|---|
| T1 | 60 | 22 | 66 | 35 | 78 | 41 | 43 | 84 | 49 |
| T2 | 60 | 66 | 78 | 84 | 22 | 35 | 41 | 43 | 49 |

REWIND AND ERASE T1 REWIND T2

FIG. 10

| | | | | | | | | | |
|---|---|---|---|---|---|---|---|---|---|
| WEIGHTS | 1 1 | 1 1 | 0 1 | 1 1 | 1 1 | 0 0 | 1 0 | 1 0 | 1 0 |
| | 0 2 | 0 0 | 2 2 | 2 2 | 0 0 | 2 0 | 2 0 | 2 2 | 2 0 |
| | 0 0 | 0 0 | 0 0 | 0 4 | 4 4 | 4 0 | 4 4 | 4 4 | 4 4 |
| | 8 0 | 8 8 | 8 8 | 8 0 | 0 0 | 0 8 | 0 0 | 0 0 | 0 8 |
| T2 | 60 | 66 | 78 | 84 | 22 | 35 | 41 | 43 | 49 |
| T1 | 22 | 35 | 41 | 43 | 49 | | | | |

8 Wt SORT

REWIND T2

FIG. 10a

| | | | | | | | | | |
|---|---|---|---|---|---|---|---|---|---|
| T2 | 60 | 66 | 78 | 84 | 22 | 35 | 41 | 43 | 49 |
| T1 | 22 | 35 | 41 | 43 | 49 | 60 | 66 | 78 | 84 |

INVENTOR
ROBERT T. BLAKELY
BY [signature]
ATTORNEY

INVENTOR
ROBERT T. BLAKELY
BY [signature]
ATTORNEY

Dec. 31, 1957

R. T. BLAKELY 2,818,322

SORTER FOR TAPE RECORDED DATA

Filed May 26, 1953

42 Sheets-Sheet 8

INVENTOR
ROBERT T. BLAKELY

BY

ATTORNEY

SORTER FOR TAPE RECORDED DATA

Filed May 26, 1953 42 Sheets-Sheet 9

INVENTOR
ROBERT T. BLAKELY
BY [signature]
ATTORNEY

Dec. 31, 1957 R. T. BLAKELY 2,818,322

SORTER FOR TAPE RECORDED DATA

Filed May 26, 1953 42 Sheets-Sheet 10

INVENTOR
ROBERT T. BLAKELY
BY [signature]
ATTORNEY

INVENTOR
ROBERT T. BLAKELY
BY P. E. Henninger
ATTORNEY

INVENTOR
ROBERT T. BLAKELY
BY [signature]
ATTORNEY

SORTER FOR TAPE RECORDED DATA

Filed May 26, 1953

INVENTOR
ROBERT T. BLAKELY
BY
ATTORNEY

INVENTOR
ROBERT T. BLAKELY
BY [signature]
ATTORNEY

INVENTOR
ROBERT T. BLAKELY
BY
ATTORNEY

INVENTOR
ROBERT T. BLAKELY
BY P. E. Henninger
ATTORNEY

INVENTOR
ROBERT T. BLAKELY
BY
ATTORNEY

INVENTOR
ROBERT T. BLAKELY
BY [signature]
ATTORNEY

INVENTOR
ROBERT T. BLAKELY
BY P. E. Henninger
ATTORNEY

INVENTOR
ROBERT T. BLAKELY
BY [signature]
ATTORNEY

SORTER FOR TAPE RECORDED DATA

Filed May 26, 1953

INVENTOR
ROBERT T. BLAKELY
BY [signature]
ATTORNEY

SORTER FOR TAPE RECORDED DATA

Filed May 26, 1953

INVENTOR
ROBERT T. BLAKELY
BY
ATTORNEY

INVENTOR
ROBERT T. BLAKELY
BY [signature]
ATTORNEY

INVENTOR
ROBERT T. BLAKELY
BY P. E. Henninger
ATTORNEY

INVENTOR
ROBERT T. BLAKELY
BY [signature]
ATTORNEY

INVENTOR
ROBERT T. BLAKELY
BY P. E. Henninger
ATTORNEY

SORTER FOR TAPE RECORDED DATA

Filed May 26, 1953

INVENTOR
ROBERT T. BLAKELY
BY
ATTORNEY

Dec. 31, 1957 R. T. BLAKELY 2,818,322

SORTER FOR TAPE RECORDED DATA

Filed May 26, 1953 42 Sheets-Sheet 28

INVENTOR.

ROBERT T. BLAKELY

BY [signature]

ATTORNEY

INVENTOR
ROBERT T. BLAKELY
BY [signature]
ATTORNEY

INVENTOR
ROBERT T. BLAKELY
BY
ATTORNEY

INVENTOR
ROBERT T. BLAKELY
BY [signature]
ATTORNEY

Dec. 31, 1957 R. T. BLAKELY 2,818,322

SORTER FOR TAPE RECORDED DATA

Filed May 26, 1953

42 Sheets-Sheet 32

INVENTOR
ROBERT T. BLAKELY
BY
ATTORNEY

Dec. 31, 1957 R. T. BLAKELY 2,818,322

SORTER FOR TAPE RECORDED DATA

Filed May 26, 1953 42 Sheets-Sheet 33

INVENTOR
ROBERT T. BLAKELY
BY [signature]
ATTORNEY

Dec. 31, 1957 R. T. BLAKELY 2,818,322

SORTER FOR TAPE RECORDED DATA

Filed May 26, 1953 42 Sheets-Sheet 34

INVENTOR
ROBERT T. BLAKELY
BY [signature]
ATTORNEY

INVENTOR.
ROBERT T. BLAKELY
BY [signature]
ATTORNEY

Dec. 31, 1957 R. T. BLAKELY 2,818,322

SORTER FOR TAPE RECORDED DATA

Filed May 26, 1953 42 Sheets-Sheet 36

INVENTOR.
ROBERT T. BLAKELY

BY [signature]

ATTORNEY

INVENTOR.
ROBERT T. BLAKELY
BY [signature]
ATTORNEY

INVENTOR.
ROBERT T. BLAKELY
BY [signature]
ATTORNEY

INVENTOR.
ROBERT T. BLAKELY
BY
ATTORNEY

INVENTOR.
ROBERT T. BLAKELY
BY [signature]
ATTORNEY

INVENTOR.
ROBERT T. BLAKELY
BY [signature]
ATTORNEY

*INVENTOR.*
ROBERT T. BLAKELY
*BY*
ATTORNEY

United States Patent Office 2,818,322

Patented Dec. 31, 1957

2,818,322

SORTER FOR TAPE RECORDED DATA

Robert T. Blakely, Lagrange, N. Y., assignor to International Business Machines Corporation, New York, N. Y., a corporation of New York Application May 26, 1953, Serial No. 357,607

15 Claims. (Cl. 346—44)

This invention relates to the sorting and rearrangement of data recorded in random sequence on continuous record media.

In particular, the invention relates to a sorting procedure and to apparatus by means of which both numerical and alphabetical information that has been magnetically recorded in random order on a record tape, drum or disc may be automatically rearranged and magnetically recorded in selected sequence on a receiving tape, drum or disc. The invention will be described in connection with the sorting of data magnetically recorded on tapes.

The invention contemplates a sorting procedure and apparatus wherein only two record tapes are required for the complete sorting operation and in which the sorting controls are effective to recognize in proper sequence and transfer from one tape to the other, the data being processed in such manner that a plurality of sorting passes are performed to effect a complete sort of either numerical or alphabetical data without manual assistance or intervention in the sorting cycle.

It has been proposed heretofore to automatically assemble related items of information recorded in random sequence on a magnetic tape by a process analogous to the sorting of punched record cards in which related components of data are sorted into a corresponding number of receiving tapes (for example ten receiving tapes in the case of numerical data) and then by a series of resorting operations finally assemble the data in desired sequence on a single receiving tape. A sorter which required ten receiving tapes for numerical data and twenty-six receiving tapes for alphabetical data is apt to require such extensive tape driving mechanism and attendant complicated control circuitry as to render it prohibitive for general use.

It is a principal object of this invention, therefore, to provide a sorting procedure and mechanism in which a small number of tapes are employed, and in which the tape driving mechanism and the sorting and control circuits are so simple as to adapt the procedure and mechanism to general use.

The principal object of the invention is attained by representing each character in a distinctive code, each code comprising a number of units or bits recognizable by the sorting circuits on successive sorting passes. Thus, it is rendered possible to perform a complete sorting operation by successively re-sorting on code bits in a plurality of sorting passes in which only two tapes are employed in lieu of the great number of receiving tapes otherwise required.

As a concomitant feature of the invention, it is contemplated to perform the sorting operation at high speed. To this end, the procedure contemplates certain improved features including the use of electronic sorting control circuits.

It is a further object of the invention to provide a sorting mechanism of the kind and for the purpose indicated wherein data is read from one tape and transcribed to another tape at the maximum speed permitted by the recognition and transfer control circuits, and thereafter to rewind either or both tapes at a higher speed.

It is a further object of the invention to provide a sorting procedure in which the tape of source data may be preserved or, optionally, in which the record of such source data tape may be erased to condition the tape for further use in the sorting operation, all under automatic control at the discretion of the operator.

It is a further object of the invention to provide means whereby the sorting operation may be controlled at the option of the operator to sort the record data into either ascending or descending order.

It is still a further object of the invention to provide a data sorting process and mechanism applicable to the sorting of tape recorded intelligence having selective means for determining the character in any field of characters on which the sorting operation is initiated.

It is a still further object of the invention to provide a data sorting procedure and mechanism therefor adapted to the sorting of tape recorded data having selective means for determining the length of the character field on which the sorting operation is to be performed.

It is a still further purpose of the invention to provide a sorting mechanism and procedure adapted to the sorting of data magnetically recorded on a tape in random sequence which may be selectively conditioned to sort either numerical or alphabetical characters.

It is a further object of the invention to provide a sorting procedure and mechanism therefor wherein a plurality of data fields may be sorted in any preselected sequence.

Further purposes, objects and advantages of the invention will appear from the following detailed specification thereof when read in light of the drawings forming a part of this application and in which drawings:

Fig. 1 is a block diagram of the tape sorting circuits;

Fig. 2 is a code diagram showing at the left the modified binary coding of the alphabet, the numerical digits and special functional signals, and showing at the right for comparison the well known I. B. M. punch card code;

Figs. 3, 3*a*, 4, 4*a*, 5, 5*a*, 6 and 6*a* represent file and receiving tapes during the four sorting passes on the unit columns of a group of two digit numbers;

Figs. 7, 7*a*, 8, 8*a*, 9, 9*a*, 10 and 10*a* represent the file and receiving tapes during the several sorting stages on the tens column of the group of numbers represented in the file tape of Fig. 5;

Figure 29:
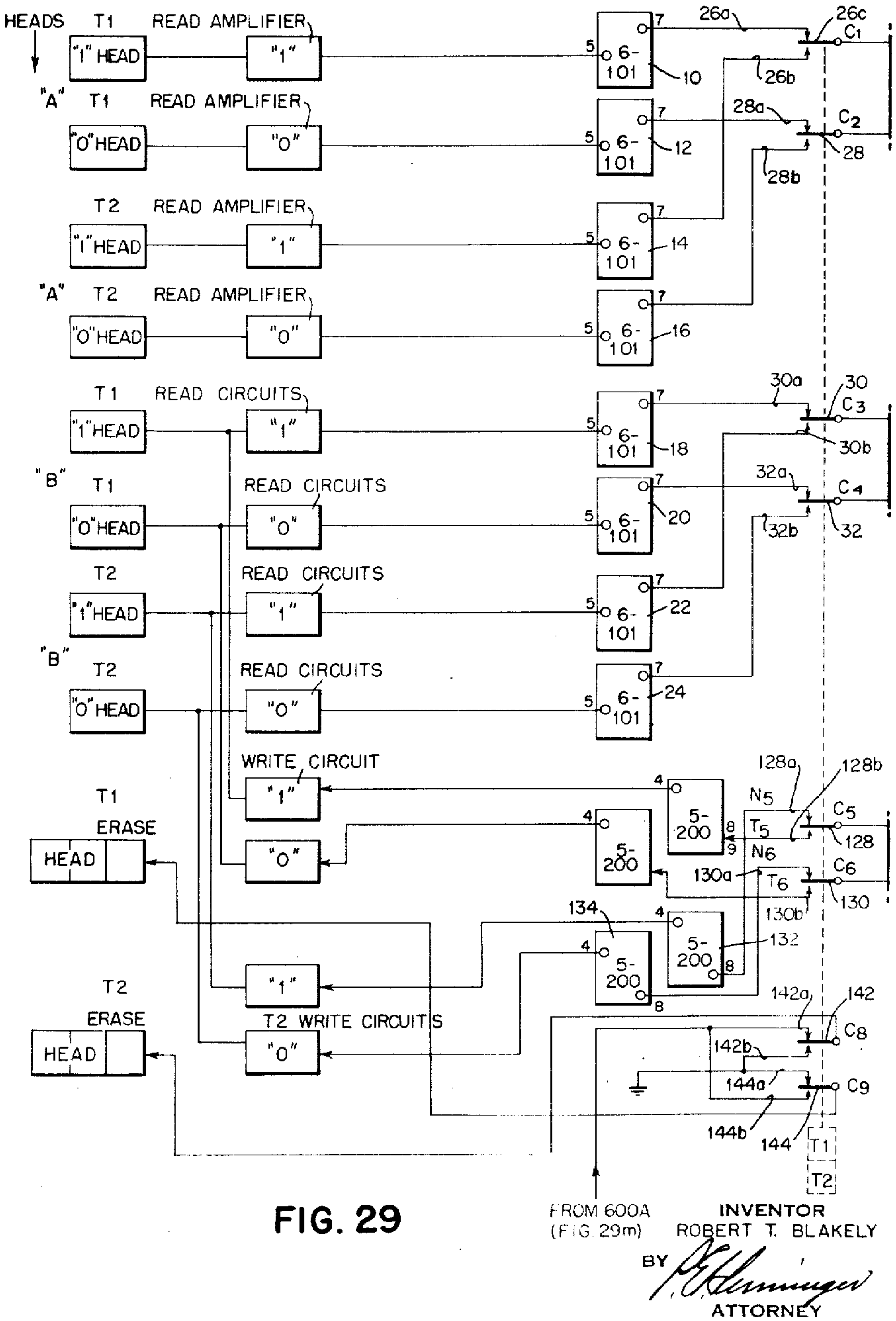
Figure 29A:
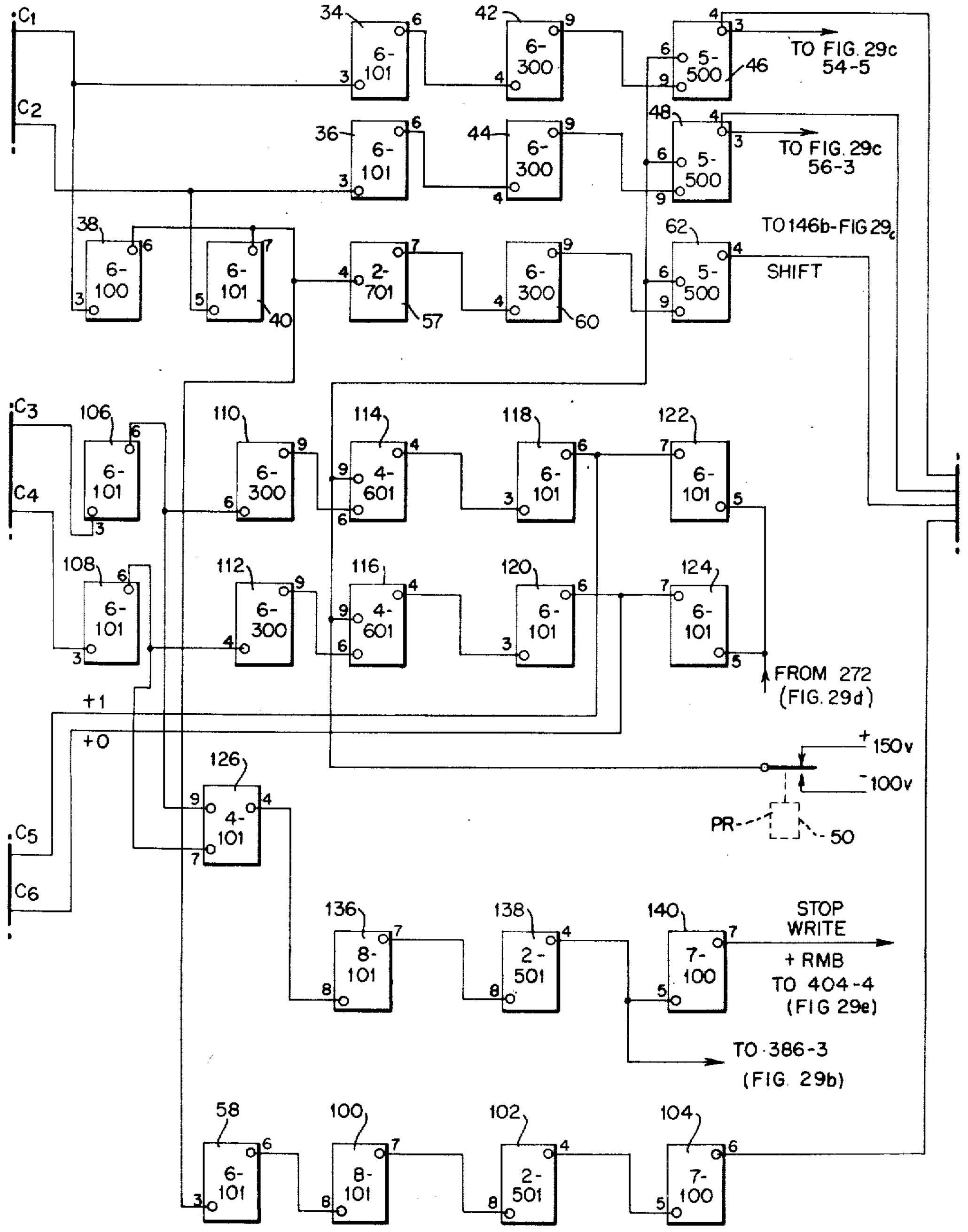
Figure 29B:
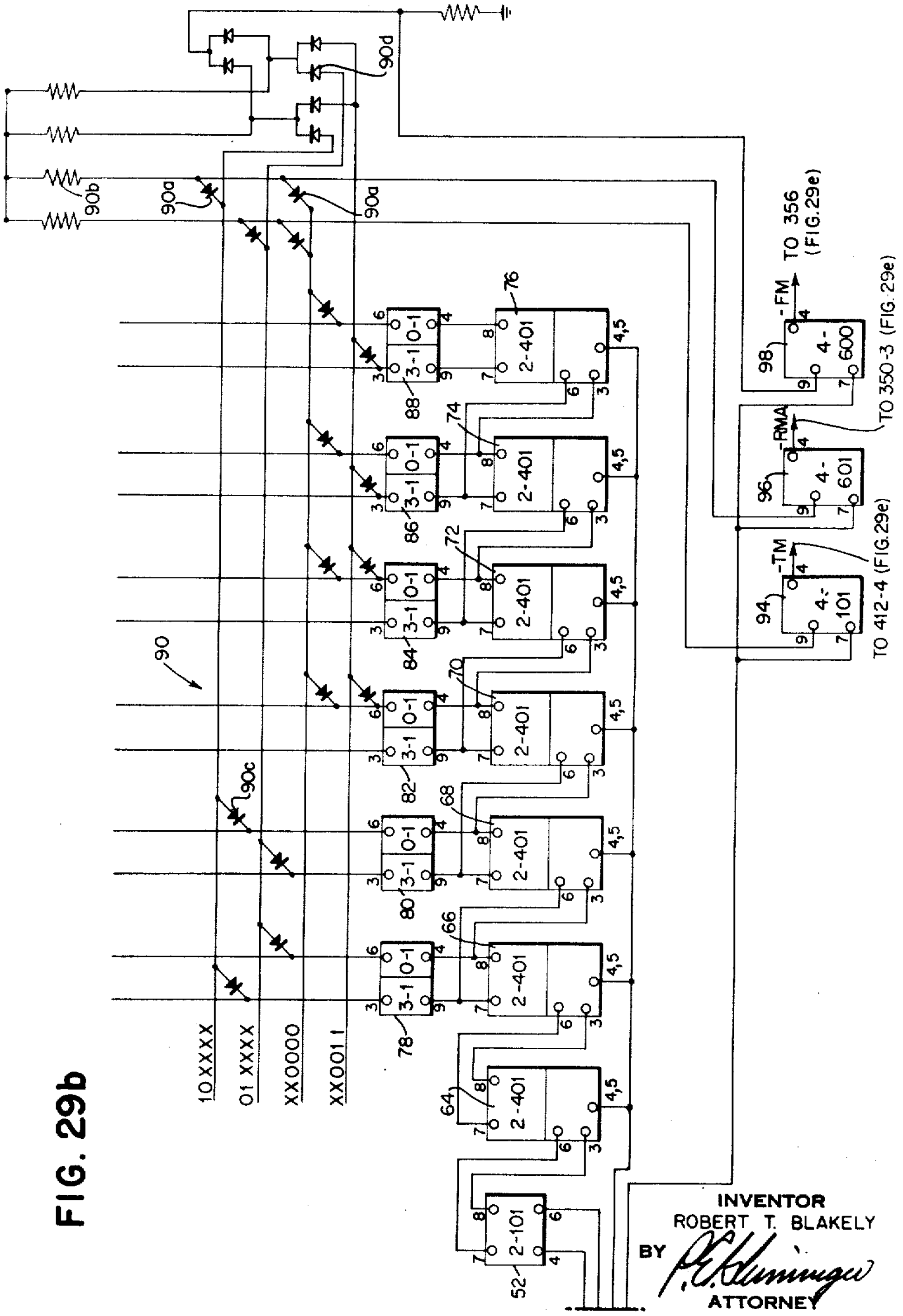
Figure 29C:
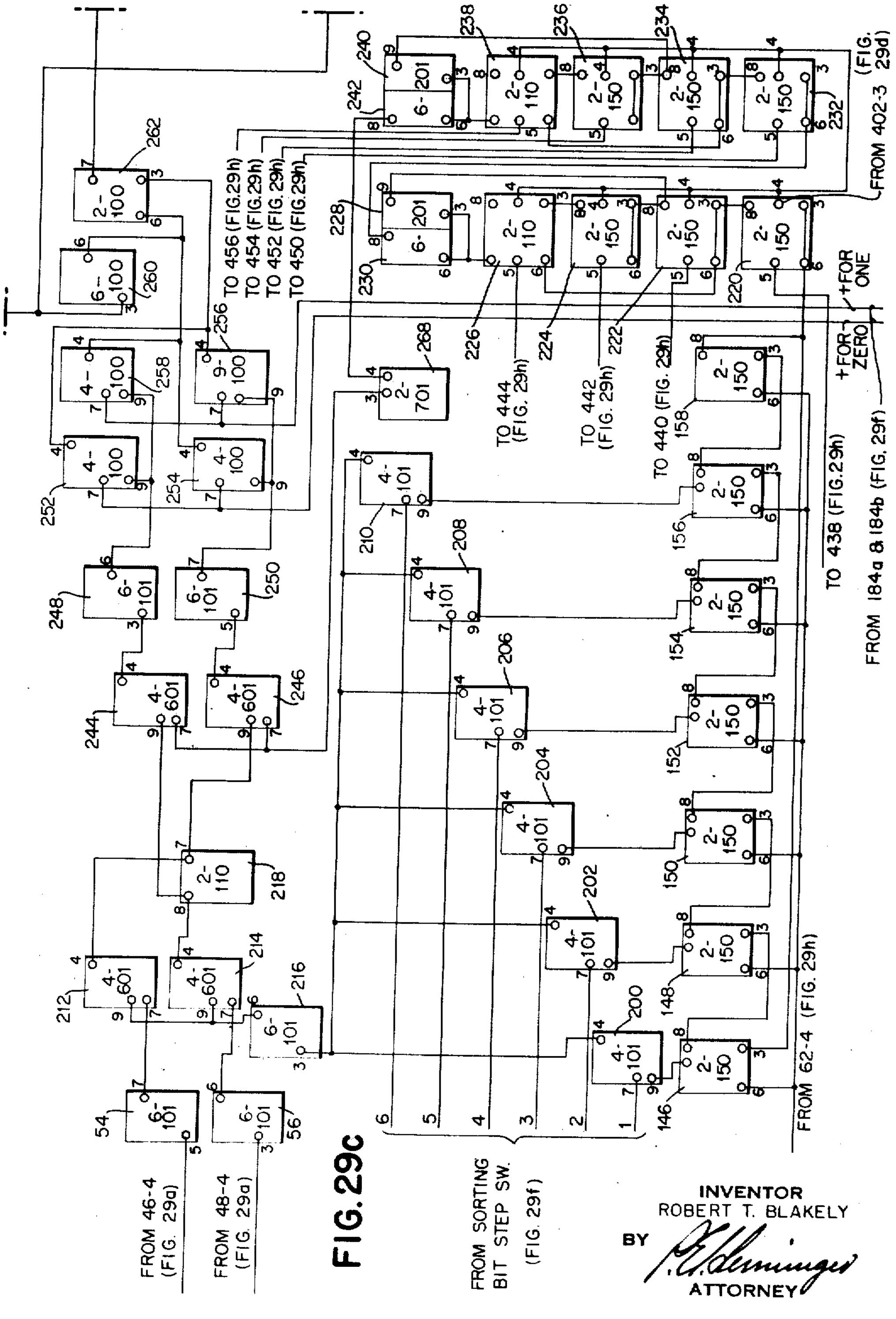
Figures 29D, 29S:
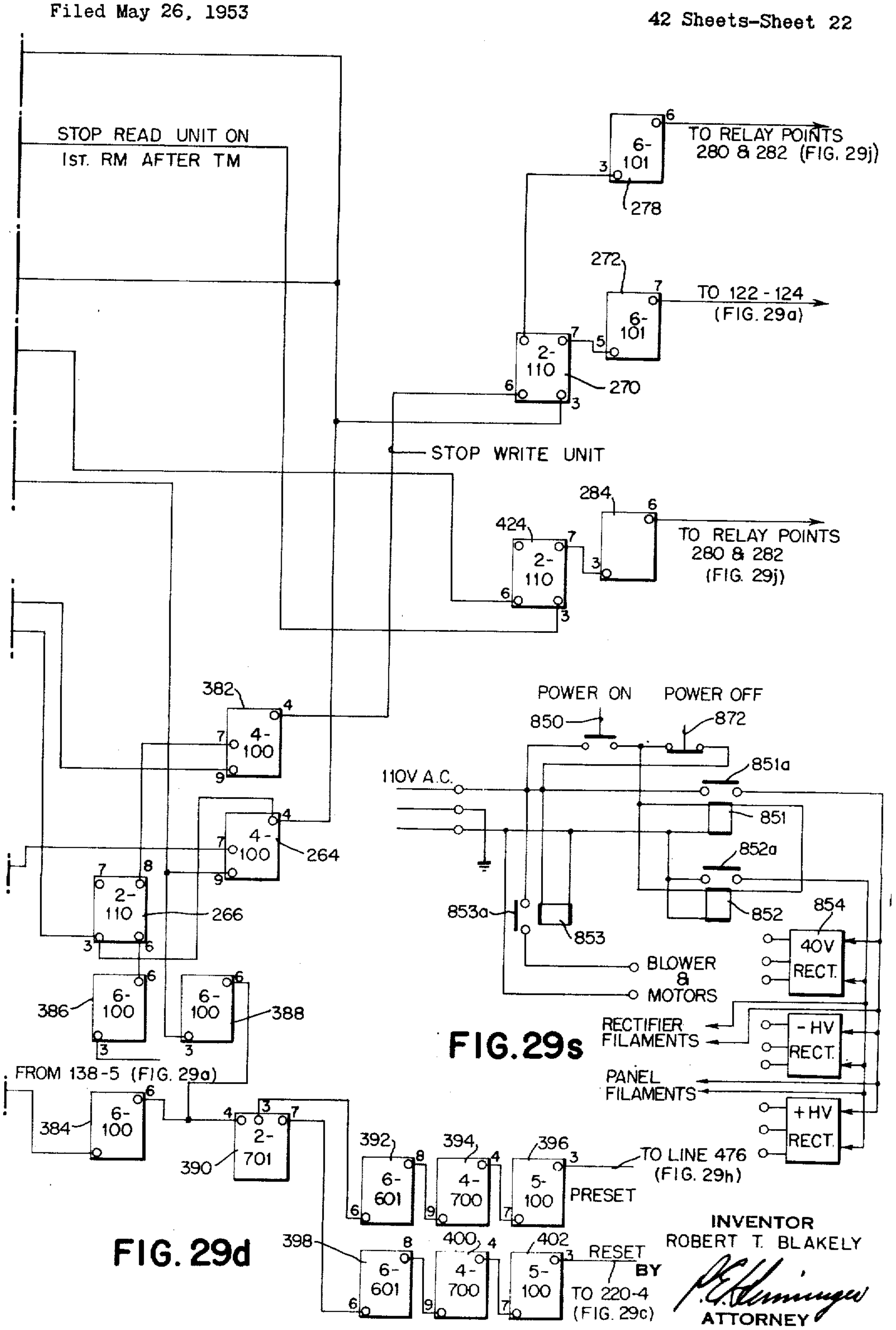
Figure 29E:
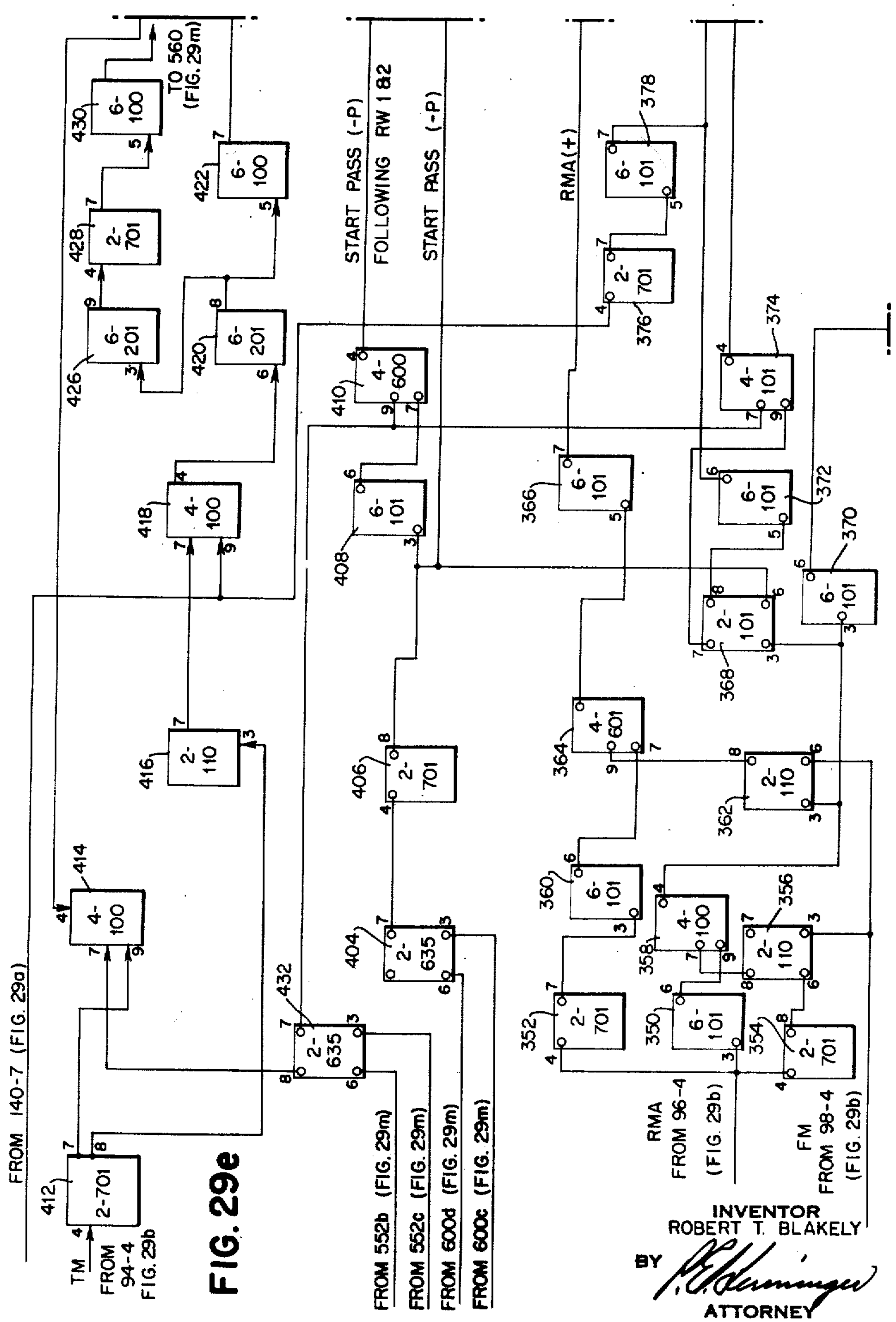
Figure 29F:
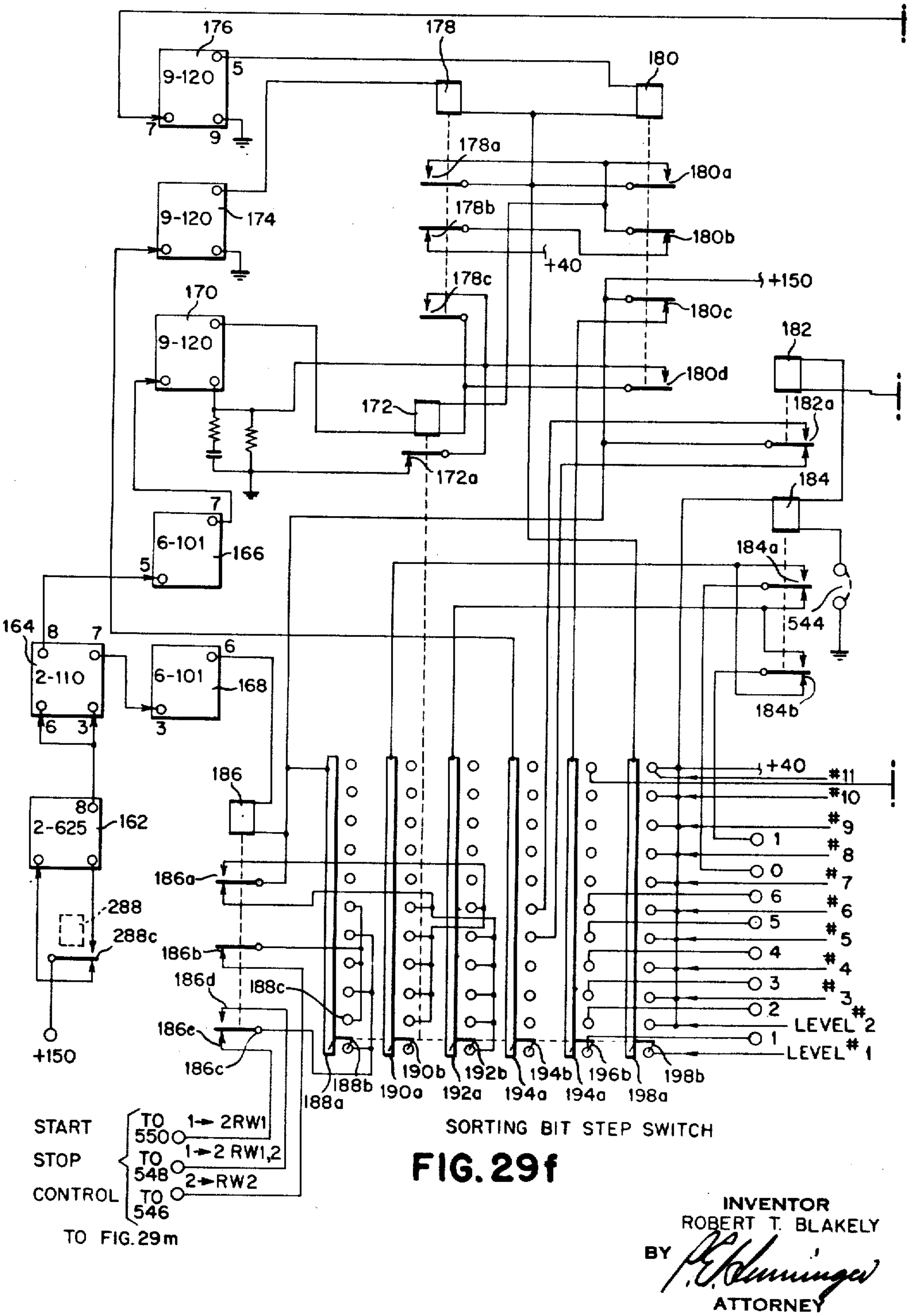
Figure 29G:
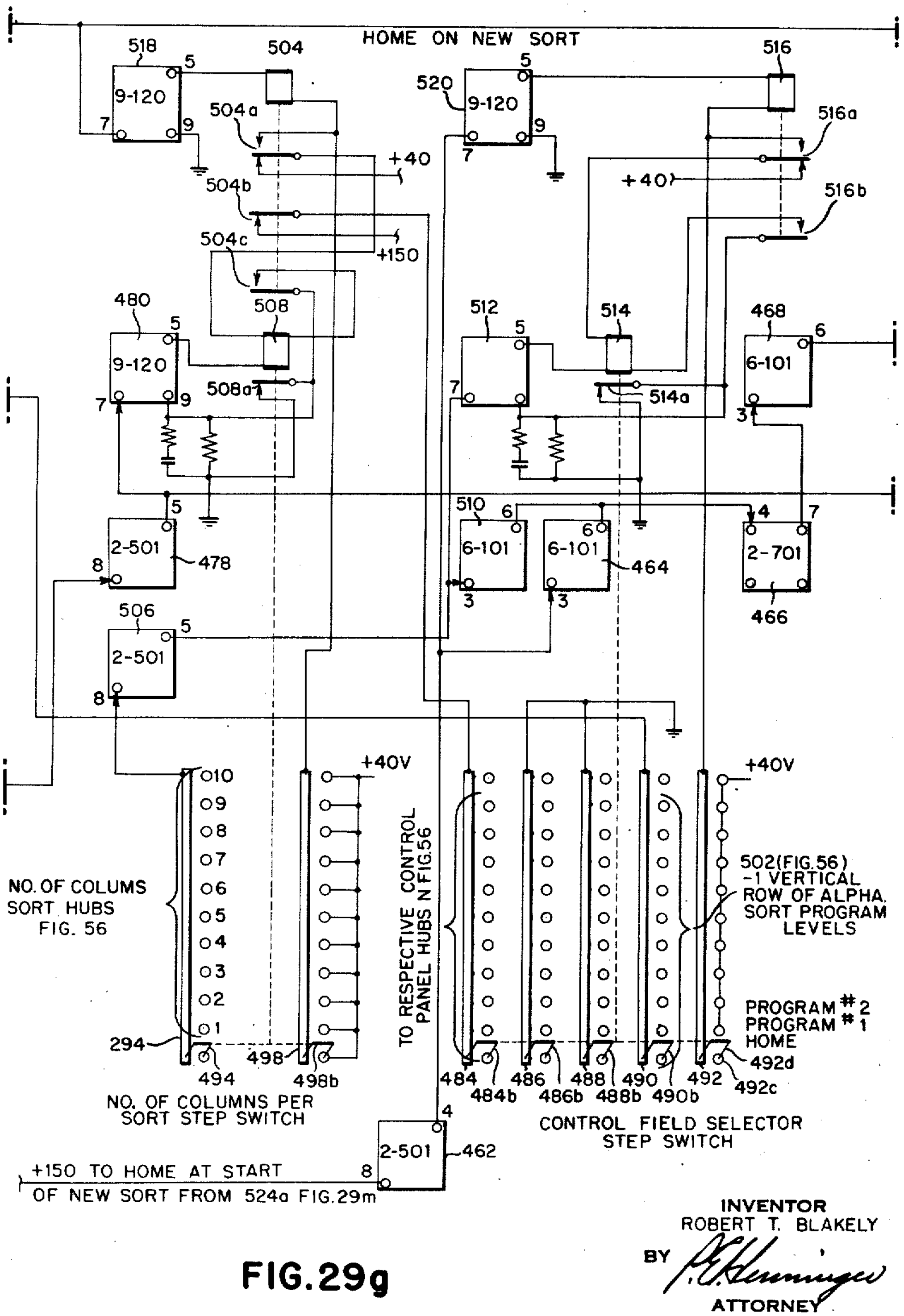
Figure 29H:
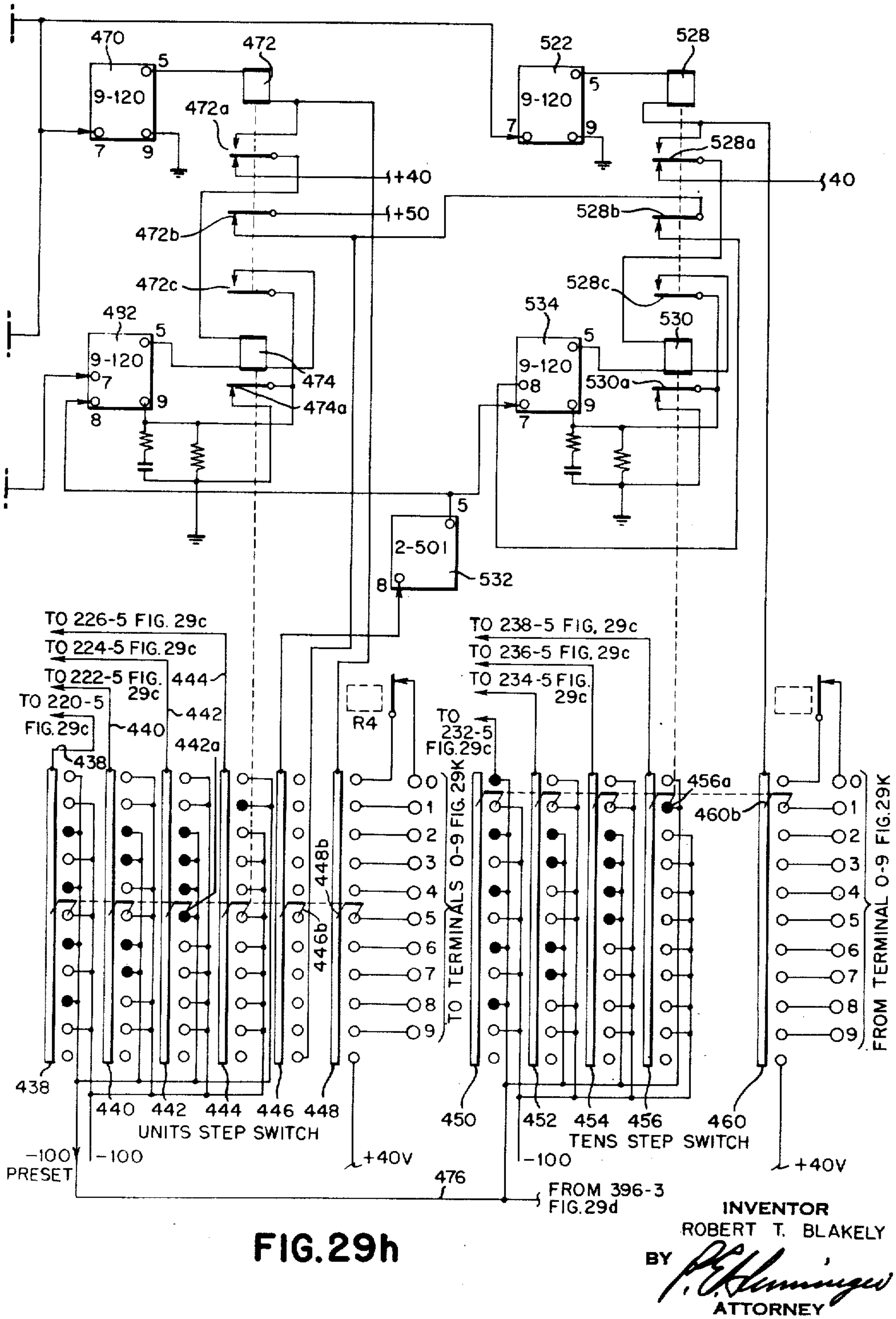
Figure 29J:
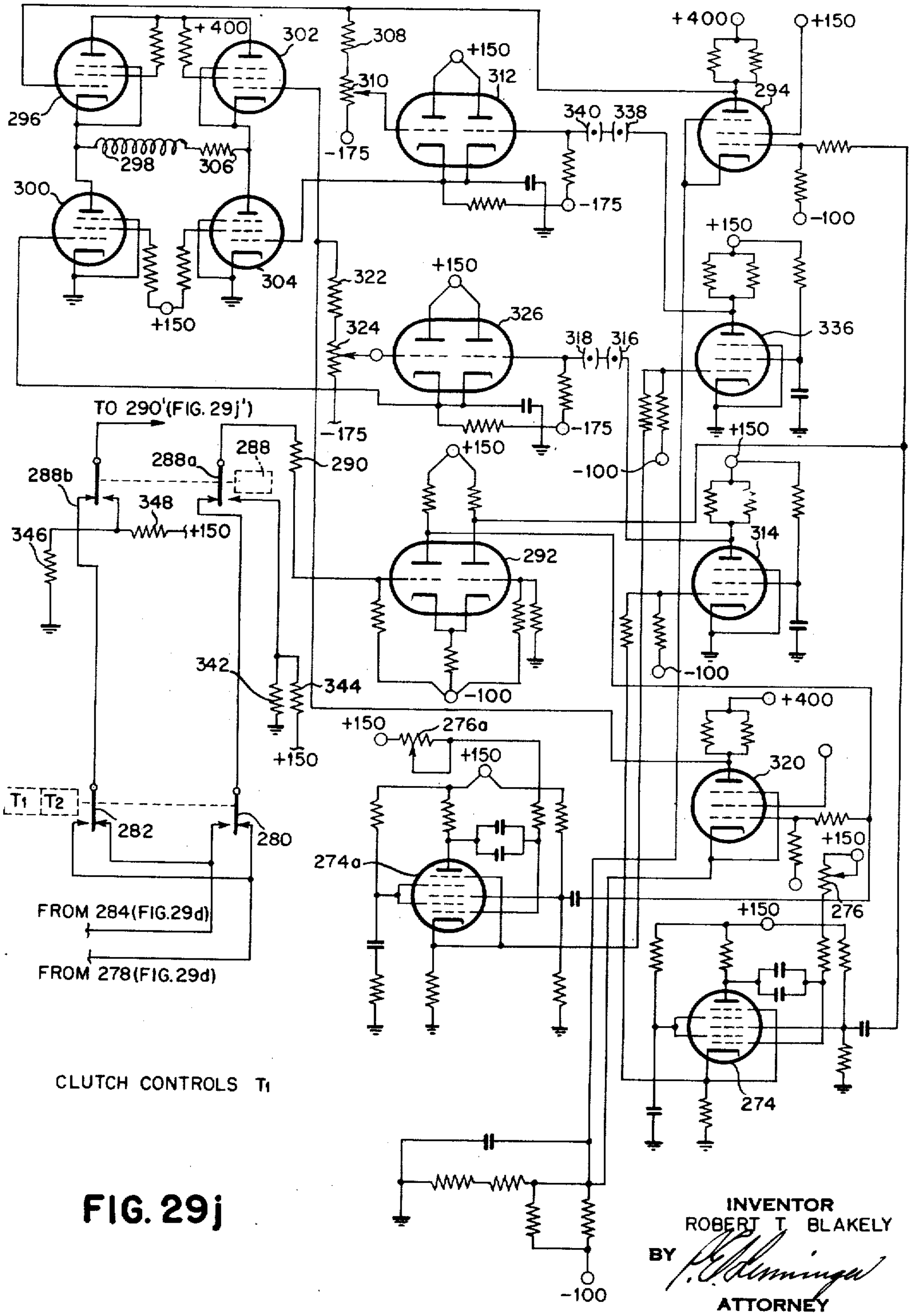
Figure 29J:
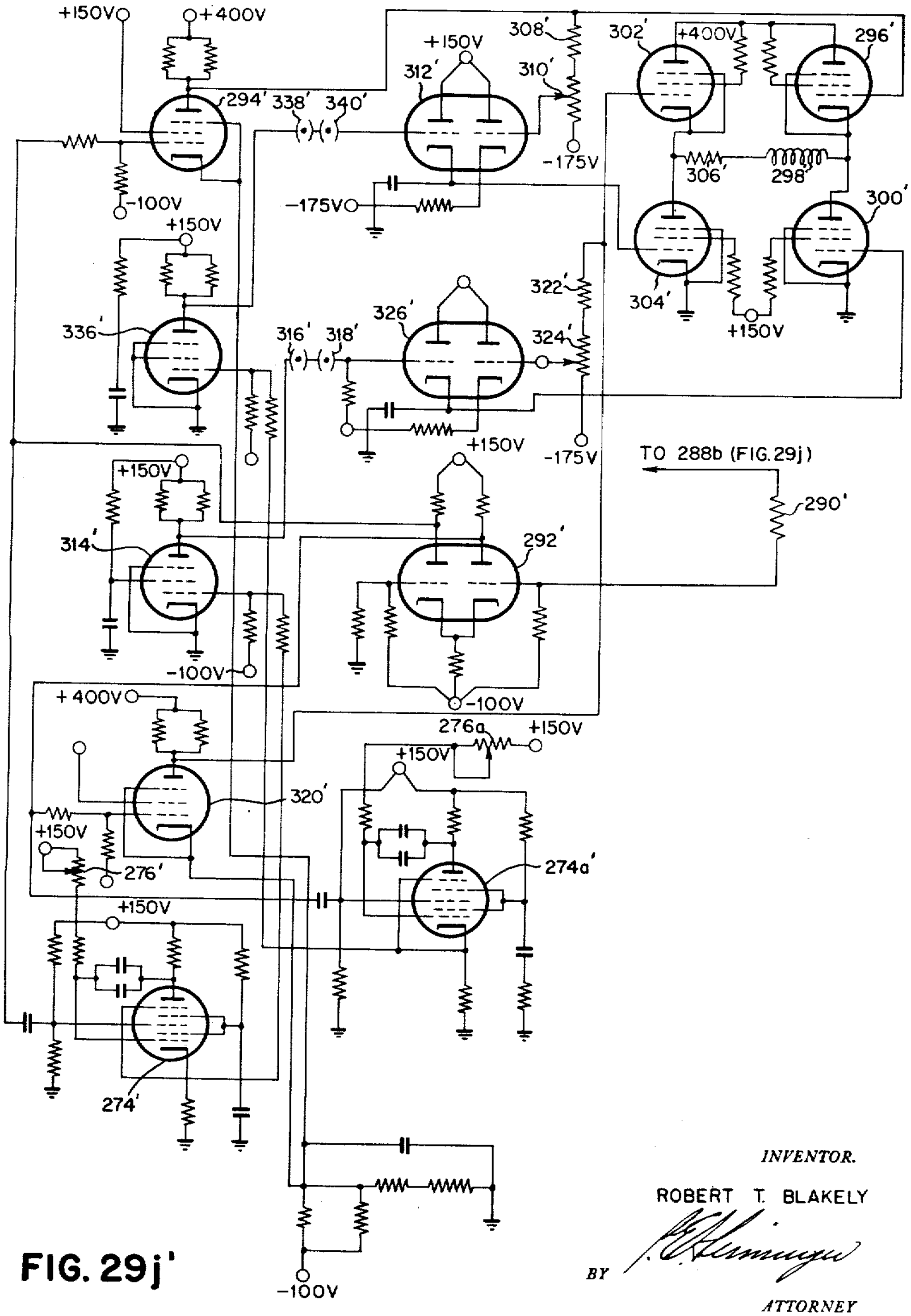
Figure 29K:
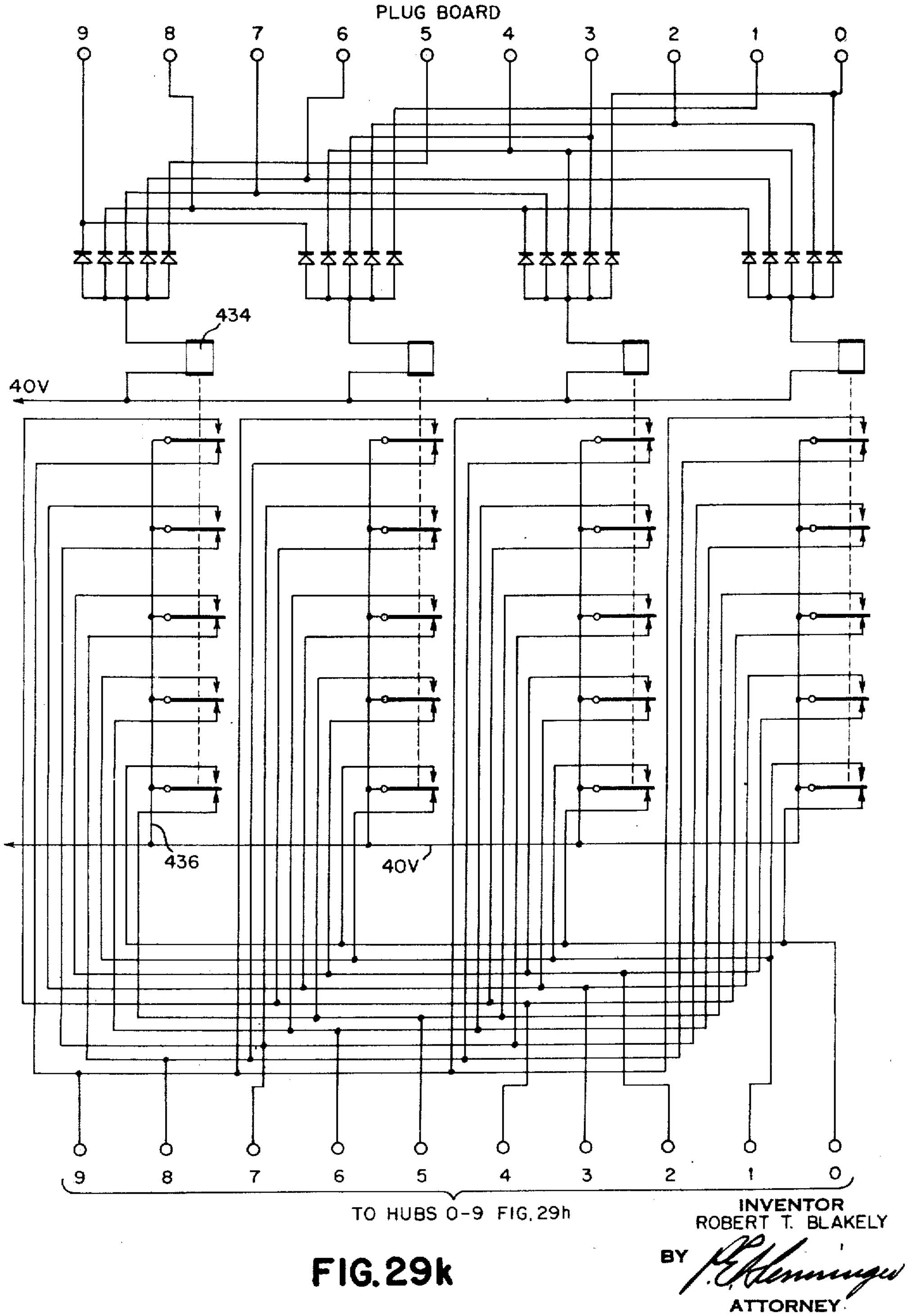
Figure 29M:
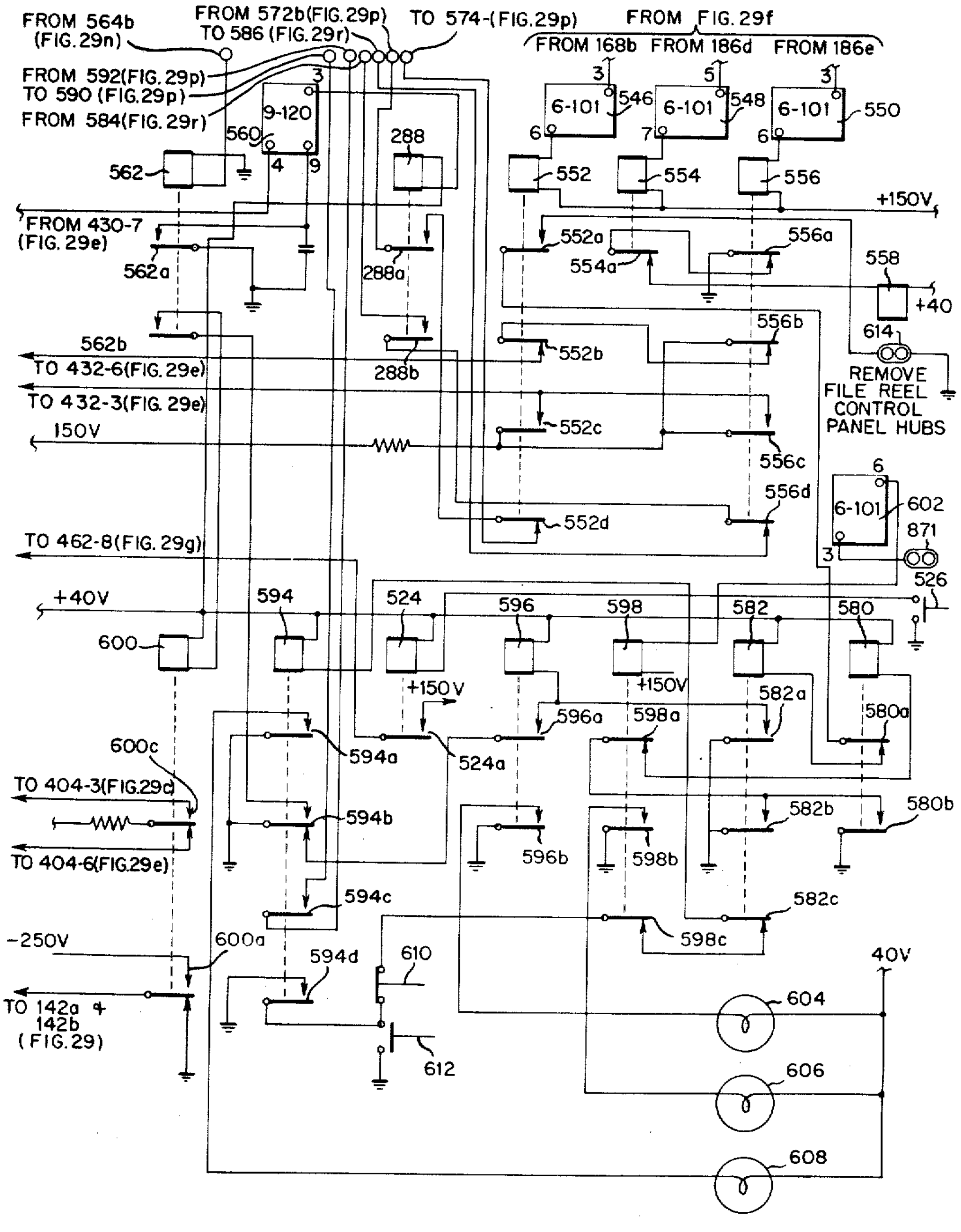
Figure 29N:
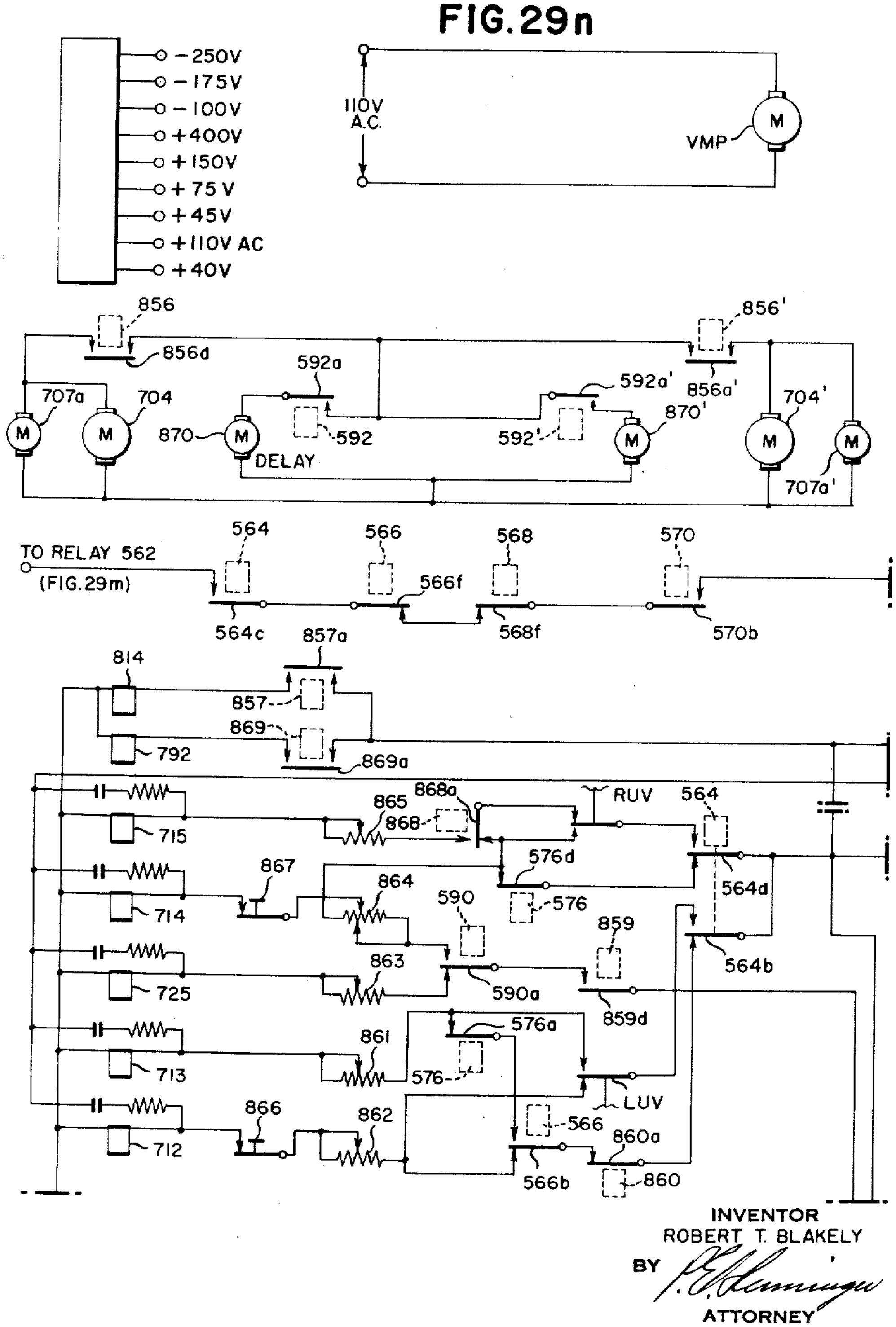
Figure 30:
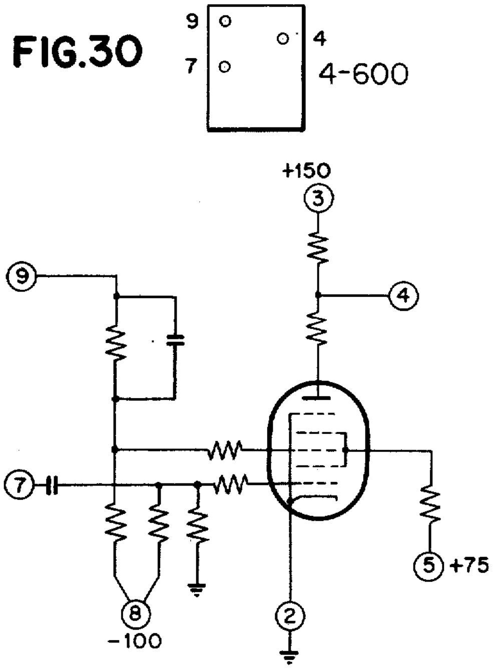
Figure 31:
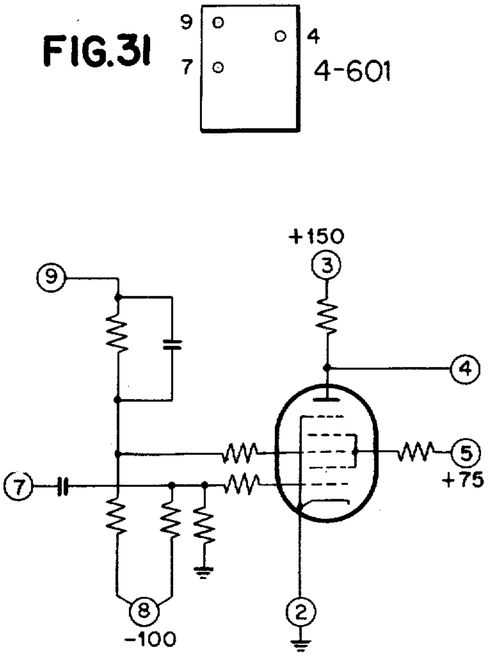
Figures 32, 33:
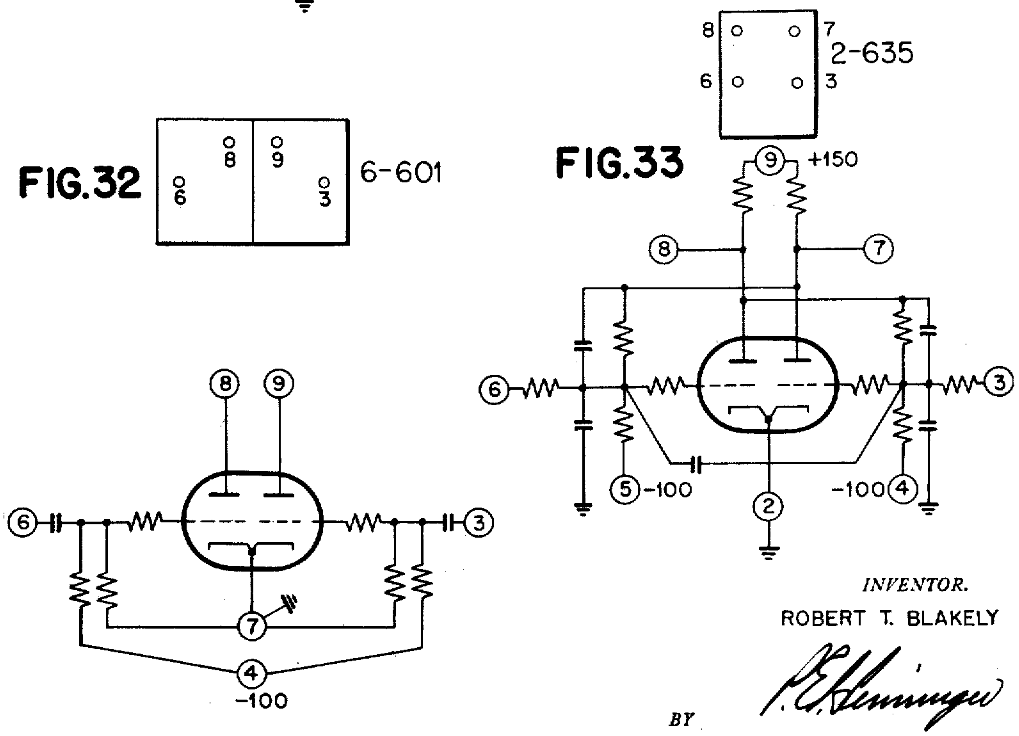
Figure 34:
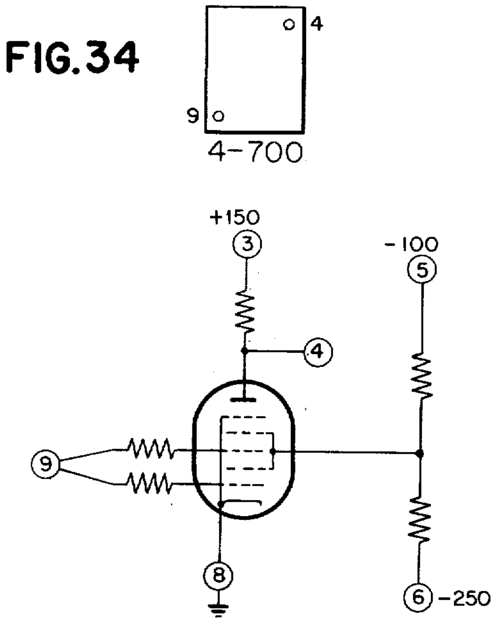
Figure 35:
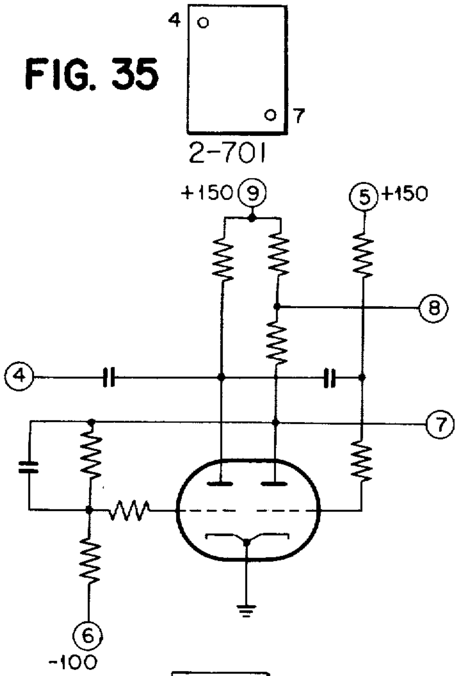
Figure 36:
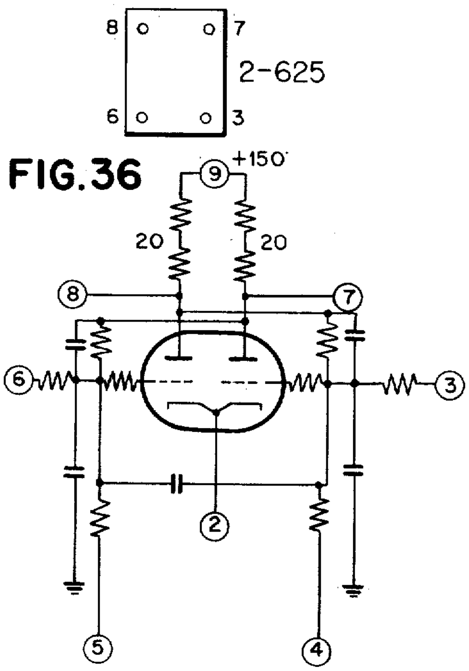
Figure 37:
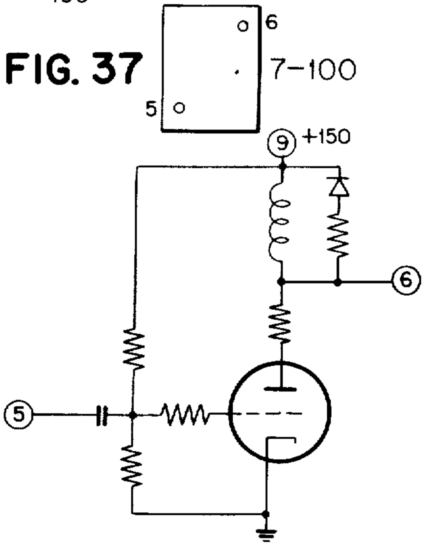
Figure 38:
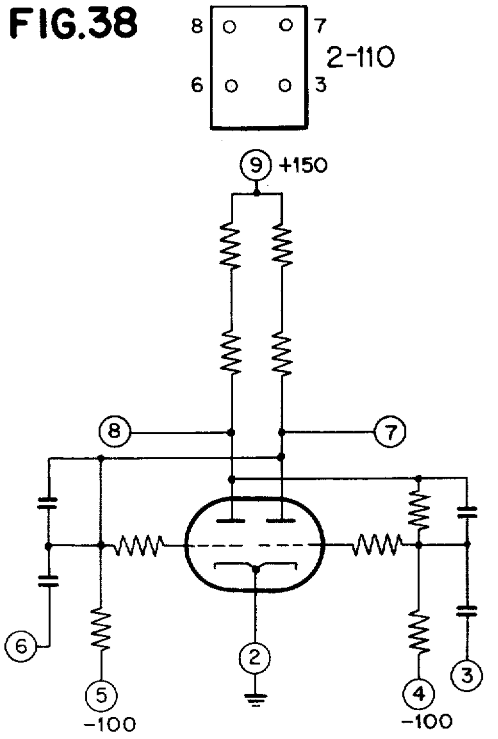
Figure 39:
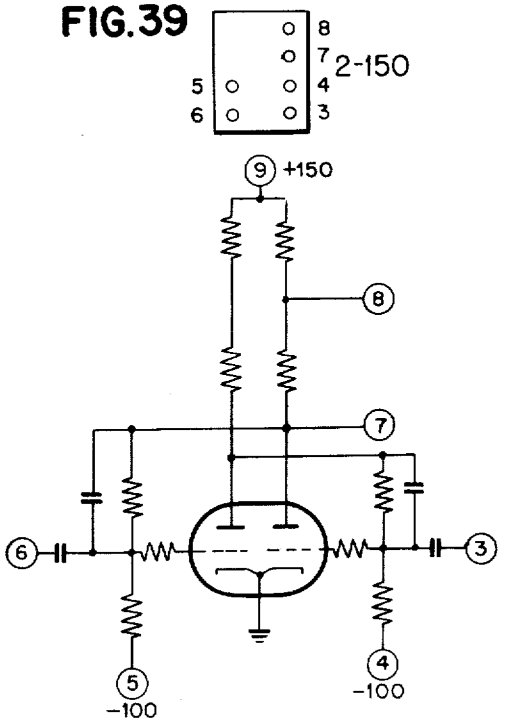
Figure 40:
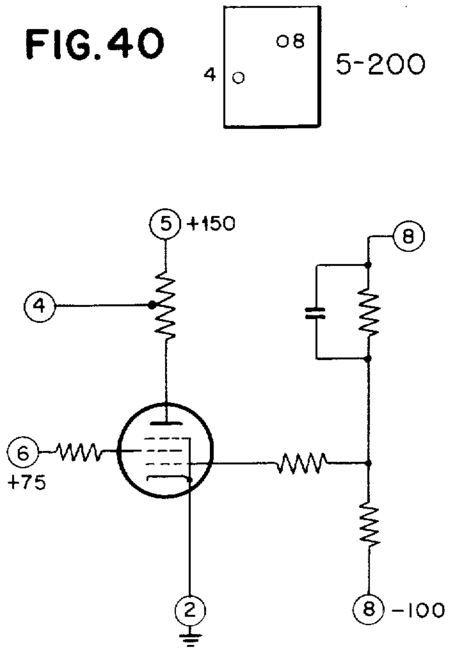
Figure 41:
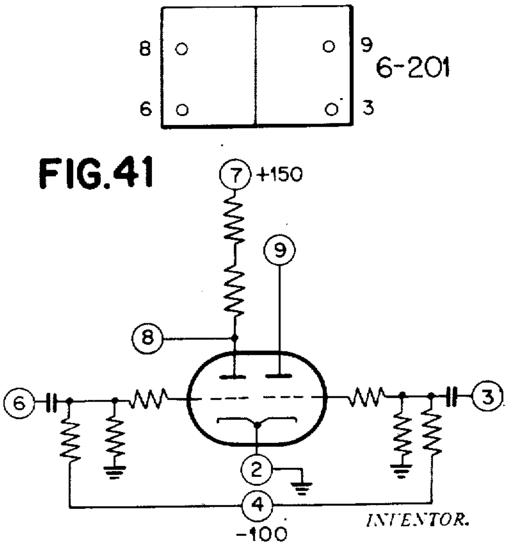
Figure 42:
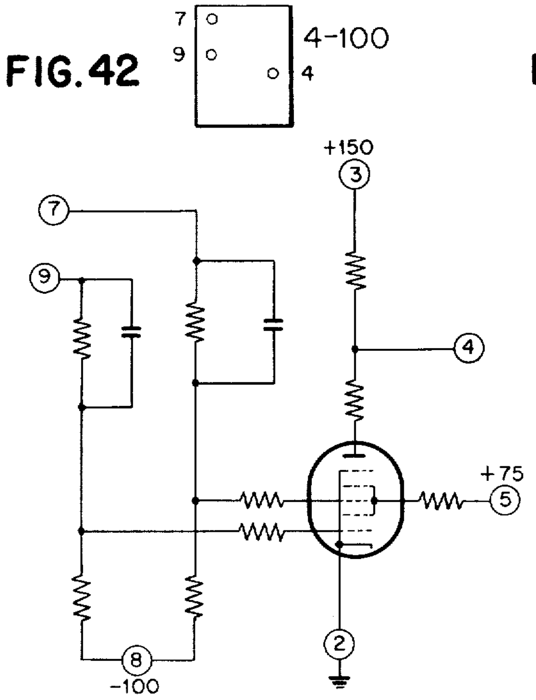
Figure 43:
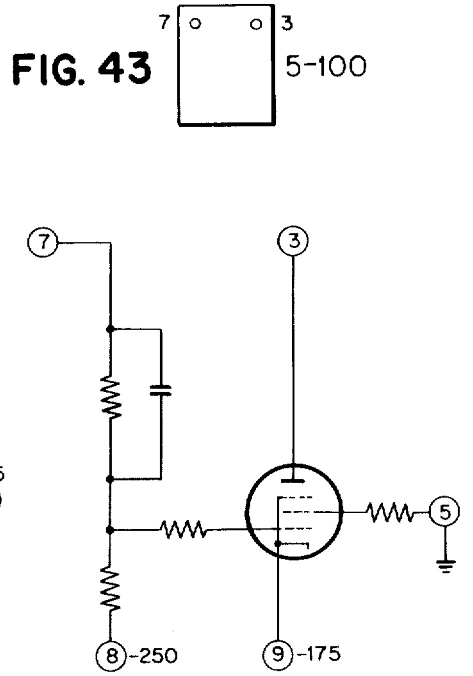
Figure 44:
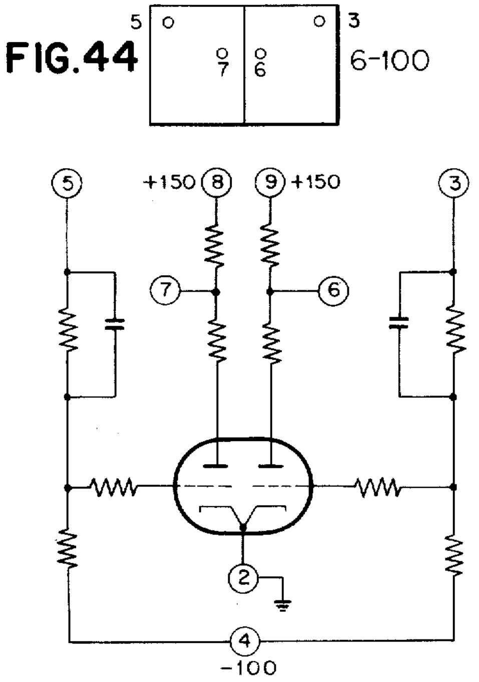
Figure 45:
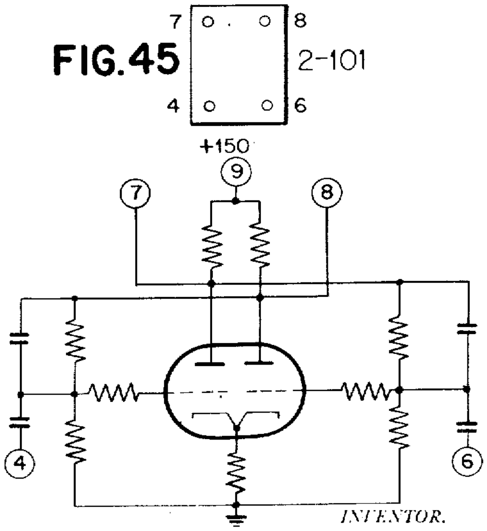
Figure 46:
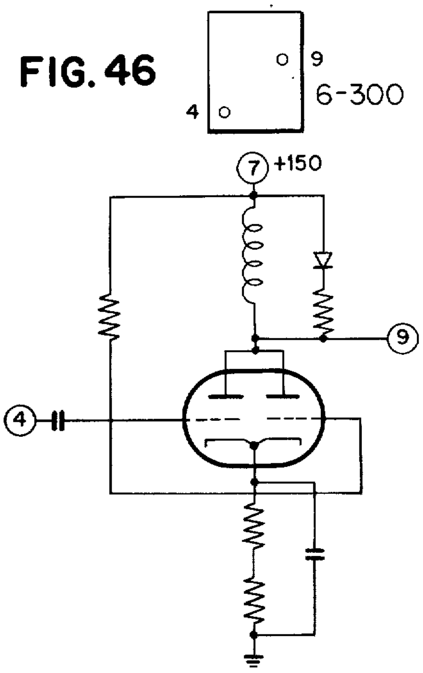
Figure 47:
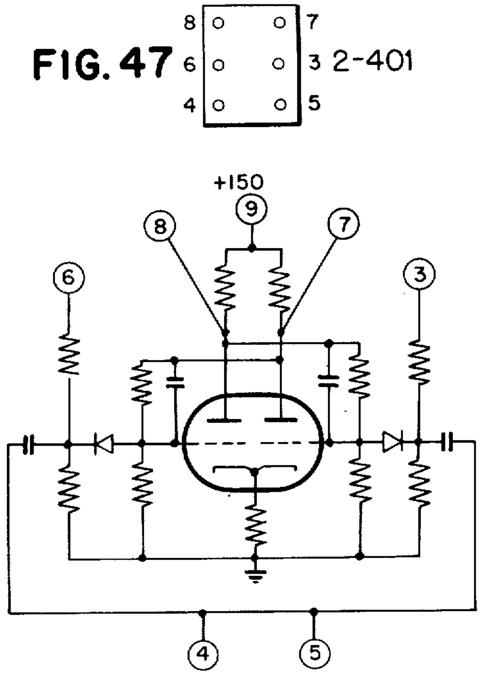
Figure 48:
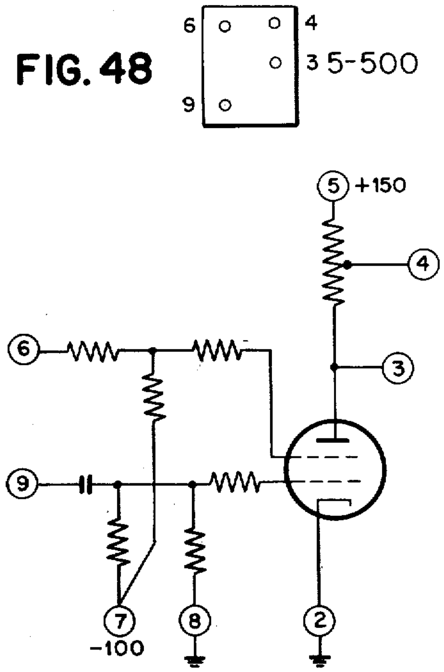
Figure 49:
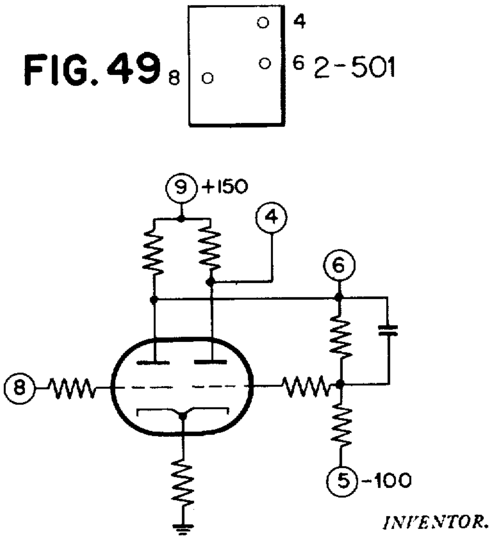
Figure 50:
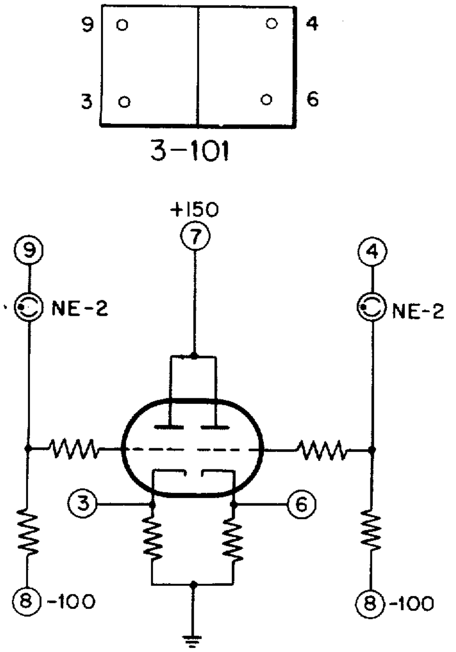
Figure 51:
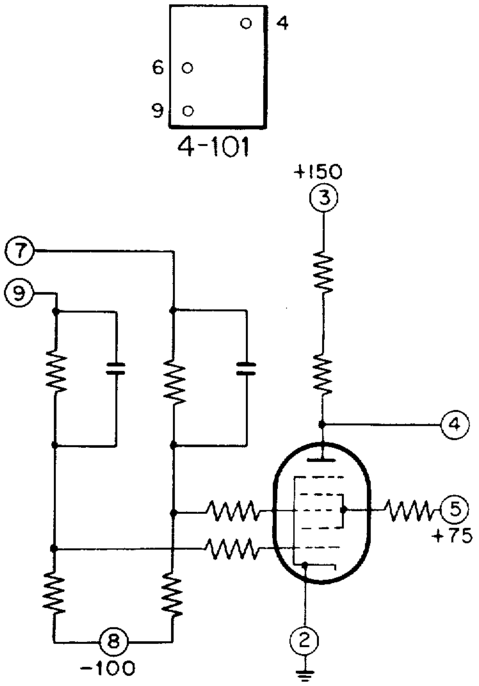
Figure 52:
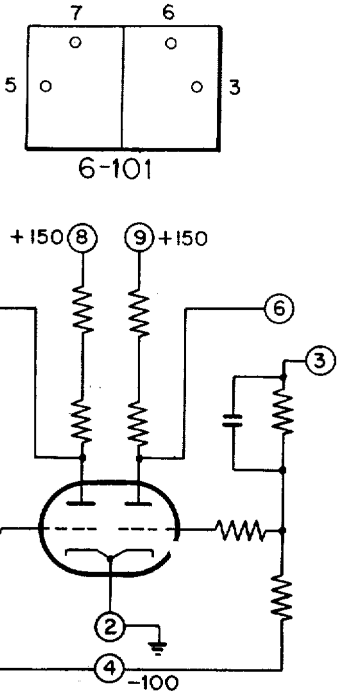
Figure 53:
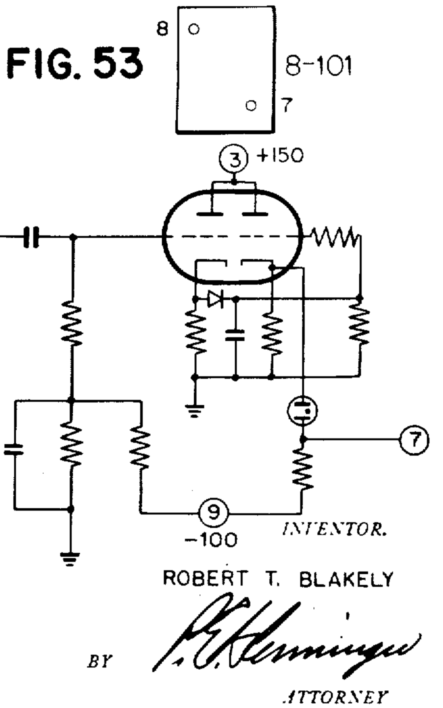
Figure 54:
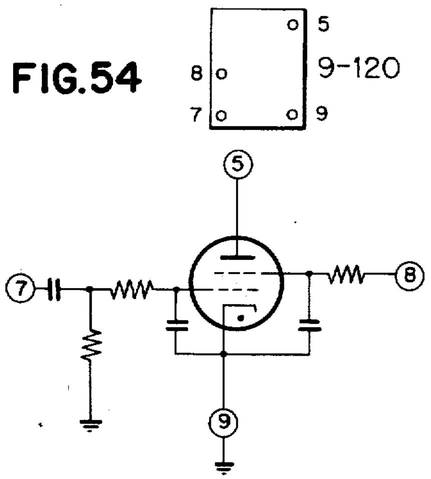
Figure 55:
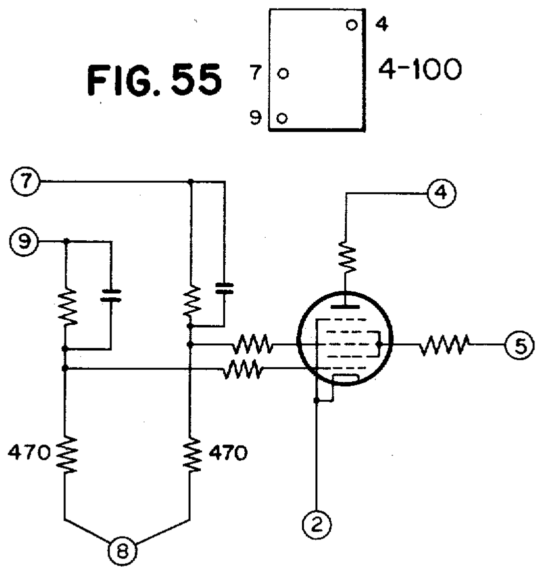
Figure 56:
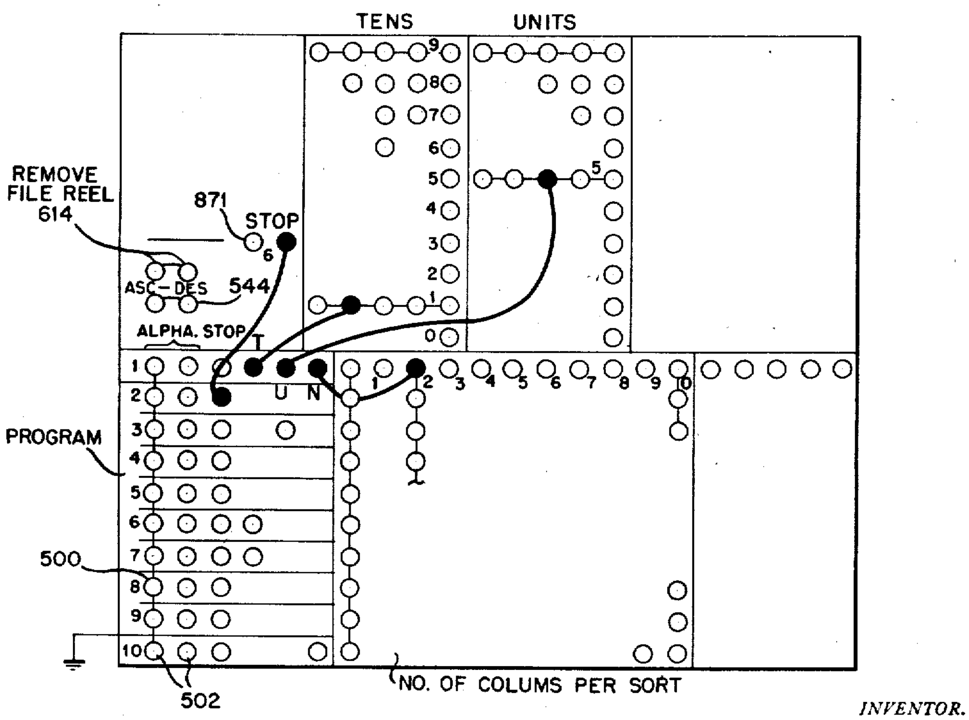
Figure 57:
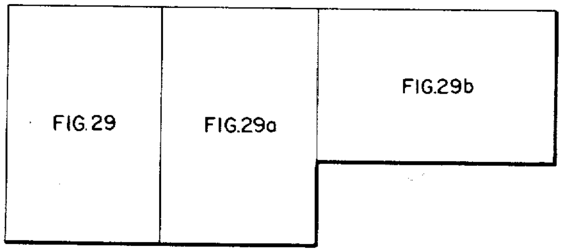
Figure 58:
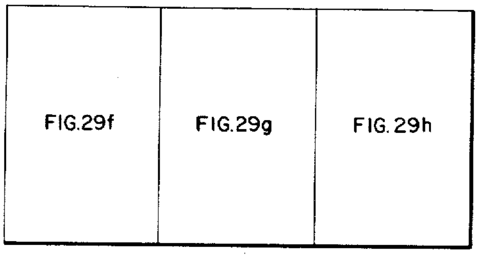
Figure 59:
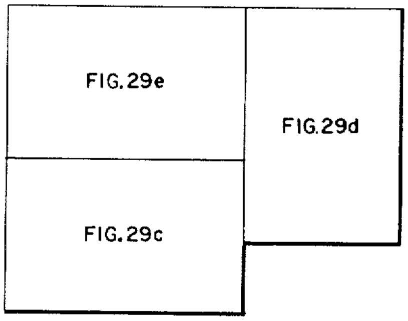
Figure 60:
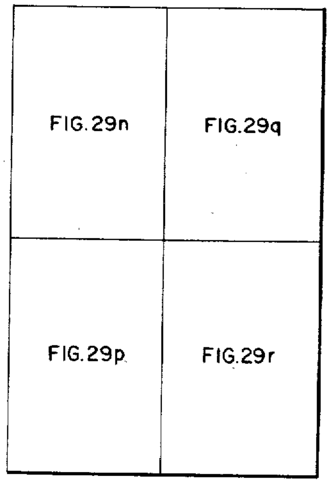

Figs. 29 through 29*s* illustrate the sorting and tape drive control circuits. These figures may be more specifically described as follows:

Fig. 29 is the tape unit transfer control circuit;

Fig. 29*a* illustrates a network of peakers and time delay units comprising pulse generators shown at the upper part thereof and a record mark recognizing network at the bottom of the figure;

Fig. 29*b* illustrates a circuit network utilized in the recognition of certain sorting control codes;

Figs. 29*c*, 29*d* and 29*e* together show record transfer control circuits, Fig. 29*c* in particular illustrating the arrangement of a bit counter, a bit selection switch and a character counter;

Fig. 29*f* diagrammatically illustrates a sorting bit step switch;

Fig. 29*g* is a diagrammatic illustration of a columns per sort step switch and a control field selector step switch;

Fig. 29*h* diagrammatically illustrates the units and tens step switches;

Fig. 29*k* is the diagram of a diode and relay network constituting units and tens step switch homing relays;

Fig. 29*m* is a tape control matrix diagrammatically illustrated;

Figs. 29*n*, 29*p*, 29*q*, 29*r* together constitute tape drive control circuits;

Fig. 29*s* is the circuit diagram of the power supply system;

Figs. 30 through 55 diagrammatically illustrate the electronic components represented by way of block diagrams in Figs. 29*a*, 29*b*, 29*c*, 29*d*, 29*e*, 29*f*, 29*g*, 29*h* and 29*m*. The block forming part of each of Figs. 30 through 55 is the same as that used to represent the respective components throughout the aforesaid figures, and the terminal numbers appearing on these blocks and in connection therewith throughout the block diagrams correspond to the correspondingly numbered terminals of the component illustrated immediately below each of the respective blocks. This group of figures may be further characterized as follows:

Fig. 30 is a pentagrid switch with a direct current and capacitor input and having a tapped plate output;

Fig. 31 is a direct current capacitor switch with a full plate output;

Fig. 32 is a dual capacitor input with an inverter but without plate load;

Fig. 33 is a direct current operated trigger with two full plate outputs;

Fig. 34 is a pentagrid switch with a full plate output used in reset circuits;

Fig. 35 is a single shot multi-vibrator capable of emitting a pulse at a delayed time following the input pulse, depending on the time consonant of the unit;

Fig. 36 is a direct current operated trigger with one full and one tapped plate output;

Fig. 37 is a peaking inverter capable of transforming a relatively slow speed pulse to a high speed pulse;

Fig. 38 is a trigger with two full plate outputs;

Fig. 39 is a trigger with one full and one tapped plate output;

Fig. 40 is a high power inverter with a tapped output;

Fig. 41 is a capacitor coupled dual inverter with one full plate output and one plate with no plate resistor;

Fig. 42 is a pentagrid switch with a tapped output;

Fig. 43 is a reset power inverter;

Fig. 44 is a dual tapped plate inverter;

Fig. 45 is a simple electronic trigger with two full plate outputs;

Fig. 46 is a low speed to high speed pulse converter;

Fig. 47 is a switch and trigger with two full plate outputs;

Fig. 48 is a power inverter with both a full and tapped plate output;

Fig. 49 is a trigger with two full plate outputs having the characteristic of remaining in conducting condition on one side unless held over in the other;

Fig. 50 is a dual cathode follower output;

Fig. 51 is a pentagrid switch with a full plate output;

Fig. 52 is a dual inverter with dual plate outputs;

Fig. 53 is a pulse shaper and inverter;

Fig. 54 is a thyratron unit with a direct current coupled input and having an output producing sufficient current to operate relays;

Fig. 55 is a pentagrid switch with a tapped output;

Fig. 56 is a control panel or plugboard utilized herein;

Fig. 57 is a drawing diagram showing the arrangement of Figures 29, 29*a* and 29*b* to produce an interconnected circuit;

Fig. 58 is a drawing diagram showing the arrangement of Figures 29*f*, 29*g* and 29*h* to form an interconnected circuit;

Fig. 59 is a drawing diagram showing the arrangement of Figures 29*c*, 29*d* and 29*e* to form an interconnected circuit; and Fig. 60 is a drawing diagram showing the arrangement of Figures 29*n*, 29*p*, 29*q* and 29*r* to form an interconnected circuit.

It is well known that various items of information may be recorded on separate cards such as the perforated cards used in automatic, electric, accounting machine systems, and that a pack of such cards in random arrangement may be sorted to rearrange the cards in either ascending or descending order, either as to numerical information or as to alphabetic information. Such sorting operations are performed in sorting devices which separate a pack of such randomly arranged cards into a plurality of sorting pockets.

It would seem that by analogy to the sorting of information recorded on cards, it should be possible to sort data recorded at random on a continuous tape into a plurality of receiving tapes and by a process of resorting eventually rearrange the data in a desired order on a single receiving tape either as to alphabetical or numerical information thereon. The disadvantage of a tape sorting process proceeding by analogy to card sorting is the number of receiving tapes that would be required and the attendant amount of equipment demanded for such operations.

The present invention is directed to the sorting of randomly recorded data on continuous tapes while using only two tapes in the operation. This is rendered possible by coding the information on the tape in a multibit code and sorting on successive bits of the code in a plurality of sorting operations until the entire sort has been completed.

The sorter herein illustrated is adapted to use the excess-three modified binary code written serially in two tracks, one along each edge of the tape, the "yes" bits on one track and the "no" bits on the other. Essentially the sorter herein performs a single column sort by operating on the individual bits of which the data column is comprised. Therefore, four complete bit sorts per column are required for a numeric sort and six for an alphabetic sort. All information upon which the sort is performed is transferred on every complete sorting operation (two passes of the input tape) with the records rearranged on each sort in accordance with the bit order. The information or file reel must be passed and rewound twice per bit sort. If the data is to be sorted in ascending order, the first pass transfers all records containing a "no" in the bit under observation, and the second pass transfers all records in which a "yes" has been recognized. The opposite order of transfer under bit control is employed if the operation is to result in a sort of descending order. Thus, eight passes and rewinds of the input tape will result in a complete numeric sort and twelve such passes will result in an alphabetic sort.

While we have mentioned the binary code as modified by excess-threes for use in the instant sorting operation, it will be apparent to those skilled in the art that any other convenient code may be employed. The specific code herein employed is represented in the following table wherein the first four bits, reading from right to left, represent the "1," "2," "4" and "8" weights respectively; the bits identified as "A" and "B" arae used, together with "1," "2," "4" and "8" bits, for the coding of alphabetical data, and the bits identified by the letter "C" may be employed for checking purposes.

| C BA 8421 | C BA 8421 | C BA 8421 |
|---|---|---|
| 1 11 0000 | 1 10 0100 J | 0 01 1001 W |
| 0 11 0001 | 0 10 0101 K | 0 01 1010 X |
| 0 11 0010 - | 0 10 0110 L | 1 01 1011 Y |
| (Hyphen) | 1 10 0111 M | 0 01 1100 Z |
| 1 11 0011 & | 1 10 1000 N | 1 01 1101 , |
| (Ampersand) | 0 10 1001 O | 1 01 1110 % |
| 0 11 0100 A | 0 10 1010 P | 0 01 1111 |
| 1 11 0101 B | 1 10 1011 Q | 1 00 0000 |
| 1 11 0110 C | 0 10 1100 R | (Blank) |
| 0 11 0111 D | 1 10 1101 $ | 0 00 0001 |
| 0 11 1000 E | 1 10 1110 * | 0 00 0010 |
| 1 11 1001 F | 0 10 1111 | 1 00 0011 0 |
| 1 11 1010 G | 0 01 0000 | 0 00 0100 1 |
| 0 11 1011 H | (Tape Mark) | 1 00 0101 2 |
| 1 11 1100 I | 1 01 0001 | 1 00 0110 3 |
| 0 11 1101 . | 1 01 0010 | 0 00 0111 4 |
| (Decimal Point) | 0 01 0011 + | 0 00 1000 5 |
| 0 11 1100 [illegible] | (Field Mark) | 1 00 1001 6 |
| 1 11 1111 | 1 01 0100 / | 1 00 1010 7 |
| 0 10 0000 | (Slant) | 0 00 1011 8 |
| (Record Mark) | 0 01 0101 S | 1 00 1100 9 |
| 1 10 0001 | 0 01 0110 T | 0 00 1101 # |
| 1 10 0010 | 1 01 0111 U | 0 00 1110 @ |
| 0 10 0011 — | 1 01 1000 V | 1 00 1111 ∞ |
| (Field Mark) | | (Infinity) |

THE SORTER COMPONENTS

The sorter herein consists essentially of a network of data transfer controls and programming controls which may advantageously be considered at this point in very brief manner to render the following description of a sorting operation more intelligible.

Figure 1:
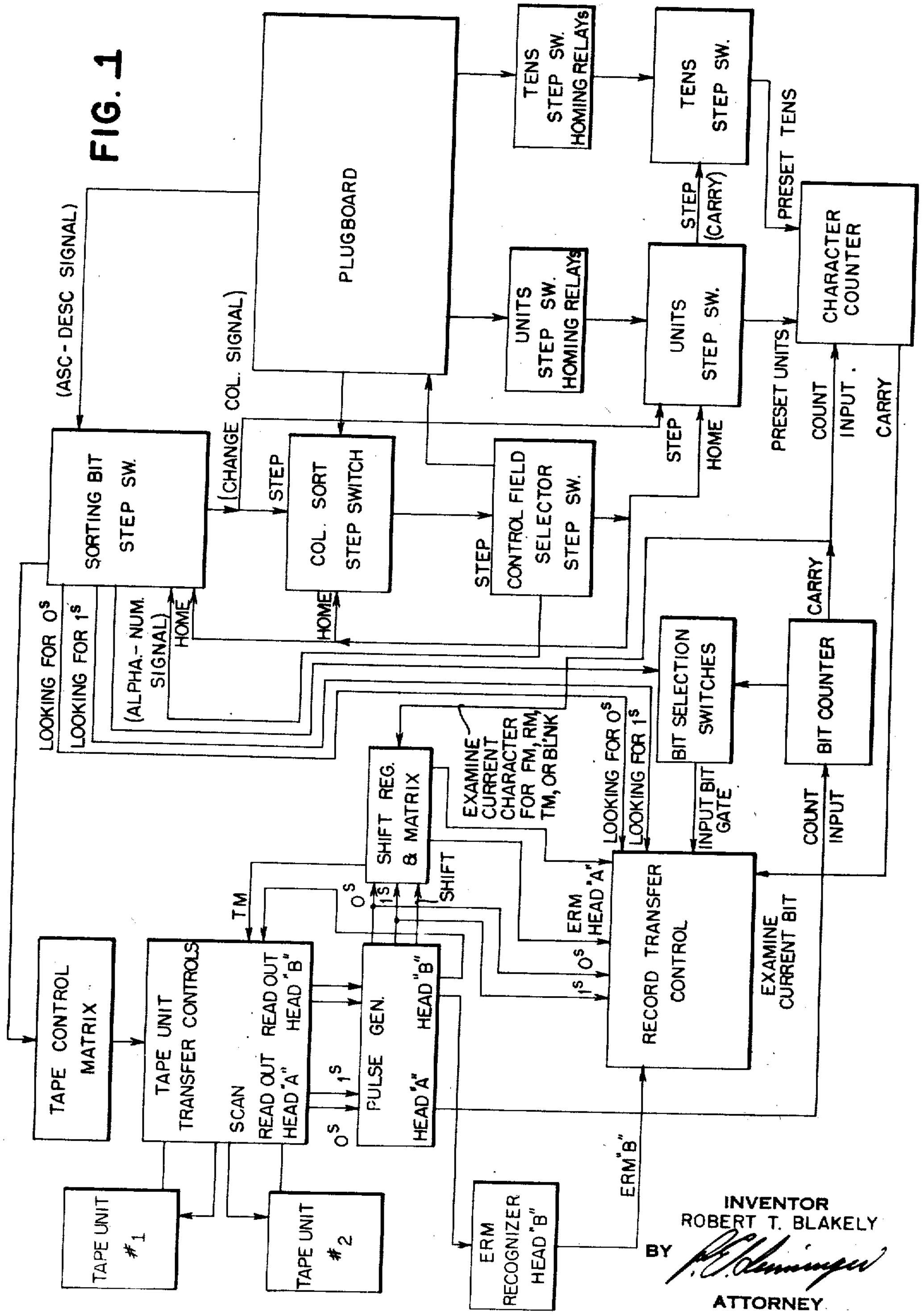
Figure 2:
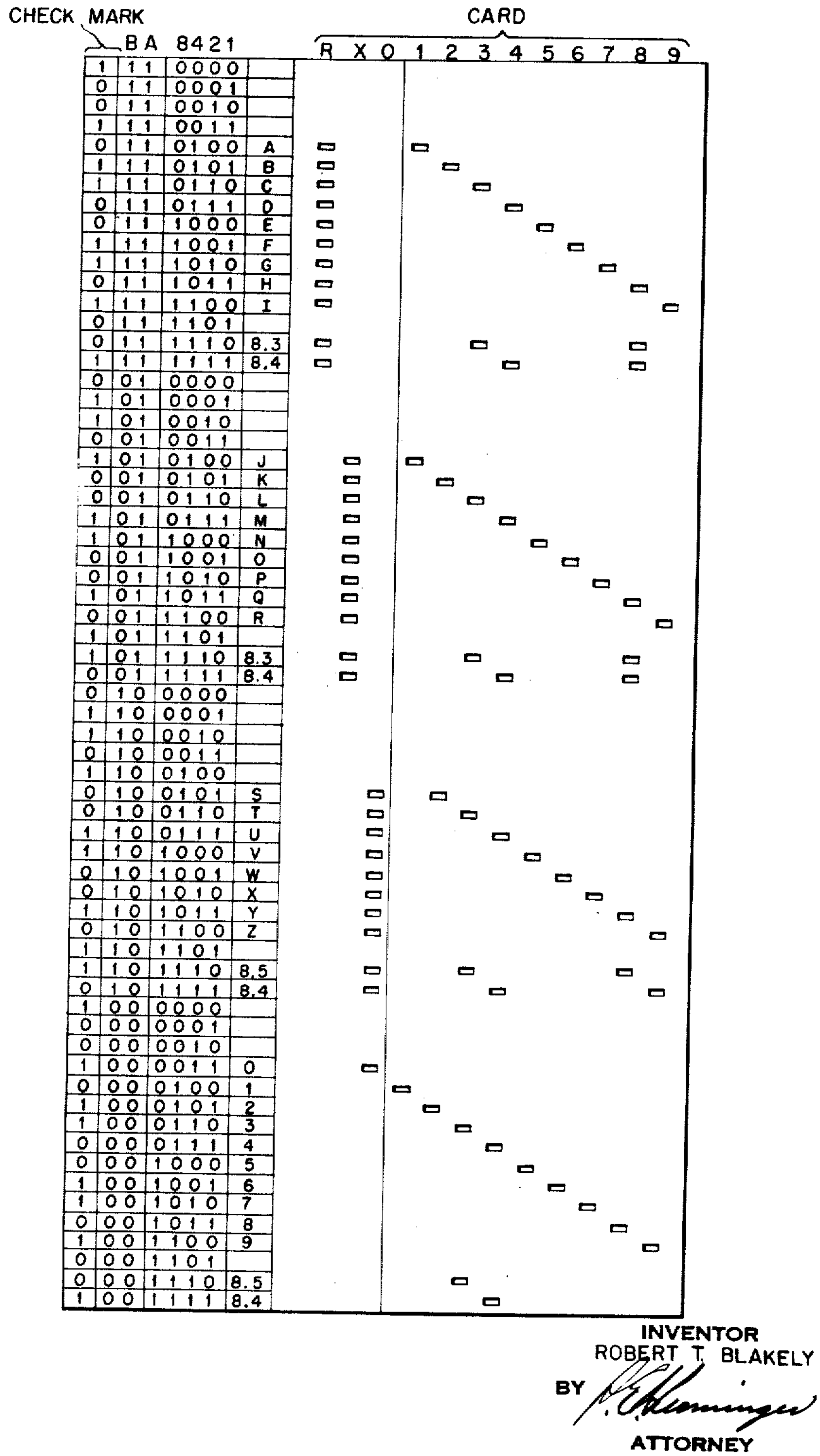

By reference to Fig. 1 of the drawings, which is in the nature of a flow chart of the sorter operation, it will be seen that the invention includes a pair of tape units designated as #1 and #2, tape unit transfer controls, a pulse generator, an ERM recognizer, a shift register and matrix, a record transfer control, a bit counter, bit selection switches, a character counter, a plugboard, a sorting bit step switch, a columns per sort step switch, units and tens switch step homing relays, units and tens step switches, a control field selector step switch, and a tape control matrix together with the mechanical equipment necessary to drive the tape through tape processing heads.

*Tape units #1 and #2.*—The tape units #1 and #2 are provided for the purpose of driving a pair of tapes through the writing, reading and erasing heads during the several passes constituting a complete sorting operation. This mechanism is shown in Figs. 11 through 28 of the drawings. The tape drive units receive some of their control pulses from the sorting control circuits which are to be described, and additional controls are of an external nature generated in the tape drive control circuitry of Figs. 29*n*, 29*p*, 29*q* and 29*r*.

*Tape unit transfer controls.*—The tape unit transfer controls which are shown mainly in Fig. 29 constitute a series of relay points through which all pulses to and from the tape must pass. These controls constitute the receptor for the impulses received from the input tape and the impulses that are transmitted to the output tape. Pulses originating at either of the tape units are received by the tape unit transfer controls and from there are transmitted to the pulse generator. The tape unit transfer controls determine the tape from which the data is to be read and that to which it is to be transferred.

*Pulse generator.*—The signals received from the tape units by the tape unit transfer controls are by nature quite distorted. The pulse generator receives these distorted signals and transforms them into uniform shapes. The components of the pulse generator are shown in the upper section of Fig. 29*a* and consist essentially of a network of peakers and appropriate time delay units adequate to their intended purpose.

*ERM recognizer.*—The pulse generator emits two sets of impulses, one being the pulse originating at head "A" and the second being that originating at head "B," the first of these pulses being the read pulse and the second being the write pulse. The ERM recognizer is composed of a plurality of timing units diagrammatically illustrated at the bottom of Fig. 29*a* and functions to recognize the fact that a complete record has been written on the output tape.

*Shift register and matrix.*—Signals from the pulse generator having their origin at the "A" or reading head are transmitted to the shift register and matrix. This register and matrix, diagrammatically illustrated in Fig. 29*b*, consists of a set of storage elements that store the character that is read from tape and in which the elements so stored are examined by means of a decoding network to recognize various control characters required for machine operation.

*Record transfer control.*—The record transfer control renders the decision as to whether or not any discrete record read from the input tape shall be transferred to the output tape during any one pass of the input tape. The circuitry of the record transfer control is shown in Figs. 29*c*, 29*d* and 29*e*, and the same is adapted to receive the "yes" and "no" pulses from the pulse generator, which pulses cooperate with other control pulses in the record transfer control to cause a character to be transcribed to the receiving tape at any given time.

*Bit counter.*—The bit counter as shown at the bottom of Fig. 29*c* consists of an electronic ring counter of seven stages that runs in synchronism with signals transmitted from the "A" head of the pulse generator.

*Bit selection switch.*—As the bit counter rotates it actuates control elements within the various bit selection switches which consist of a series of electronic switches shown directly above the bit counter in Fig. 29*c*. Each position of the bit counter is reflected by a corresponding position of the bit selection switch. The position of the bit selection switches determines which bit within a character is to be processed.

*Character counter.*—The character counter, which is diagrammatically illustrated in Fig. 29*c* of the drawings, consists of two binary decimal counters which are set up under control of the units and tens step switches which will be described at a later point herein. The character counter is impulsed by a carry pulse emitted from the bit counter. Thus, as one character is completely read from the tape, the bit counter will have completed an entire revolution, at which time it will transmit a carry pulse to the character counter. When the character counter in turn emits a carry pulse, a signal is transmitted to the record transfer control and is there utilized in conjunction with the bit selection switches to determine whether or not the particular record under examination is to be transferred.

*Plugboard.*—The plugboard illustrated in Fig. 56 is utilized to program the sorting operation. In the sorter used for purpose of illustration herein, there are ten consecutive programming levels. Each programming level may control the sorting operation on a different field within the record. The program section of the plugboard has six columns of hubs. Two of these hubs marked "T" and "U" are used to select the column on which sorting is to be initiated. A third hub marked "N" may be wired to the number of columns to be sorted. The fourth and fifth hubs may be optionally plugged together to sort on alphabetical data and the sixth hub marked "Stop" is wired to a stop hub to determine the completion of the sorting operation. It will be seen, therefore, that the sorter is flexible as to the sorting field and the length of the field to be sorted, since it is within the operator's discretion to predetermine any column and field length by appropriate plugboard wiring. Furthermore, the plugboard may be wired to sort records from the source reel, either in ascending or descending order, by plugging the "ASC" and "DES" hubs.

*Sorting bit step switch.*—The sorting bit step switch, which is diagrammatically illustrated in Fig. 29*f* of the drawings, consists of a multi-position, multi-step relay with its associated controls. The sorting bit step switch determines whether the sorting circuits are to scan the tape generated pulses for "yes" or "no" bits during any given pass of the record tape, and also the weight within a character which is to be inspected. At the start of any column sort, the sorting bit step switch is always set at its home level so that the bits comprising a character will be sorted in their proper order. The sorting bit step switch advances one position upon the sorting of each bit, and when the switch has advanced through the number of positions by which a character is represented, a complete character sort is recognized and a signal is transmitted to the columns per sort step switch.

*Columns per sort step switch.*—The columns per sort step switch is initially conditioned by plugboard wiring as hereinabove indicated. As columns are progressively sorted under control of the sorting bit step switch, it is necessary for the sorter to recognize the fact that it has sorted such columns, and that consequently fewer columns remain to be sorted. It is the function of the columns per sort step switch, therefore, to count the columns as they are being sorted. As the sorting bit step switch is rotated, as hereinabove indicated, it produces a signal upon the completion of each complete column sort, and this signal is transmitted to the columns per sort step switch, whereby the columns per sort step switch is actuated to reduce its count of the columns to be sorted. The columns per sort step switch which is shown at the left of Fig. 29*g* emits a signal to the control field selector step switch upon completion of the sorting of the number of columns for which the sorter was conditioned by plugboard wiring.

*Control field selector step switch.*—The control field selector step switch is in effect the programming device for the sorter. Upon initiation of any sorting operation, the control field selector step switch is reset to its normal home position and will emit signals from program level #1 as shown in Fig. 56. Thus it can be seen that upon initiation of a sort under control of program level #1, as conditioned by the control field selector switch, a sort length is determined by the columns per sort step switch. Thus the sorting bit step switch controls sorting within a character, upon completion of which the columns per sort step switch is advanced to indicate one less position to be sorted. When the columns per sort step switch indicates that all the columns to be sorted on in this program level have been completed, it will emit a signal to the control field selector step switch which will advance this switch to the second program level. In the example shown in Fig. 56, the second program level is wired to the stop hubs, and this is an indication to the sorter that the sorting operation is completed. Instead of having wired the plugboard to stop sorting operations upon completion of program #1, the operator might have wired the plugboard to sort upon a second field. The control field selector step switch, which together with its associated controls is shown at the right of Fig. 29*g*, is a multi-position, multi-step relay and its associated control circuits.

*Units and tens step switch homing relays.*—The units and tens step switch homing relays consist of a diode network and relays which are shown in Fig. 29*k*. As shown in Fig. 56, program level #1 hubs marked "T" and "U" for tens and units are wired to optional positions in the panel sections marked "Tens" and "Units." The units and tens step switch homing relays interpret the plugboard wiring at the start of any sorting operation into such form that the units and tens step switches will be set up to cause the machine to sort any desired units column. The wiring from program level #1 to the hubs in the "Tens" and "Units" section of the plugboard indicate that the units column on which sorting is to be performed is column fifteen, since the units "5" hub and the tens "1" hub are connected into the program section of the board.

Figure 26:
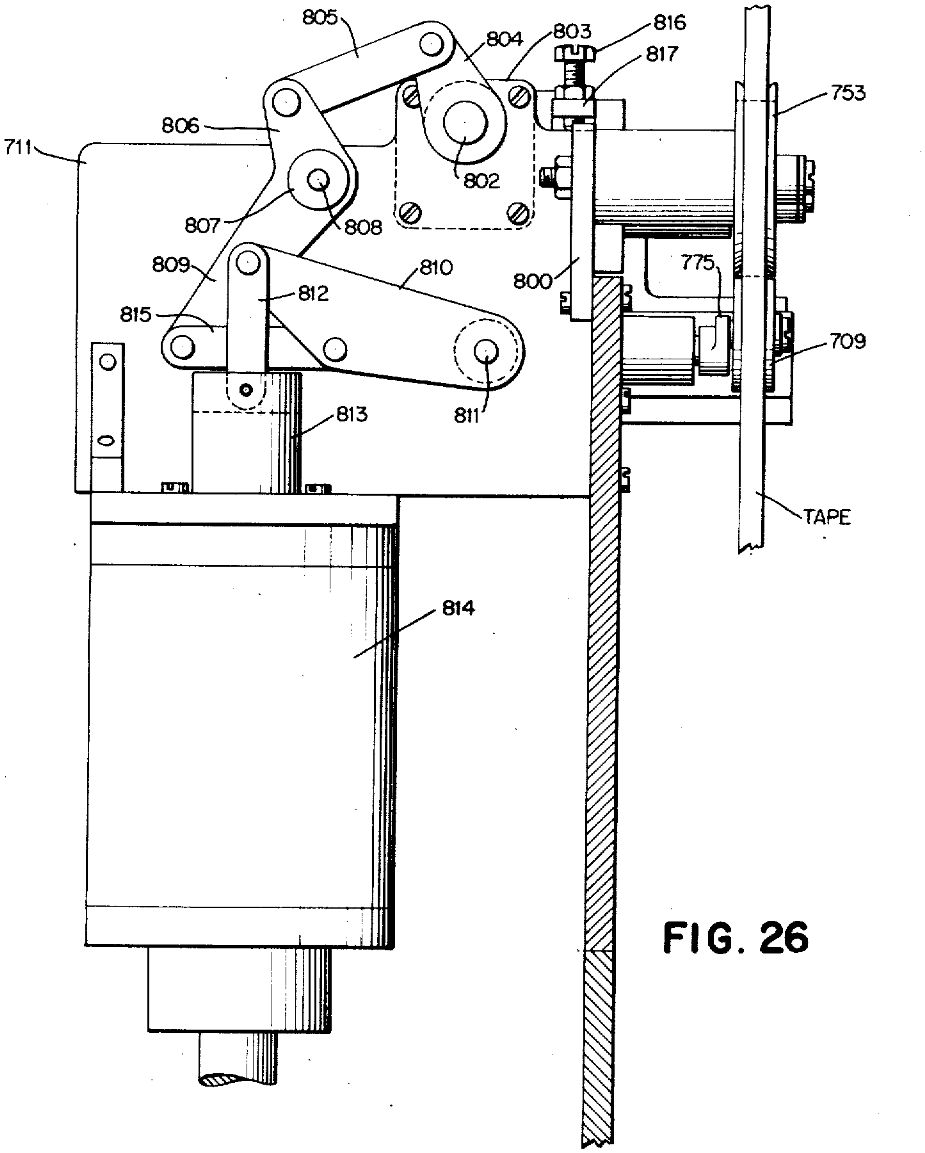
Fig. 26 is a side elevational view taken on line 26—26 of Fig. 22.

*Units and tens step switches.*—The units and tens step switches which are shown diagrammatically in Fig. 29*h* of the drawings accept signals from their respective units and tens step switch homing relays in the initiation of an operation. At the start of a sort, the control panel through the homing relays will position the units and tens step switches in such manner that the output of these switches will preset the character counter so that when the column to be sorted is sensed, the character counter will produce a carry signal. These switches remain idle during the time when tape is being driven through the sensing heads. While the record is being sensed, however, the character counter will keep pace with the characters as they are read off the tape. Upon recognition of the end of a record, the unit and tens step switches are interrogated and used to preset the character counter. When the first column of sorting has been completed, as determined by the sorting bit step switches, the units position step switch is advanced to indicate the next column to be sorted. Thus if, as shown in the example of Fig. 26, column fifteen were the first column to be sorted, upon completion of the sorting of column fifteen the units step switch would advance to indicate column fourteen as the next column on which the sorting operation is to be performed. This operation will continue until such time as the columns per sort step switch indicates to the control field selector step switch that the sort performed at this particular program level is completed. Upon sensing the completion of the sort, the control field selector step switch will advance to the second program level and will cause the step switches to return to their home position. The home positions of the units and tens step switches are determined by the plugboard wiring by way of the units and tens step switch homing relays, as heretofore described. Thus as the control field selector step switch is advanced to the second position, if a second field is to be sorted, the second program level hubs wired to the units and tens step switch homing relays will now indicate a new homing position for the units and tens step switches, thereby conditioning the switches to control sorting on the second field.

*Tape control matrix.*—The tape control matrix comprises the relays and their associated circuits shown at the top of Fig. 29*m*. As may be seen, the tape control matrix consists of a set of relays and relay controls under control of the sorting bit step switch for the purpose of determining within the transfer controls which tape drive is to be the input unit and which tape drive is to be the output unit.

THE SORTING CONTROLS

In order to more clearly comprehend the sorting sequence which is to be described hereinbelow, it may be appropriate at this time to consider very briefly the function of the sorting control circuits without reference to any of the overall programming or tape drive control circuits.

The first character in any record is a field mark (FM), and the last character in any record is always a record mark (RM). The last character on a tape is a tape mark (TM). The record can be of any length.

Figures 12, 13:
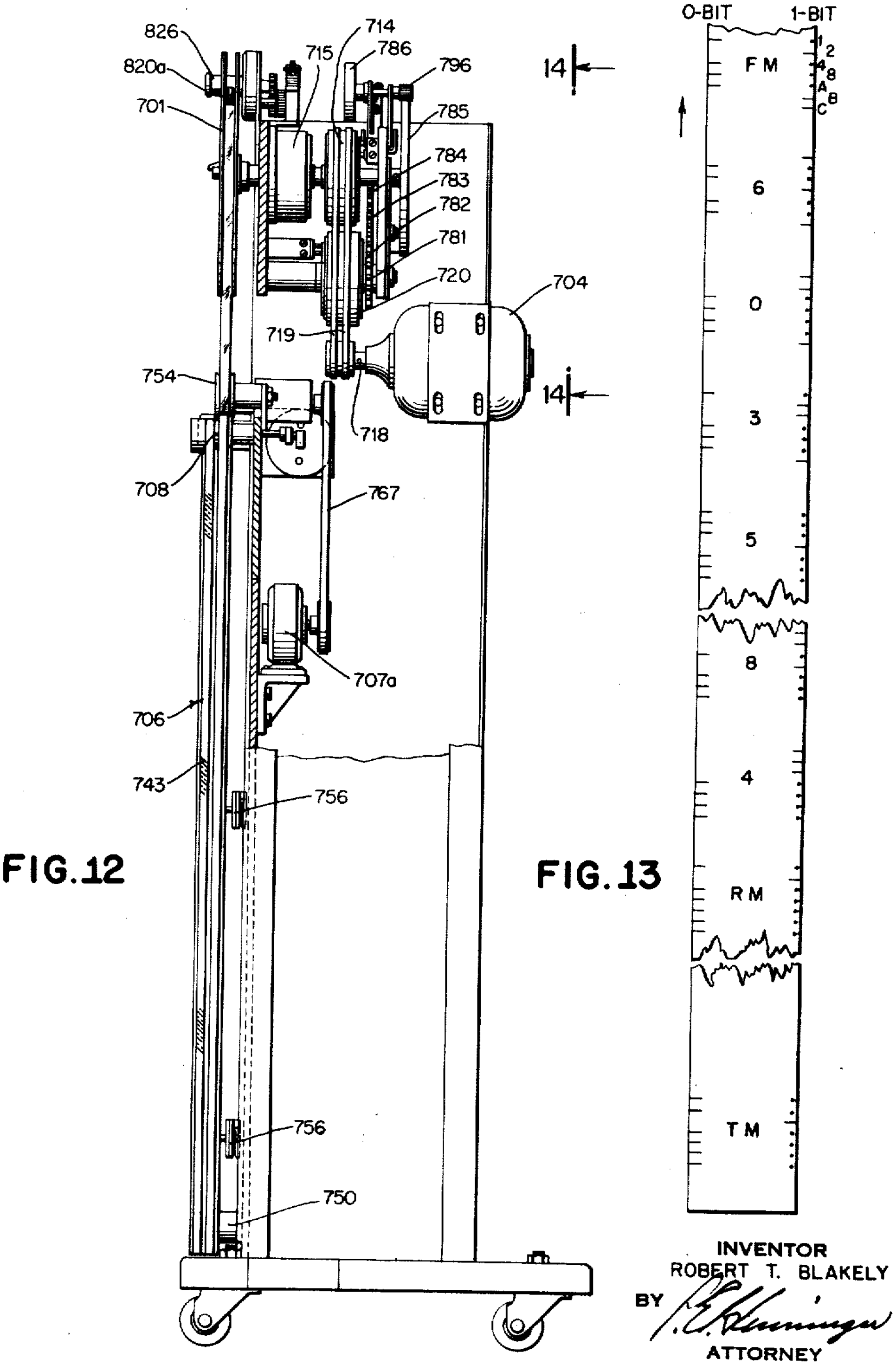
Fig. 12 is a side elevational view taken from the right of Fig. 11.
Fig. 13 is a section of tape on which records have been magnetically recorded in modified binary bits along opposite edges of the tape.

Any character, whether alphabetic or numeric, as mentioned hereinbefore, is indicated by a combination of "yes" and "no" bits, these bits being disposed in two separate tracks on the tape. As shown in Fig. 13 of the drawings, the "yes" bits may be disposed along one edge of the record tape, while the "no" bits are disposed along the other edge thereof.

The arrangement of the "yes" and the "no" bits in a time scale will determine the character. Thus, for example, a field mark, the first character in the first record, will be comprised of a "no" bit, a "yes" bit, three more "no" bits and two more "yes" bits in the order named. The sorter will recognize this special character as a field mark. Following the field mark, there may be numeric or alphabetic information, which is presented to the sorter by the bit values or weights for sensing purposes.

The space between any two characters on a tape is approximately three times the space between any two bits. This three bit space is sensed by the sorter circuits and recognized thereby as the end of a character. For this reason it is quite important that the spacing of characters on the tape be reasonably accurate. The sorter will recognize the space between characters, and as such will cause the character counter to add one, indicating that the first column has been sensed. This cycle is repeated throughout the entire length of the record. The record may be of any length whatsoever. In the instant embodiment, however, it is limited to 200 columns because of the counter capacity utilized herein. The sorter herein is designed to first recognize two successive record marks. The purpose of these successive record marks is to eliminate any random noises that may be on the tape, such as a partially erased recording from a previous operation. When a double record mark is sensed, it conditions the machine to accept any further information that may follow on the record being read.

The first character bit is sensed by head "A" (tape unit #1, Fig. 21) and the pulse is passed through the tape unit transfer controls, through the head "A" of the pulse generator, through the bit counter, through the bit selection switch, and to the record transfer conrtols.

The tape unit transfer controls determine the selection of one tape drive as the reader and the other as the writer. Having selected the reader tape drive, the tape unit transfer controls send the pulses from the reader unit head "A" into the pulse generator. The pulse generator is essentially a pulse clipper which conditions the pulses for further processing in the sorter. The pulse that is sensed from head "A" goes to the bit counter, which in essence is an Overbeck ring counter designed to keep step with the bits as they are read off the tape. There are seven stages in the ring, one for each bit of a character.

The pulses are next fed into the bit selection switches which are mechanical switches preset at the start of an operation. At the start of a sorting operation the bit selection switch is manually set by depressing a reset key. Thereafter, the switch operates automatically. The bit selection switch stays in one position for one complete sorting pass (two passes of the input tape). At the end of a complete pass, this switch is automatically advanced to the second position. It is desired to sort on the first bit, and when that is complete, to advance to the second, third and fourth bits, etc.

The record transfer control is a switching unit including an electronic trigger that controls further operation of the machine. The record transfer control includes start and stop circuits for the tape drives. The last unit of the sorter to be considered at the present is the character counter, which herein counts up to 200 columns.

Reverting to the sorting operation, when a bit is sensed by head "A" of the tape drive unit, the impulse goes to the pulse generator and from there it proceeds in two divergent directions, i. e. it goes to the bit counter and also to the record transfer control. The record transfer control unit is controlled as shown by the bit selection switches and the character counter, under the influence, of course, of the bit that was just read. If the column in which the bit is read is one to be sorted, this bit will be recognized, and the transfer controls will be operated accordingly. If the bit is not in a column to be sorted, or is not a bit to be recognized, sensing of the bit will have no effect on the sorting circuits.

The first character in the first record, as mentioned before, is a field mark. It can then be assumed that the first column will never be sorted on. When the first seven bits have been read by the sorter, the bits will have been inserted into the shift register and matrix and will there be recognized as a field mark. The bit impulses originated by the tape at head "A" pass through the tape unit transfer controls, through the pulse generator, and to the shift register and matrix. After the seven bits representing a character or a control mark have been sensed, the substantial blank tape section that follows is used for recognition purposes.

The shift register and matrix is an eight trigger unit with a diode matrix tied to the plates of these triggers through cathode followers. As each bit is sensed on tape, it is entered into the shift register and matrix in sequence. With each additional bit entry, the register is shifted vertically one position. At the end of the seventh bit, the register will have shifted into its final position and will now contain that entire character. By means of the substantial space between tape columns, the sorter will generate a bit carry pulse which advances the character counter and also transmits a pulse to the shift register and matrix. This pulse is used as a timer to recognize special characters. The first column in a record character will be recognized as a field mark. The field mark in the first column in all records after the first is used to reset circuits previously set by a record mark for check purposes.

Assuming the second tape column is to be sorted on, the first bit in this column is the one with which the sorter will concern itself during the first pass of the input tape. The pulse generated by the first bit travels via the transfer controls and the pulse generator, to the record transfer control. Since the character counter, in order to sort in this column, must have been preset to condition it to receive the bit being read, it will now be in a position to signal the record transfer controls to check the bit and make a decision on it. If the decision is positive, it will indicate to the sorter that the record is to be transferred to the output tape. If the decision is negative, the record will not be transferred on this pass.

On the very first pass of tape, the machine will scan for "no" bits in the 1-weight position. Thus, if the first bit of the column is a "no," the decision will be positive and the transfer controls will be conditioned to transfer the record. However, if the bit is a "yes" instead, the sorter will reject the record for transfer. For the remainder of the record, no further decision can be made, since in any one pass the sorter is conditioned to process only one specific bit in the column. The remainder of the character record will run through the "A" head without further effect on the sorting circuits.

The last column of a record is invariably a record mark. Throughout the reading of a record, all characters are sensed and entered into the shift register and matrix, and such characters are processed therein for the recognition of special characters. An indefinite number of field marks may be sensed throughout a record. These field marks, however, have no effect on the sorting operation. The very last character in a record, a record mark, is entered into the shifting register and recognized there as a record mark. The record mark is entered into the record transfer control unit, and here initiates processing of the record just read. Thus, if the bit in the first or the second column is a "no" bit, the decision will be positive, and this record mark will result in a determination causing this record to be transferred via read head "B," the tape unit transfer controls, through the pulse generator, and then back through the transfer controls to the output tape head "B" which is now a writer. The record mark previously mentioned may be called record mark A (RMA). This record mark is sensed sufficiently in advance of transfer time, so that the output tape drive unit may be started before the record on the input tape has reached head "B." When this record arrives at head "B," the writer unit, now running, will record the record in question upon its receiving tape. Eventually head "B" will have completed the transfer of the entire record.

The distance between records is approximately an inch of tape. This longer space is used to generate an RMB impulse in the record mark recognizer unit for use in the transfer control unit to stop the writer unit. The head "B" of the record mark recognizer is a timing unit that is sustained by all pulses coming from the tape. Lack of pulses for approximately one character length in time will cause the record mark recognizer to recognize that a complete record has been transferred. During the time that head "B" is reading and transferring a record, the head "A" will start to read the succeeding record on the input tape. The same action occurs in the second record as occurred within the first.

The sorter will sense the first field mark advanced progressively by the character column. As characters are sensed on the tape, the proper column and bits are recognized, and at the end of this succeeding record the record mark will again instruct the output drive to run again or not, depending on whether or not the record is to be transferred. The second record then will control a decision of the sorting circuits, which will indicate to the transfer controls whether to transfer the second record.

Before any sorting operation is undertaken, the control panel is wired by an operator who makes decisions as to what fields are to be sorted, how long the fields are to be, what the units position is and how many fields are to be sorted. There are ten optional program levels or ten different fields, i. e. ten non-consecutive fields, which may be sorted on as determined by suitable wiring of the plugboard. The operator will wire the units and tens controls of the first program level to a number emitter, selecting the units position of the first of the field to be sorted. He will also wire from the field length hub of the program level to the columns of sort control. This wiring indicates to the sorter the first column to be sorted and the number of columns in this field. When the sorter has advanced through the number of columns so selected, it will stop, if no additional programs are wired, and the sort is complete. Wiring the program level units sort control sets up internal relays in the units stepping switch. The plugboard is set up in decimal form, numbers being from zero to nine.

The units and ten stepping switch units are used to preset the character counter in such manner that the column to be sorted will be recognized within each record sorted. However, in order to set the units and tens stepping switches to the proper position, these relays must be advanced to recognize the number or column plugged on the control panel. The system used on the control panel, for simplicity in wiring, requires only that one number be plugged. However, for the units and tens step switches, the converse is necessary. The conversion from the information on the plugboard to the information required in the stepping switches is accomplished by the units and tens step switch homing relays. The first column or units column to be sorted on has therefore been selected on the plugboard.

It is also necessary to determine the length of the field to be sorted, and this is done by wiring from the field length hubs on the program units to the columns of sort hubs. The columns per sort step switch unit is essentially a column sort counter which maintains memory of how many columns remain to be sorted in the particular field being programmed. The program unit is shown in Fig. 1 as the control field selector step switch. If consists of ten levels shown on the plugboard, each of which may control a distinct sorting operation.

The alphabetical, numerical sorting controls are under control of the control field selector step switch, also via the plugboard. The control field selector step switch is connected into the sorting bit step switch. The sorting bit step switch has two controls from the plugboard and several internal controls. The plugboard determines whether the sort is to be made in ascending or descending order and also whether the sort is alphabetical or numerical. The sorting bit step switch determines which bit is to be sorted in the operation about to be performed or then being performed. Thus, when a sorting operation is first initiated, the interest may be in the "yes" bits of the column to be sorted. After the first complete pass of sorting, the sorting bit step switch is advanced to its second position, and from this position causes the machine to sort on the second bit of the same sorting column. If the plugboard is wired for numeric sorting, the sorting bit step switch will automatically home itself back to the first bit after the fourth pass of sorting on one character has been completed and cause the columns per sort to be decreased by one, thereby indicating to the sorter that one complete column of sorting has been completed. The sorting bit step switch includes a relay that controls which half of a bit pass is being performed. Thus, on the first half of a bit sort, the machine will scan for all records containing a "no" in the bit position being sorted on. These "no" values effect the record transfer control and cause appropriate transfers to the output tapes. When the first half of a bit sort is completed, the relay will transfer and cause the sorter to sense for all "yes" bits being sorted on and cause the transfer of records containing a "yes" bit. When a record transfer is completed, one bit has been completely sorted and the sorting bit step switch will be advanced to cause sorting on the 2-weight bits. It is seen, therefore, that the sorting bit step switch locates the particular bit being operated on and designates whether the "yes" or "no" pulse is to control the transfer of data to the output tape.

THE SORTING CYCLE

Figure 3:
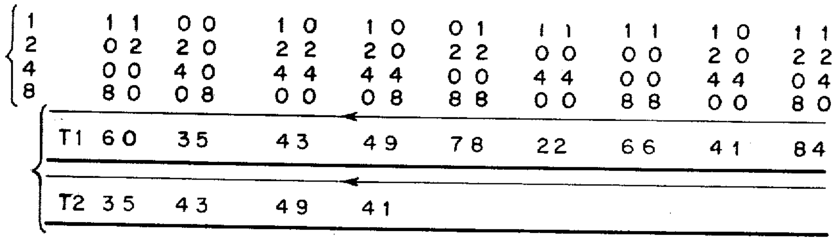

In the drawings Figs. 3 through 10*a* illustrate the manner in which a sort is performed on a series of two digit numbers. In Fig. 3 tape T1 has arranged thereon in random fashion the numbers 60, 35, 43, 49, 78, 22, 66, 41 and 84. Assuming that it is desired to arrange these randomly recorded numbers in ascending order and the sorter has been programmed for such re-arrangement, the sorting circuits will first examine each of the unit digits to determine the presence of a "yes" or "no" bit in the 1-weight representation thereof on tape T1. In these various figures of the drawings the bit value of each digit in the upper of a pair of tapes is indicated to simplify an understanding of the sorting procedure. Thus, in Fig. 3, according to the binary code modified by excess-threes, the digit "6" will contain a "yes" bit in the 1-weight and 8-weight, the "0" will have a "yes" bit in the 1-weight and 2-weight, the "3" will have a "yes" bit in the 2-weight and 4-weight, the "5" will have a "yes" bit in the 8-weight, the "4" will have a "yes" bit in the 1-weight, 2-weight and 4-weight, the "9' will have a "yes" bit in the 4-weight and 8-weight, the "7" will have a "yes" bit in the 2-weight and 8-weight, the "8" will have a "yes" bit in the 1-weight, 2-weight and 8-weight, the "2" will have a "yes" bit in the 1-weight and 4-weight, and the "1" will have a "yes" bit in the 4-weight, while all the other weight bits in the respective characters are represented by a "no."

During the first pass of the file tape T1 in Fig. 3, the unit values of each group of numbers are sorted on for the 1-weight bit, and those which contain a "no" in the 1-weight are transferred to tape T2 in the order in which they are encountered. Thus the "no" bits in the 1-weight of the unit digits "5," "3," "9" and "1" will result in the transfer of the numbers 35, 43, 49 and 41. Tape T2 is now stopped and tape T1 is rewound. Both tapes are again run and all of the number groups of T1, whose unit digits are represented by a "yes" in the 1-weight thereof, are transferred. This results in the transfer of the numbers 60, 78, 22, 66 and 84 as shown in tape T2 of Fig. 3*a*. Both tapes are now rewound and tape T1 is either replaced by a blank tape or erased for use as an output tape.

Whenever an input tape is to be used as the output tape for a succeeding sorting pass, the record thereon is erased as it passed under the "erase head" during such succeeding pass.

Figure 3A:
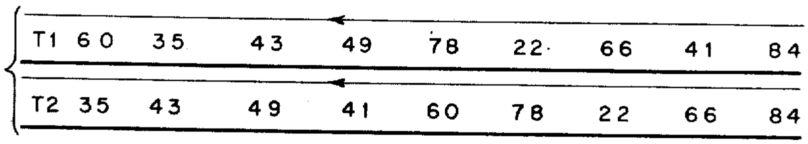
Figure 4:
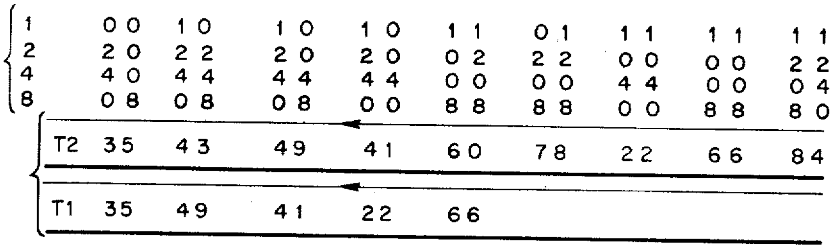
Figure 4A:
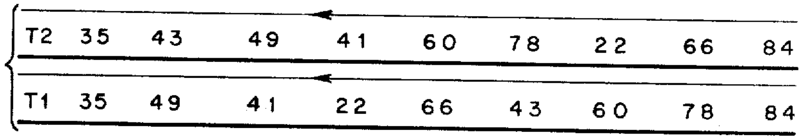

Tape T2 of Fig. 3*a* now becomes the file or input tape and tape T1 becomes the record or output tape. The second sort on the unit digits of the numbers on T2 in Fig. 4 now proceeds to an examination for a "no" in the 2-weight, and all units having a "no" therein are transferred to T2. This results in the transfer of the numbers 35, 49, 41, 22 and 66 as shown in T1 of Fig. 4. Tape T1 is now stopped and tape T2 is rewound. Both tapes are now run again to transfer all of the numbers having a "yes" in the units 2-weight thereof, and this results in the transfer to tape T1 of the numbers 43, 60, 78 and 84 as shown on tape T1 of Fig. 4*a*. Tapes T1 and T2 are now rewound.

During the 4-weight sort, which is to follow, tape T1 is again the file or input tape and tape T2 is the receiving or output tape. During the first pass of the tape in the 4-weight sort, the unit digits of the numbers on tape T1 are examined for the presence of a "no" in the 4-weight thereof, and all numbers on tape T1 which contain a "no" are immediately transferred to tape T2. This results in the transfer of the numbers 35, 66, 60 and 78 as shown on tape T2 of Fig. 5. At this point tape T2 is stopped and tape T1 is rewound. During the second pass of the 4-weight sort, all the numbers having a "yes" in the units column will be transferred to tape T2. This results in the transfer of numbers 49, 41, 22, 43 and 84 as shown in tape T2 of Fig. 5*a*. At this point the tapes are rewound.

When the sorting operation proceeds to the 8-weight sort, tape T2 becomes the input tape and tape T1 becomes the receiving tape. During the first pass of the 8-weight sort, the unit columns of tape T2 will be sensed for the presence of a "no" in the 8-weight, and all numbers having a "no" in their units columns will be transferred to tape T2. This, as may be seen in Fig. 6 of the drawings, results in the transfer of the numbers 60, 41, 22, 43 and 84. Tape T1 is now stopped and tape T2 is rewound. Both tapes are now again started on the second pass of the fourth sort and all numbers on tape T1, which were not previously transferred, i. e. those having a "yes" in the 8-weight of their units column, will be transferred to tape T1. During this pass the numbers 35, 66, 78 and 49 will, therefore, be transferred and tape T2 will have the data arranged thereon with the units arranged in ascending order as shown in Fig. 6*a*, i. e. the numbers on tape T1 at the end of the 8-weight sort will be arranged as follows: 60, 41, 22, 43, 84, 35, 66, 78 and 79. It will be noted that all of the unit digits of the several number groups are arranged in ascending order.

Figure 7:
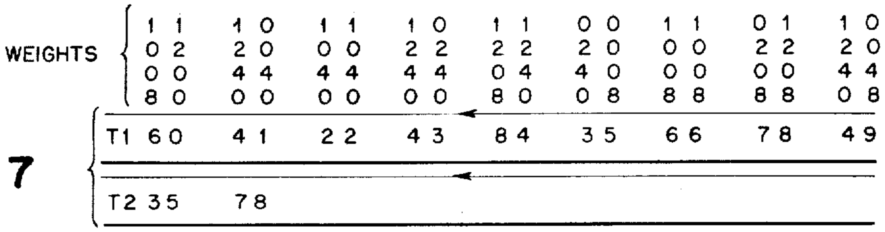
Figure 7A:
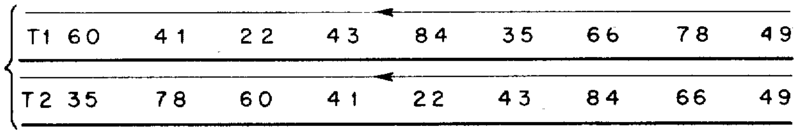

In order to complete the sorting operation, it is merely necessary to sort the "tens" digits in the same fashion in which the "units" digits were sorted. The "tens" sort is shown in Figs. 7 through 10*a*. In Fig. 7 the number groups are arranged on tape T1 which is the same as tape T1 shown in Fig. 6*a*, and as tapes T1 and T2 are now run through the sorting operation the "tens" digits are examined for the presence of a "no" in the 1-weight bits with the result that during the first pass of the "tens" sort the numbers 35 and 78 are transferred to tape T2, these being the only numbers having a "no" in the 1-weight bit of the "tens" digits thereof. Upon transfer of the numbers 35 and 78 to tape T2, tape T2 is stopped and tape T1 is rewound, after which both tapes are again run on the second pass of the sort, wherein all of the numbers having a "yes" in the 1-weight of their "tens" column will be transferred. During this pass the numbers 60, 41, 22, 43, 84, 66 and 49 will be transferred onto tape T2 as shown in Fig. 7*a*.

Figure 8:
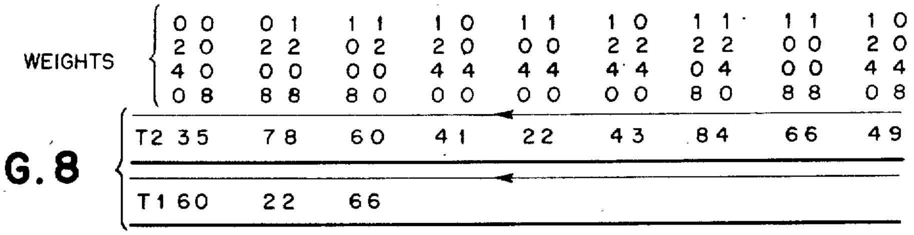
Figure 8A:
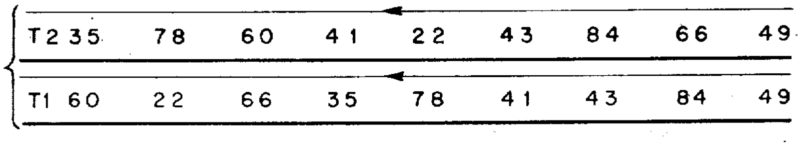

At this point both tape T1 and tape T2 are rewound. Tape T2 now becomes the input tape and tape T1 becomes the output or receiving tape, and the sorting operation proceeds to the 2-weight sort in the "tens" columns, transferring all numbers in which a "no" in the 2-weight bit is recognized in the "tens" column, i. e. 60, 22 and 66 as shown on tape T1 of Fig. 8. At this point tape T1 is stopped and tape T2 is rewound, after which both tapes are again started for the second pass of the 2-weight sort on the "tens" column. During this pass all of the numbers on tape T2 in which a "yes" is present in the 2-weight bit in the "tens" column will be transferred into tape T1. This results in the transfer of numbers 35, 78, 41, 43, 84 and 49 as shown on tape T1 of Fig. 8*a*. Tape T2 and also tape T1 is rewound at this point preparatory to the first pass on the 4-weight sort in the "tens" column.

During the first pass of the "tens" 4-weight sort, the number groups having a "no" in the 4-weight of the "tens" column will be transferred to tape T2, i. e. the numbers 60, 66, 78 and 84. Tape T1 is now rewound while tape T2 is stopped. Upon the following pass, i. e. the second pass of the 4-weight sort in the "tens" column, those numbers containing a "yes" bit in the "tens" column will be transferred, and this results in the addition to tape T2 of the numbers 22, 35, 41, 43 and 49 as shown in Fig. 9*a*. Both tapes are now rewound.

The first pass of the final sort, i. e. the 8-weight sort on the "tens" column, is now started. Tape T2 of Fig. 9*a* now becomes the input tape as shown in Fig. 10, and during the first pass of the 8-weight sort all of the numbers having a "no" in the 8-weight bit of the "tens" column will be transferred as shown in tape T1 of Fig. 10, wherein the numbers 22, 35, 41, 43 and 49 have been brought over onto tape T1. At this point tape T2 is rewound, while tape T1 is stopped. Now all of the remaining numbers of tape T2, i. e. those numbers in which the sorter recognizes a "yes" in the 8-weight of the "tens" column thereof will be transferred to tape T1. This results in the bringing over of the numbers 60, 66, 78 and 84. Tape T1 of Fig. 10*a* now has recorded thereon the numbers which were arranged in random order on tape T1 of Fig. 3 as follows: 22, 35, 41, 43, 49, 60, 66, 78 and 84. In other words, the randomly recorded numbers on the original file tape after a series of eight sorts have been rearranged in ascending order.

THE SORTING CIRCUITS

The operator has just set up the plugboard, has placed an input and an output tape in the machine and is about to begin a sorting operation. By depressing the reset key, the sorter is conditioned to begin a sorting operation. The operator then depresses the start key. At this time the T1—T2 relay (Fig. 29) is down, since this is its normal position. When the T1—T2 relay is down, T1 is the reader and T2 is the writer. The reader unit will now run until it senses information and passes it. The pulses originating at T1, head "A," go through the read amplifiers on the tape frame, and to pin 5 of either of a pair of inverters 10 or 12. Let it be assumed that the first bit is a "yes" and that the pulse thereof goes to the inverter 10. The inverter 10 will remove any noise generated on the lines and invert the pulse from its associated amplifier. Pin 7 of the inverter 10 is connected to a relay point 26*a* and pin 7 of the inverter 12 is connected to a relay point 28*a*. Reading head "A" of T2 may also be generating pulses when T2 tape drive is running. Such pulses will be amplified through their associated amplifiers and run into associated inverters 14 and 16 by way of pins 5 thereof. From inverter 14 (pin 7) the signal is transmitted to a relay point 26*b* where it is inoperative, and from inverter 16 (pin 7) pulses may be transmitted to a relay point 28*b* where they are likewise inoperative. If the signal from the reader T1 is a "yes," it will be transmitted from a relay contact 26*c* to pin 3 of an inverter 34 (Fig. 29*a*), and also to an inverter 38 (pin 3). If the signal is a "no" it will be transmitted from a relay contact 28 to the inverters 36 (pin 3) and 40 (pin 5). The inverters 34 and 36 likewise clean up any stray noises within the relay contacts 26*c* and 28.

The outputs of the inverters 34 and 36 are fed into peakers 42 (pin 4) and 44 (pin 4). The peakers 42 and 44 convert long, slow input pulses into short, high speed pulses. The output of the peakers 42 (pin 9) and 44 (pin 9) is in turn fed into switch units 46 (pin 9) and 48 (pin 9), respectively. These two switches are also under control of a pass rewind relay 50 (Fig. 29*a*). While the machine is running in a sorting operation, relay 50 is in its normal position conditioning the switches 46 and 48 to allow pulses generated by the peakers 42 and 44 to pass through them and further into the machine circuits.

During the rewind operation the points of relay 50 are transferred and therefore at such time cut off the switches 46 and 48, preventing further processing of any pulses generated in the circuits heretofore described. The switch 46 (pin 4) transmits a "yes" pulse, when one is sensed during sorting, to pin 4 of a trigger 52 (Fig. 29*b*). If the bit read from the tape is a "no," the pulse will be transmitted from switch 48 (pin 4) to pin 6 of trigger 52 (Fig. 29*b*). From switches 46 (pin 3) and 48 (pin 3) the signals are transmitted to a pair of inverters 54 (pin 5) and 56 (pin 3) (Fig. 29*c*).

Trigger 52 is a short time memory device adapted to retain the character of the last bit read from the tape.

The pulses that have been sent to the inverters 38 and 40 (Fig. 29*a*) emerge from their output pins 6 or 7, respectively, and are transmitted to pin 4 of a single shot multi-vibrator 57 and also to an inverter 58 (pin 3). The single shot multi-vibrator 57 will produce a short time delay allowing the "no" or "yes" generated pulse to go through and operate the trigger 52 (Fig. 29*b*) before the setting of the trigger 52 is tested. From the output pin 7 of the single shot multi-vibrator, an impulse is fed to a peaker 60 (pin 4) to produce a high speed signal. The peaker 60 produces an impulse on its pin 9 and transmits it to a switch 62 (pin 9). The operation of the switch 62 is identical to the switching operation previously mentioned in respect to switches 46 and 48. The switch 62 produces an impulse on its pin 4 that is used to test the setting of the trigger 52 (Fig. 29*b*) and to cause the shifting of the character register as will be more fully pointed out hereinafter.

The character register consists of seven triggers, 64, 66, 68, 70, 72, 74 and 76 (Fig. 29*b*). The character register is designed to store complete characters in order that special characters may be recognized. Its method of operation is to test the setting of all triggers at any time that a shift signal is introduced. Previously trigger 52 had been set to either "no" or "yes" by the signal from the tape. Assuming that up to this time no signals have been received by the register, the seven triggers in the register will, under this condition, be in their off position, and consequently the first shift signal from switch 62 (pin 4) will test the setting of the trigger 52 and cause the trigger 64 to be set identically.

Assuming now that a second pulse has been generated in the tape reading heads and transmitted through their associated circuits, this sensed signal, either a "no" or a "yes" will set the trigger 52 accordingly. In turn its shift pulse, generated by the single shot multi-vibrator 56, will come through after a time delay and once again cause shifting of the entire character register. At this time, however, one bit is standing in the register, i. e. the preceding bit. It is now necessary to shift the bit that is present in the register while the second bit is entered into the first register position. This is done again by the shift pulse. The second shift pulse will cause the first bit that was stored in the trigger 64 to shift to the trigger 66, and will cause the bit in the trigger 52 to be transferred into the trigger 64. The five succeeding pulses will continue this shifting movement, until the register is completely filled. The register is filled when one complete column on the tape has been read.

The character register, when it has all seven bits of a character in it, sets up a recognition matrix 90 (Fig. 29*b*), subject to test for special character. The character register triggers 64 through 76 set up associated cathode followers 78, 80, 82, 84, 86 and 88, respectively, in accordance with the condition of the respective associated triggers themselves. Thus, if the trigger 66 is on, the cathode follower 78 will set up voltages on its output corresponding to those of the trigger. The cathode followers isolate the load of the recognition matrix 90 from the triggers which are sensitive to load. The cathode followers 78, 80, 82, 84, 86 and 88 are connected to the matrix 90 through a system of diodes in such fashion that if there is a special character (field mark, record mark or a tape mark) in the character register, the diode matrix will produce a positive signal for the operation of one of a plurality of switches 94, 96 or 98. Thus, if the recognition matrix registers positive, indicating a record mark, the switch tube 96 will become positive through its input pin 9. Testing of this signal will be described in greater detail at a later point herein.

The diode network 90 is composed of a matrix of four horizontal conductors and twelve mutually insulated vertical conductors. The horizontal conductors receive power from a suitable source through resistors and diode connections, whereas the vertical conductors receive power from their cathode followers which are under control of the character register triggers. The horizontal conductors and the vertical conductors are connected into a network by crystal diodes in such fashion that a special character is recognized when the conductors are in balance.

Essentially, the recognition matrix scans for four different conditions, the top horizontal line scanning for a "B" zone, the second line scanning for an "A" zone, the third line scanning for no-numeric weights, and the fourth line scanning for the numeric value of 0011. Certain of these conditions are combined at the right end of their bars to form special characters that are being searched for. For example, if a record mark is to be recognized, the first line must sense only a "B" zone, and the third line must sense no-numeric weights. This combination is connected through diodes 90*a* at the right to the voltage source, through a resistor 90*b* and transmits a positive signal to switch 96, indicating the presence in the register of a record mark. Further, if a field mark is to be recognized, a "B" zone in the first line or an "A" zone in the second line, together with a 0011 combination on the fourth line, must be sensed to produce a pulse through a diode and circuit at the right, which in turn furnishes a positive pulse to the switch 98, indicating the presence of a field mark in the character register.

The switch units 94, 96 and 98 are the special character recognition test switches. The input pins 9 of these switch units are all tied back to the special character recognition matrix and will be conditioned when any of the three special characters are recognized by that matrix.

As mentioned previously either a "no" or a "yes" pulse from the inverters 38 (pin 6) or 40 (pin 7) will put an operating pulse on pin 3 of the inverter 58. A peak detector 100 (Fig. 29*a*) is operated by a pulse from pin 6 of the inverter 58. The peak detector 100 has the unique quality of taking a relatively high speed input and converting it to a longer time constant output. In this particular application the time constant of the peak detector 100 is sufficient to overlap the spacing between any three bits on the tape. Therefore, as succeeding bits are read off the tape, they will tend to maintain the peak detector in its operative condition. The plate of the peak detector 100 (pin 7) emits voltage that is in excess of that required to operate a connected trigger at all times that the peak detector is in operation.

As mentioned previously, there is space for approximately three bits between characters on the tape. The peak detector 100 is designed so that if one bit is missing from the tape, the detector will drop before a succeeding bit can be sensed. Thus, the space between characters on a tape is sufficiently long to cause the peak detector to drop and emit an indication pulse. A signal is transmitted from the peak detector 100 (pin 7) to pin 8 of trigger 102. The trigger 102 is so biased that it will automatically drop into the "off" position unless held in the "on" position. The output of the peak detector 100 (pin 7) is such that while held energized by input pulses from the tape, it will hold the trigger 102 in the "on" position. When eventually due to lack of tape pulses the peak detector 100 is allowed to drop, it in turn will also allow the trigger 102 to drop. When the trigger 102 drops, a pulse is generated (pin 4) and transmitted to a peaker 104. The peaker 104 is used to convert a slow speed pulse into a high speed pulse. Thus, a high speed test pulse is transmitted from the peaker 104 (pin 6) to the input controls of the switches 94, 96 and 98 (Fig. 29*b*) to test the special character recognition matrix for the presence therein of any one of the four special characters. The manner in which these special characters are utilized in the sorting operation will be described in detail hereinafter.

When tape T1 is reading a record, tape T2 is conditioned to record data to be transferred, and vice-versa. When the first tape record reaches head "A," it is scanned and a decision is made to transfer or not to transfer the record. From the T1 "B" head, the characters in the record that have just passed the "B" head are amplified through the read "no" and read "yes" amplifiers from which the pulses are fed into a pair of inverters 18 and 20 (Fig. 29). The plates of the inverters 18 and 20 produce a signal which is transmitted to a pair of relay points 30*a* and 32*a*.

Since the T1—T2 relay (Fig. 29) is down, this signal will be allowed to go through these points to operate further circuits. Since T2 has been addressed and its "B" head has tape sliding past it, it is possible that it may sense some noise which may be amplified in the reading circuits associated with the head in T2. Such amplified pulses in the reading head come back to a pair of inverters 22 and 24. The plate signals of the inverters 22 and 24 are transmitted to relay points 30*b* and 32*b*, at which point they are ineffective because the relay T1—T2 is down.

The signals that are sensed by the T1 "B" head are allowed to go through relay contacts 30 and 32 and are fed into inverters 106 and 108 (Fig. 29*a*). The inverters 106 and 108 are provided to clean up any noise that may have been generated on these lines. The inverter 106 is associated with the "yes" track and its output pin 6 feeds a peaker 110 and also a switch 126. The inverter 108 is associated with the "no" track and produces a pulse which is fed to a peaker 112 and switch 126. The peakers 110 and 112 convert a relatively slow pulse into a high speed pulse. The peakers 110 and 112 in turn furnish these high speed pulses to two switches 114 and 116. The switching control of the two switches 114 and 116 has been previously discussed and is under control of the pass rewind relay 50. The switches 114 and 116 pass pulses only during the time of the sorting operation and not during the rewinding operation.

Switches 114 and 116 produce the "no" and "yes" pulses originally received from the reading head and transmit them to identical inverters 118 and 120 respectively. The outputs of the inverters 118 and 122 are tied together to form an inverter switch. Inverters 122 and 124 block any pulses that are sensed by the T1 "B" head to prevent their transfer if transfer is not called for. Thus, the inverters 122 and 124 condition inverters 118 and 120 to transmit records from tape unit #1 to tape unit #2. The signal from the inverters 118 and 120 is transmitted to a relay contact 128 (Fig. 29) or a relay contact 130. From relay points 128*a* or 130*a* these signals will be transmitted to power inverters 132 and 134. The power inverters 132 and 134 are power units sufficiently strong to drive a high speed pulse from their output pins 4 into the write circuits of T2. The power unit 132 is connected to the write circuits associated with the "yes" track of the T2 tape unit, and the power unit 134 is associated with the "no" track of this same unit. Thus, if a "no" is sensed in T1, the pulse is driven through its amplifiers and its associated circuitry, eventually coming through the power unit 134 and through write circuits associated with the "no" track to write a "no" in the T2 tape drive.

As mentioned previously, a pulse is transmitted from the inverted 106 (Fig. 29*a*) to the peaker 110 and also to the switch 126. Likewise, a pulse is transmitted from the inverter 108 to the peaker 112 and also to the switch 126. The switch 126 combines the "no" values and the "yes" values to produce a string of seven pulses on the output of the switch 126. Therefore, seven consecutive pulses from the switch 126 indicate that one character has been fed out to a peak detector 136. The peak detector 136 is identical to the peak detector 100 previously mentioned, with the exception that the time constant of the former is in the order of one-half millisecond. The peak detector 136 produces a pulse when the lack of a pulse for a prolonged time indicates that the record being read has been ended and has been transferred from T1 "B" head to T2 "B" head. The purpose of the longer time constant of the peak detector 136 is to indicate to the sorter that there is a relatively long time during which no characters have been read from the tape, and this indication is utilized to tell the writer unit that it has completed the operation it has been performing.

Voltage is transmitted from peak detector 136 to a trigger 138 which is identical in structure and purpose to the trigger 102 referred to hereinabove. The output of the trigger 138 is fed to a peaker 140. The peaker 140 is designed to change a relatively slow pulse into a high speed pulse. The pulse emitted by the trigger 140 may be referred to as the RMB pulse. The RMB pulse is effected to stop a write unit and turn off write circuits until the writer drive is later conditioned to resume operation.

The erase head in the tape drive units is controlled by the T1—T2 relay. This head, through the T1—T2 relay contacts 142 and 144 and with a relay 600 (Fig. 29*m*) in series, is connected to the power supply. The relay 600 is operative during non-sorting operations such as rewind, since during such operations it may not be desired to erase tape. Thus, the circuitry for the energization of the erase heads in the write unit of the sorter extends from the power supply through the point 600*a* to relay points 142*a* (Fig. 29), through the 142*a* point to relay contact 142, and from there to energize the erase head directly. Thus, when a tape drive is thrown into a rewind or when the condition of the T1—T2 relay is changed, the erase heads will turn off or erase. In order to prevent any stray induction in that erase head which is not being used in an erasing operation, the points 142*b* and 144*a* are connected together and grounded.

The T1—T2 relay controls the functions of the two tape winding units. As mentioned before, one tape unit is a reader when the other is a writer, and vice-versa. With the T1—T2 relay in its normal, non-energized position, tape drive #1 will be the reader and tape drive #2 will be the writer. At the start of any sorting operation, regardless of whether it is an original sort or a program sort, tape drive #1 will always be the reader. Thus, the operator can be certain that on the initiation of a sort, the master or file tape always goes into tape drive unit #1.

Relay T1—T2 is energized during every even numbered bit pass. Thus, if one column of numeric information is being sorted, on sorting the 1-weight the T1—T2 relay will not be energized. Upon completion of both passes of this entire bit sort, however, the T1—T2 relay will transfer to make tape drive #2 the reader and tape drive #1 the writer. At the completion of the second complete bit sort, the T1—T2 relay will be deenergized again, thus causing tape drive #1 once again to become the reader and the tape drive #2 the writer. For the fourth and final pass of a numeric sort, the T1—T2 relay will once again transfer, causing tape drive #2 to become the reader and tape drive #1 to become the writer. At the end of this pass, a column of sort has been completed. Whether this is the first column or the last is immaterial, as the tape drive #1 always ends up as the writer at the end of a sort. The T1—T2 relays are under the ultimate control of the tape rewind circuitry which will be explained in greater detail at a point hereinafter.

Receipt of information from both "A" and "B" heads of the reader tape has been discussed in preceding paragraphs, and it has been shown how this information is processed for the recognition of special characters and the generation of pulses to be used for record transfer decisions. Also discussed was the transmission of this information through the transfer circuits, from the head "B" of the reader to head "B" of the writer, although the transfer control was not discussed. The erase circuits were discussed, as was the production of the RMB pulse used to stop writing. The processing of the "no" and "yes" bits from the reading head "A" for the recognition of special characters, i. e. record mark, tape mark, field mark and blank mark, has also been considered.

It is now necessary to further process tape derived information to make actual decisions effecting transfer or non-transfer of the records being examined. In this connection it will be necessary to refer to the sorting bit step switch and associated circuitry (Figs. 29*c* and 29*f*). Special characters will to a large extent be used in effecting the decision made by the bits at this time. During the previous discussion of the sensing of information by the T1 "A" head of the reader unit in the "no" or "yes" track it has been shown how these "no" and "yes" values are processed through their amplifiers and through succeeding circuits, and how the pulses eventually arrive at the switches 46 and 48. It has been demonstrated how the impulses from this point are used in the character register and also transmitted to the inverters 54 and 56 (Fig. 29*c*). The bit pulses are, therefore, available at this time. The shift pulses used to shift the character register (Fig. 29*b*) are also available at a series of triggers 146, 148, 150, 152, 154, 156 and 158 (Fig. 29*c*). The triggers 146, 148, 150, 152, 154, 156 and 158 constitute a ring counter, generally of the character shown in Cleeton Patent No. 2,534,232.

Since the shift pulses are a string of seven pulses derived from the "no" and "yes" inputs but delayed in timing, this ring operates in conjunction with the bits coming from the tape being shifted slightly after the "no" or "yes" bit has been tested. Thus, when the first bit is derived from the tape, it will go through its associated circuits, be tested, and after it has been tested the shift pulse will cause the condition of the trigger 146 to be shifted into the trigger 148 to await testing of the second bit. The counter in effect selects the bit of a character to be processed. The sorting bit step switch (Fig. 29*f*) assists in the selection of the bits to be processed, and it also determines whether the "yes" or the "no" shall be the deciding factor. In short, the sorting bit step switch (Fig. 29*f*) operates in conjunction with the triggers 146, 148, 150, 152, 154, 156 and 158 constituting the counter to select the proper bit for processing. The sorting bit step switch in conjunction with a count of tape rewinds also instructs the sorter on whether to scan the tape bits for "no" values or "yes" values to effect transfer.

As sorting progresses the sorting bit step switch will advance from bit to bit until a complete character is sorted. Thus, when the sort is first initiated, the sorting bit step switch will be in its normal home position and the sorter will scan the first bits (1-weight) of all characters in the record. When the first bit sort has been completed, the sorter will reverse itself causing tape drive #2 to become the reader and it will also advance the sorting bit step switch to its second position. At this time the sorter will scan all records for the second bits (2-weight) of each character and once again transfer the "no" or "yes" values as required. At the end of each complete bit sort, the sorting bit step switch will advance one position.

When performing a numeric sort, the step switch advances from the first to the fourth position. Upon advancement to the fifth position, the sorter will recognize this as a complete numeric character sort, causing reset of the sorting bit step switch to the original home position. For alphabetical sort the sorting bit step switch will advance from the first to the sixth position, and upon advancement to the seventh position the sorter will recognize that an alphabetical sort has been completed. In one bit sort the input tape will be passed through the reading heads completely and then rewound. During this pass the records will be scanned for a "no" bit in the weight being sorted on. After the machine has rewound this reel, it will once again pass this tape through the reading heads and this time scan for a "yes" bit in the same weight. At the end of the second pass, both input and output reels will be rewound and the sorter will indicate one complete bit pass. The sorter will now proceed to the second bit (2-weight) to be operated on. Four such operations are required for a numeric column sort, and six for an alphabetical sort.

During the first pass of tape at the start of an operation, the machine is preset to scan the first bit of the records, looking for a "no" bit in the 1-weight. The sorting bit step switch in Fig. 29*f* is shown in its normal home level or "1" position. Since no passes have yet been completed, all other relays shown on this figure are in their normal position. At the end of the first pass of tape, all records with a "no" bit in the 1-weight will have been transferred to the output tape and the reader unit is rewound. When the tape unit rewind is initiated, a contact 288*c* (Fig. 29*f*) is closed and a key trigger 162 is pulled on. The key trigger 162 eliminates any effects due to contact bounce. Once high speed rewind is initiated, the contact 288*c* is allowed to fall back to its normal position as shown and operates or turns the key trigger 162 off again. Trigger 162 produces a negative pulse at this time which is sensed by a trigger 164 (pins 3 and 6). Trigger 164 is a binary trigger and is capable of counting to 2. The trigger 164 serves as a memory of the half of a complete bit pass in which the machine is operating. Thus, before the first rewind, the trigger 164 is in its normal "off" position, and consequently the sorter will scan for "no" bits in the weights. However, when the tape drive #1 goes into a rewind, the trigger 164 will be turned on. Having been turned on, pin 7 of the trigger 164 will go positive, transmitting an impulse to an inverter 168. The inverter 168 acts as a controlled power source to pick up a relay 186. The relay 186 interprets the setting of the trigger 164 and causes the selection of either the "no" or "yes" bit, depending on the trigger status.

Relay points 186*a* (Fig. 29*f*) are in their normal position, indicating the first pass, and consequently the sorter will scan for "no" bits. Thus, a circuit is completed from the power source to the relay point 186*a*, through its normally closed points and to a series of six points on the stepping switch. The points on the stepping switch are connected by a movable brush 192*b* to a center commutator 192*a* via two relay points 184*a* or 184*b* and from Fig. 29*f* to Fig. 29*c*. The further use of these circuits will be discussed at a later point herein. The relay points 186*b* and 186*c* (Fig. 29*f*) are used in rewind control and will be discussed at a later point herein.

The step switch has not yet been advanced. Upon completion of the first rewind of T1, the sorter will automatically restart itself and scan the input signals for the "yes" in the bits being scanned. During the first pass the tape was scanned for the "no" bits, and now due to the picking up of the relay 186, the process is reversed and the tape will be scanned for "yes" bits. Upon completion of this pass, all valuable information on the original input tape will have been transferred from tape T1 to tape T2, and both tape units will now proceed to rewind the tapes therein. Once again the contact 288*c* is transferred and the trigger 162 is operated to produce an impulse to energize the trigger 164. The trigger 164, as previously mentioned, is capable of counting two, and now since the trigger 162 has been operated a second time it will revert to its original status. In reverting to its original state, the pulse on its output pin 7 will control the inverter 168, which in turn will cause the relay 186 to drop. Therefore, during the next tape pass, the sorter will again scan tape for "no" bits.

The trigger 164, however, has initiated an impulse at this time that is transmitted to an inverter 166. The inverter 166 inverts the pulse received from the trigger 164 and transmits a pulse from its output pin 7 to a thyratron 170. The thyratron 170 is a power unit capable of passing sufficient current to operate a relay 172. The thyratron 170 has a current limiting network that acts as a buffer to prevent excess arc across the points of the relay 172. The relay 172 is the sorting bit step switch operating relay. Thus, upon energization of the coil of the relay 172, the step switch is advanced one step to the second level. The circuit of the relay 172 is completed from the thyratron 170 to the relay, through the relay to and through relay points 180*b*, to and through relay points 178*b* to the power supply.

The relay 172 has a self-interrupting contact 172*a* so that when the relay is fully energized and the relay is transferred, contact 172*a* will also transfer, breaking the circuit for the relay 172 and causing it to be deenergized. The nature of the thyratron 170 is such that once fired it will maintain the arc within the tube regardless of the controlling grid, and when extinguished, it will not fire again until an impulse is transmitted to its control grid. During the time the relay 172 is energized, the control of the thyratron 170 has ceased to control the tube and, therefore, when the relay point 172*a* is interrupted the thyratron arc will be broken, thus deenergizing the thyratron 170. Since the control on the thyratron 170 no longer conditions this tube to fire, the relay 172 will not be reenergized. Thus, the net result of the operation is to advance the sorting bit step switch one level. With the sorting bit step switch in the second level, the circuits will be conditioned to scan the second bit (2-weight) of the columns to be sorted.

Upon initiation of a sort, the sorting bit step switch is in its first level, and therefore a circuit is completed from the power supply through relay points 180*c*, through a commutator brush 196*b* and along the line connected to it to a switch 200 (Fig. 29*c*). Since this commutator brush is resting on the level "1" contact, it is obvious that the next five levels above are disconnected from the power source, since only one connection may be in existence at any one time. As a consequence of this, a series of switches 202, 204, 206, 208 and 210 (Fig. 29*c*) do not receive a signal, and consequently are cut off. As characters are sensed from tape, they are transmitted from the switches 46 and 48 (Fig. 29*a*) to the inverters 54 and 56 (Fig. 29*c*), and the shift pulse is generated and impressed on the ring counter triggers 146, 148, 150, 152, 154, 156 and 158 (Fig. 29*c*). The normal position for these ring triggers 146, 148, 150, 152, 154, 156 and 158 is when the trigger 146 is energized. Thus, the first bit coming from tape will get through either inverter 54 or 56, depending on whether the impulse represents a "no" or a "yes" bit, to switches 212 or 214. Since the shift pulse has not yet been generated, the trigger 146 is still in its energized position, and as a consequence its signal is transmitted through the switch 200 to an inverter 216. The output of the inverter 216 controls the switches 212 and 214. Thus, any signal received by either of the switches 212—214 during the time that the trigger 146 is on will be allowed to pass through these switches to a trigger 218.

After the first signal from the tape has produced its shift pulse, the trigger 146 is turned off and the trigger 148 is turned on. However, due to the fact that the sorting bit step switch is in its first level when the second pulse is sensed by the reading heads, this pulse will not get through the switches 212 and 214 because their input control pin 9 has now cut them off. Therefore, it can be seen that the sorting bit step switch in conjunction with the ring triggers 146, 148, 150, 152, 154, 156 and 158 controls which bit sensed from tape can get through to operate the trigger 218. The output of the switches 212 and 214 is connected to the trigger 218 in such a manner that a "no" bit being sensed by the reading head will pull the trigger in one direction and a "yes" bit being sensed will pull it in the opposite direction. Thus, the setting of the trigger 218 for the bit being inspected at one time will correspond to the "yes" or "no" character of the bit.

The two output pins 8 and 7 of the trigger 218 are connected respectively to switches 244 and 246. The signal received from the trigger 218 is a relatively long time signal, and acts as the switch for the impulse on the second control, pin 7. The second control on the switches 244 and 246 is tied together and brought back to a single shot multi-vibrator 268. The single shot multi-vibrator 268 provides stability time for the trigger 218 after a bit has been detected.

The single shot multi-vibrator 268 is under control of a column counter carry impulse. The column counter (lower right, Fig. 29*c*) used in the sorter is capable of counting to 100. When the ring triggers 146, 148, 150, 152, 154, 156 and 158 complete one revolution, indicating that a complete character has been sensed from tape, the trigger 148 generates a signal that is sent to the units position of a trigger 220 of the column counter. The counter triggers 220, 222, 224, 226, 232, 234, 236 and 238 act as accumulators for the carry impulses from the bit ring triggers 146, 148, 150, 152, 154, 156 and 158. Thus, for every column sensed the accumulator will add one. The column counter is present via the plugboard circuits to the column to be sorted on. Thus, the accumulation of the bit ring or column carry will cause the addition into this counter of single digits until such time that the column counter emits a carry pulse to an inverter 242. The column counter will be discussed in greater detail at a later point herein. It is enough to say at this time that it will accumulate the count of all columns as they are read from tape, the column to be scanned being the one that causes this counter to carry.

The carry pulse from the column counter is transmitted to the single shot multi-vibrator 268, and from there is transmitted to the switch 244—246 previously discussed. The column counter carry pulse will get through one of these switches and will proceed to an inverter, either 248 or 250, and through either of these inverters it will proceed to the respective switches 252 and 258, or 254 and 256. As previously stated, these switches are under control of the sorting bit step switch. During the first tape pass, as previously discussed, the sorter will inspect an incoming signal and allow it to pass through these switches in such way that if it is a "no" it will indicate transfer, but if it is a "yes" it will indicate no-transfer.

A trigger 262 is set up as the column carry to indicate whether or not the record being scanned should or should not be transferred, and it is therefore under control of the previously mentioned switches 252, 254, 256, 258. During the first tape pass, the switches 252 and 254 are conditioned to let the bit impulse, under control of the counter carry, to proceed through one or the other of these two switches. In Fig. 29*f* the step switch is in its first level as previously mentioned, and therefore its common brush **190*b* runs from the first level to the commutator. A circuit is now completed from the power supply, through the relay point 186*a* to the first switch level 192*a*, to the common brush via the commutator to the relay points 184*a* and back to and into the switches 252 and 254** (Fig. 29*c*). From switches 258 and 256, which are tied together, there is no connection to the power supply, since the relay point **186*a*** (Fig. 29*f*) is in its normal position. Thus, on the first sorting pass of the column the bit to be sorted on is scanned for a "no." The "no" bit scan is determined by the position of relay point **186*a*. The outputs of the switches 252 and 254 are tied to the outputs of switches 258 and 256 which at this time are inoperative. The outputs of all these switches are tied to the trigger 262**.

Thus, if the bit sensed and stored in the trigger 218 is a "no," the output pin 8 of the trigger 218 will be positive and a pulse will be impressed on the inputs of the switch 244 when the counter carries, thereby sending a signal into switch 244, causing it to produce an output to the inverter 248. The inverter 248 in turn will transmit this signal to the switch 252. Since, as has just been determined, the sorter is scanning for "no" bits, this signal will be allowed to pass through the switch 252 and cause a trigger 266 to be turned on. The trigger 266 is the transfer/no-transfer control. If the bit under consideration had been a "yes" instead of a "no," then the trigger 218 would have caused the counter carry impulse to be switched through the switch 246 to the inverter 250, and from there to the switch 254. The switch 254, under these conditions, would produce an impulse which would be impressed on the trigger 262, causing this trigger to be turned off to indicate no-transfer. Thus, if a "yes" is sensed, the trigger will be set to the no-transfer position, as it should be.

In summary, the trigger 218 is set by the bit being scanned to represent the weight of that bit. The trigger controls the direction in which the counter carry impulse will be sent through the switches 252 and 254, through which signals are passed to effect the transfer or no-transfer in accordance with the setting of the trigger 218. Therefore, if the trigger 218 is turned to the "no" position on the first pass through this network, the transfer control trigger 262 will be set to indicate transfer of the record. If the trigger 218 is set in the "yes" position, then the trigger 262 will be set to indicate no-transfer of the record during this pass.

As previously mentioned, when the relay 186 (Fig. 29*f*) is transferred upon completion of the first pass of one sort, the switching matrix 252—258 is essentially reversed so that now the recognition of a "yes" by the trigger 218 will cause the trigger 262 to indicate transfer and the setting of trigger 218 to the "no" position will cause the trigger 262 to indicate no-transfer.

The trigger 262 transmits a signal to a switch unit 264 (Fig. 29*d*). It has been demonstrated previously, in connection with Fig. 29*b*, how special characters are recognized. The switch 96 (Fig. 29*b*) with its associated circuits will recognize the existence in the character register of a record mark, hereinafter called record mark A (RMA). The last character in every record is invariably a record mark, and it is used to designate the end of one record. Since a sorting operation may take place in any portion of a record, the decision made to transfer or not transfer in trigger 262 (Fig. 29*c*) may occur at any random time within the record as determined by the control panel wiring. In order to establish a set time in which to start up the write circuits, the decision to transfer or not to transfer a record is stored in the trigger 262, and this memory is transmitted to the switch 264. Upon recognition of a record mark at the end of a record by the switch 96 (Fig. 29*b*), the record mark impulse is transmitted through a series of circuits, which will be discussed at a later point herein, to this same switch 264, to test the setting of the trigger 262 and cause a trigger 270 (Fig. 29*d*) to be turned on. The trigger 270 via the T1—T2 relay points will cause the write units to be started and the write circuits to be turned on. The input tape drive control circuits will be discussed in greater detail later. The transfer circuits at this time are complete. The signal is transmitted from pin 7 of the trigger 270 to an inverter 272, through this inverter and out of pin 7 to and into the inverters 122 and 124 (Fig. 29*a*). At this time the pulses sensed by the reading head "B" of tape drive #1 will pass through their normal circuits (Figs. 29 and 29*a*), through the inverters 118 and 120, out of their output pins 6 and back through the normal write circuits (Fig. 29) of tape drive #2 to cause writing of a record on the output tape T2. Thus, only when the trigger 270 (Fig. 29*d*) is in its "on" position will the pulses sensed by head "B" of tape drive #1 be allowed to get through its normal circuit and write on tape T2. The trigger 270 is, therefore, the controlling element for the transfer of all data.

Drive of the tape through the read-write heads is under control of a tape clutch which will be described in detail as part of the tape drive mechanism. Starting or stopping the tape at high speed in a very short time makes it necessary to feed to the tape clutch a high voltage, high current operating pulse for a relatively short duration. The clutch circuit will stand a very small amount of current indefinitely, but a large amount of current for only a very short time. Consequently, in order to start or stop tape feed quickly, a high speed, high current pulse is transmitted to the tape clutch whenever its condition is to be changed, i. e. run or stop. The generation of this pulse is under control of a phanastron circuit. The start and the stop mechanism for each tape drive is under control of individual phanastron circuits, making a total of four such control circuits in the machine. The tape clutch circuits for tape drive #1 are illustrated in Fig. 29*j*, while those for tape drive #2 are shown in Fig. 29*j'*. Since these are duplicate circuits, only the former will be described in detail. The corresponding elements of the tape drive #2 controls of Fig. 29*j'* are identified by corresponding prime reference numerals.

In Fig. 29*j* the start phanastron is 274 and the stop phanastron is **274*a*. These units are regenerative in nature and have a pluse duration controllable by potentiometers 276—276*a*, respectively, connected to the power supply. By varying the potentiometers 276—276*a*** the pulses generated by the circuits may be varied. Upon reception of a short negative pulse, these units will automatically generate a timed signal of a duration determined by the setting of the potentiometers. In addition to the high speed, high current pulses required to maintain the clutch in stop or run condition, a low current must be passed through the coil in the proper direction. When the trigger 270 (Fig. 29*d*) is turned on its indicates to an inverter 278 that the write unit should be started; the output pin 6 of the inverter 278 will send an impulse to relay contacts 280 and 282 (Fig. 29*j*). Relay contact 280 is closed and, therefore, this signal will pass through it, to the relay point 288*a* which is closed, since the machine is passing and not rewinding, through the resistor 290 to the tube unit 292. The tube unit 292 uses this input signal to generate signals for emission to several associated units.

To generate a constant small current, the signal is sent from tube unit 292 to the tube unit 320. The tube unit 320 in turn emits a potential to the input of tube 302. The tube 302 forms one section of a clutch coil bridge. The clutch coil 298 operates on the principle of opposing and assisting magnetic fields. There is a current flow through coil 298 in one direction or the other, depending on whether the machine is stopped or running. Normally, while the tape drive is at rest, a tube unit 304 conducts current which passes through a resistor 306, through the clutch coil 298, and through a tube 296 to the power source. This current flow generates a magnetic field which in conjunction with the field set up by a permanent 40 volt field in the yoke of the clutch holds the machine in the stop position. As will be done presently, the current in tubes 304 and 296 will be turned off and the current will be allowed to flow through a tube 300, through the coil 298, through the resistor 306, and through the tube 302 to the voltage supply, thus reversing the current flow and its associated magnetic field. Reversing the magnetic field now causes the coil to move in the opposite direction from which it had been held, i. e. to the run position.

As previously mentioned, the voltage generated in the output of tube 320 conditions the tube 302 to conduct current. From the tube 320 current is transmitted to a resistor 322 and a potentiometer 324. The voltage generated at the tube 320, being inserted into the control grid of a tube 326, causes this tube to conduct, raising the potential at its cathode sufficiently to cause the tube 300 to conduct the normal amount of constant current. Potentiometer 324 is designed to regulate the amount of current flowing through the clutch coil during its steady running condition.

The circuitry just described would move the clutch to the running position and the tape would start slowly. Therefore, the phanastron circuits are operated in order to speed up this operation. The tube unit 292 emits a signal from its left plate which causes the phanastron 274 to produce its timed signal. Tube unit 292 also transmits a signal to a tube unit 294. Tube unit 294 cuts off the normal stop current through the coil by deenergizing tubes 296 and 312, which cuts off tube unit 304. The output of phanastron 274 sends a signal to a tube 314. The tube 314 being energized for the time allowed by the phanastron, will emit a signal from its plate through two glass neon tubes 316 and 318 to the input of the tube 326. The neon tubes 316 and 318 are designed to transmit the maximum size signal to the input of the tube 326, yet retaining bias thereon when the signal is not present. This timed input to the tube 326 will cause its cathode to become more positive for the time of the phanastron impulse and thus condition the tube 300 to conduct a large amount of current during the timed interval. Therefore, since the phanastron now sends its timed pulse to the tube 300, the tube 300 will allow a large amount of current to pass therethrough, through the clutch coil 298, the resistor 306 and the tube 302 to the power source. When the phanastron timed interval has elapsed, the large voltage on the output of the tube 326 will drop to its normal, steady, running voltage, and thus allow a more limited amount of current to pass through the tube 300, thereby limiting the current through the clutch coil 298 to its rated capacity.

When the trigger 270 (Fig. 29*d*) is turned off, the circuits will revert to their normal stop condition. The stop function is identical in nature to the start function with a few differences which will be noted. The tube 292 will generate a signal and transmit it to the tube 294; the tube 294 at this time transmits its output to the bridge tube 296 and also through the resistor 308, and the potentiometer 310 to the tube 312. The cathode potential of the tube 312 will be raised, allowing the tube 304 to conduct current. When this occurs, since the potentials on tube 292 have been reversed, the circuits that formerly allowed current to pass through the clutch coil 298 will be deenergized, preventing further current flow through the tubes 300 and 302. Having energized the tubes 294 and 312, the normal stop current will be allowed to pass through tube 304, resistor 306, to the clutch coil 298, through the tube 296 and to the power source. In order to speed up the stopping operation, the phanastron is once again utilized. Tube 292 also generates a pulse that is transmitted to the phanastron 274*a*.

Tube 336 receives the stop pulse generated by the phanstron 274*a* and transmits it through neon bulbs 338 and 340 to tube 312. This pulse once again raises the cathode potential of the tube 312 to a high level, allowing a large current to pass through the bridge tube 304, the resistor 306, the clutch coil 298, and through the tube 296 to the voltage source, thus insuring a fast stop.

On Fig. 29*j*, the relay points 280 and 282 are points on the T1—T2 control relay. They are used to reverse the addressing of the two clutch circuits (Figs. 29*j* and 29*j'*). The clutch circuit shown in Fig. 29*j* is the clutch circuit associated with tape drive T1. The reader unit is controlled from an inverter 284 (Fig. 29*d*) whose impulse goes to the relay points 280 and 282 where it is switched under control of the pass number.

It can be seen then that as sorting progresses from the first bit to the second bit and the T1—T2 relay is reversed, it will transfer the points 280 and 282, so that at this point the instruction from the write controls 278 (Fig. 29*d*) will now go through point 282 instead of point 280, and cause T2 to be addressed as a writer unit. Likewise, a reading instruction from inverter 284 (Fig. 29*d*) will now go through point 280 and start tape drive #1 as a reader unit.

The rewind points 288*a* and 288*b* are provided to maintain the tape drive clutch in a stop position during rewind. These points are transferred during the rewind operation, and are connected through resistors 342, 344, 346 and 348 in such fashion as to hold the clutch in the stop position. The circuitry used to accomplish this end has just been discussed. Thus, these points remove control of the clutches from the decision circuits during rewind.

As previously mentioned, the decision to transfer or not transfer records is stored in the trigger 262 (Fig. 29*c*). Also mentioned was the fact that this decision may be rendered effective at any point of the record as determined by the plugging of the control panel. In order to standardize on spacing between records, etc., it is essential to establish a definite point at which instructions for transfer or no-transfer will be utilized. Herein the point at which record transfer is to take place is determined by the sensing of a record mark. The record mark sensing circuits (Fig. 29*b*) terminate at the switch 96 and produce a record mark pulse RMA. It is this pulse that implements the decision tendered within the record. The record mark pulse of the switch 96 is transmitted to single shot multi-vibrators 352 and 354 and to an inverter 350 (Fig. 29*e*). The circuit in Fig. 29*e* includes checking means to insure that two record marks never follow each other without at least one field mark (FM) between them.

At the outset we noted that the first column of a record is invariably a field mark and that the last column thereof is always a record mark. In order to check sorter failure, a circuit herein is designed so that the succession of two record marks with no intervening field mark between them will indicate an error. When the record mark pulse is put into the inverter 350 (pin 3) and into the single shot multi-vibrators 352 and 354, the multi-vibrators will provide a time delay before the record mark pulse is emitted from them. The inverter, however, passes the record mark pulse immediately. The record mark pulse will be transmitted to a switch unit 358 by the inverter 350. In Fig. 29*b* a field mark (FM) is recognized by the recognition matrices 90 and is tested at the switch 98, the output pulse of the switch 98 being transmitted from pin 4 of that unit to a pair of triggers 356 and 362 (Fig. 29*e*). As a record approaches a reading head, the first column to be sensed will be a field mark which is ultimately recognized by switch 98, and the recognition pulse thereof is transmitted to triggers 356 and 362 (Fig. 29*e*). The trigger 356 is turned on by the field mark recognition pulse with the result that its output pin 8 is conditioned to cut off the switch 358, thereby preventing the next record mark pulse that will be emitted by the inverter 350 from immediately proceeding through the switch tube 358 and through the trigger 362. Shortly after this impulse has passed, the single shot multi-vibrator 354 will emit a delayed record mark pulse that will turn off the trigger 356. Thus, if another record mark is sensed prior to a field mark, it will be able to get through the switch 358 to indicate error.

The record mark pulse is also transmitted to the single shot multi-vibrator 352 which has a longer time constant than the single shot multi-vibrator 354. Consequently, it will produce its impulse after the impulse has been derived from the single shot multi-vibrator 354. This impulse from the single shot multi-vibrator 352 is transmitted to an inverter 360, and through output pin 6 of this unit to a switch unit 364 (Fig. 29*d*). Since the trigger 362 had been turned on by the sensing of a field mark, this trigger has conditioned the switch 364 to allow a record mark pulse emitted from the inverter 360 to proceed therethrough to an inverter 366. The record mark pulse is transmitted by the inverter 366 to the switch 264 (Fig. 29*d*). Switch 264 (Fig. 29*d*) has been previously discussed, and it has been shown heretofore that the record mark will proceed through switch 264 only under the condition that the record then under inspection is to be transferred. Therefore, the record mark pulse proceeds through switch 264 to the trigger 270, which is the immediate control for the write unit as previously described.

An output pulse of switch 264 (Fig. 29*d*) turns trigger 266 to its "off" condition. Turning trigger 266 on maintains a memory that a writer drive is running, and that when a record mark B (RMB) is sensed this writer should be stopped. Both the RMA and RMB record marks have been previously described. Record mark RMA is sensed by the matrix in Fig. 29*b* and provides an indication that a record has been completely read by the "A" head of the reader drive. Record mark RMB is a manufactured pulse to indicate that a record has been completely read by the "B" head of the reader drive. Record mark RMB is used to stop the writer unit after having completely written a record. The RMB record mark is generated by the circuits shown in Fig. 29*a*, and is transmitted from the peaker 140, to a single shot multi-vibrator 376 (Fig. 29*e*). The single shot multi-vibrator 376 produces a slight delay to allow the RMB pulse to go through an inverter 386 to the trigger 266 (Fig. 29*d*) to turn this trigger on. After this has occurred, the single shot multi-vibrator 376 will pass its pulse to an inverter 378, and from inverter 378 through a switch 382 (Fig. 29*d*). At the same time the switch 382 has just been conditioned by the trigger 266 to allow the pulse to pass through it to turn off the write control trigger 270. Turning off the write control trigger 270 turns off the write circuits and stops the writer tape drive.

In order to maintain the space between records to reasonable dimensions, the single shot multi-vibrator 376 (Fig. 29*e*) has a certain time delay. The record mark pulse entering the inverter 386 would turn off the transfer control trigger 266, thus permitting the delayed RMB record mark pulse from the single shot multi-vibrator 376 to go through and stop the write circuits when the single shot multi-vibrator 376 dropped. If the space between records is excessive, the record succeeding the one that has just been transferred will not have been completely scanned at this time, and consequently no new decision will be arrived at. Therefore, when the single shot multi-vibrator 376 produced its impulse, the writer tape drive will be stopped. Conversely, if the space between records is somewhat shorter than its normal length, then the RMB pulse that comes in to turn off the transfer control trigger 266 will turn it off, but it will be turned back on by the new decision and the record mark A (RMA) associated with it. Turning the trigger 266 back on before the single shot multi-vibrator 376 drops prevents the stop impulse from getting through the switch 382 and thereby prevents the writer unit from being stopped. Thus, as long as the spacing between records is within reasonable proportions, it will be maintained at approximately the nominal value. The purpose of this circuit, therefore, is to maintain a normal space between records within certain tolerances.

In summary, the transfer of a record is determined by head "A" scanning the record under examination, arriving at a decision on whether or not to transfer this record by means of the scanning circuits, holding this decision until record mark A time and then complementing this decision at record mark A time to start the writer unit. The writer unit is started and the write circuits are so conditioned as to allow the pulses read by the head "B" on the reader drive to pass through and write on the writer drive tape. When a record has been transferred, a record mark B is generated. Record mark B is used to reset the decision that instructed this drive to run for this record. If another decision from the succeeding record in the read tape is not arrived at and complemented before a reasonable time after record mark B, the writer unit will stop and the writer circuits will be turned off. If this decision is available, however, the write unit will be held in write condition and will continue until the succeeding record has also been transferred. This continues until a record is read in read head "A," which calls for a no-transfer decision. When this occurs, the RMB from the last transfer record will cause the write unit to stop.

During sorting, once the start key has been depressed, the operation of the sorter is normally automatic. At the end of a complete sorting pass, the machine goes into a rewind, rewinds both tapes, reverses the reader and writer selection and commences a new reader scan for the first record on the input tape. When the sorter is thrown into a rewind, a trigger 404 (Fig. 29*e*) is turned on. At the completion of the rewind, the machine will recognize that rewind is ended and will start a new pass. When this occurs the trigger 404 is turned off again. When the trigger 404 is turned off, it generates a pulse which is transmitted to a single shot multi-vibrator 406. The multi-vibrator 406 allows the relays and operating parts within the sorter to settle down before the tape is once more driven. The pulse from the single shot multi-vibrator 406 is transmitted to an inverter 408, to trigger 368 and to a trigger 424 (Fig. 29*d*). Introduction of this pulse to the trigger 424 will produce a signal through an inverter 384 to the reader tape drive clutch control circuits. These circuits were previously discussed in great detail in reference to Figs. 29*j* and 29*j'*.

The trigger 424, therefore, is to the reader unit what the trigger 270 is to the writer, i. e. a direct control for the drive of the reader unit. The difference in the operation of the triggers 424 and 270 is that trigger 270 will be turned on and off at various times during the pass to transfer only selected records. Trigger 424, however, is turned on at the start of the tape pass and will remain on until the end of the pass of tape, since all records are read regardless of whether they are transferred or not.

In order to erase a tape that may be written on in the writer drive and to allow some leeway at the beginning of the tape, a signal will also be introduced to the write trigger 270 at this time. This signal originates in the single shot multi-vibrator 406 (Fig. 29*c*) and passes through the inverter 408 and into a switch 410. The switch 410 is controlled by a separate trigger 432 which serves as a memory of the tape pass number. Since one bit sort consists of two passes of the input tape, distinction must be made between the rewind of one tape unit and the rewind of both units. When only the input tape is rewound, the output tape already has valuable information on it and as such it is not desired to disturb that tape. When both tapes have been rewound, then it is recognized that the tape in the drive about to become a write unit does not contain valuable information, and it is desired to erase all records that may be on the tape to prevent interference when this tape is used as the output tape in the succeeding operation. Trigger 432 maintains this distinction.

When either tape is rewound, the trigger 432 is turned off. The potential generated at pin 7 of the trigger 432 is then of such nature as to cut off the switch 410 and prevent running of the output tape in the middle of a bit pass. When both tape units are rewound, indicating the completion of an entire bit sort, the trigger 432 is turned on again. The voltage now generated at pin 7 of the trigger 432 will condition the switch 410 to allow a pulse generated by the trigger 404 to pass through the switch via the single shot multi-vibrator 406 and the inverter 408 to the write control trigger 270 (Fig. 29*d*). Thus, the output tape is started and will continue running until instructed to stop from another control source.

As mentioned previously, the first characters on a tape are two record marks written in series. Furthermore, as previously stated, the error circuits involve the inverter 350, the single shot multi-vibrator 354, the trigger 356 and the switch 358. Whenever two record marks come together without a field mark between them, it is an indication to the sorter that the record read is in error and should be disregarded. Therefore, under such conditions, the overriding instruction to the sorter is to stop the writer units regardless of the decision made by the scanning head. At the start of a tape pass, this condition is used profitably to stop the write unit when the reader unit is approached by the first valuable bit of information. Assume that the write trigger 270 has been turned on and the read trigger 424 has also been turned on, so that both the input and output tapes are running. Shortly thereafter the reader unit will sense two record marks in succession on the input tape, which are written in normal fashion by the write unit. However, since these record marks have been sensed, they are recognized by the recognition matrix in Fig. 29*b* and transmitted in normal fashion to their circuits in Fig. 29*e*. The first record mark coming through will energize the single shot multi-vibrator 354 (Fig. 29*e*), as well as the single shot multi-vibrator 352 and the inverter 350. When the single shot multi-vibrator 354 produces a pulse from its pin 8 upon termination of its timing period, it will turn off the trigger 356. The voltage generated at pin 8 of the trigger 356 is transmitted to the switch 358, conditioning this switch to pass an impulse impressed on its pin 9. This is effected by the first record mark sensed.

As previously mentioned, there are two record marks in series with nothing between them. The second record mark, therefore, will be sensed and operate these identical circuits, with the difference that the impulse entering the inverter 350 will now be emitted at pin 6 and into the switch 358 which has just been conditioned to pass this pulse. Therefore, the second record mark pulse will be emitted from switch 358 and operate the trigger 362, a trigger 368 and an inverter 370. When the trigger 368 is operated, it will produce a pulse to operate an inverter 372 and the output pulse of the inverter 372 is transmitted to the switch 382. The switch 382 is conditioned to allow this pulse to pass through. The pulse from switch 382 in turn is used to impulse the write trigger 270 to stop the writer unit. The operation thus far has resulted in the forward run of some of the output tape, the erasure of any possible previously recorded tape record, the recording of two record marks, and the stopping of the output tape on which the record marks have been produced. The reader unit, of course, continues in operation until the end of the pass.

The inverter 370 (Fig. 29*e*) is operative in case of error, i. e. recognition of a double record mark, and it will transmit a pulse from its pin 6 to an inverter 260, which in turn is connected to the trigger 262 which prevents transfer. Normally this circuit remains inoperative. However, if during the first tape pass there is an error recorded on the tape, the circuit just described will cause the machine to ignore that record regardless of any bit transfer decision that may be made by the sorting circuits.

The last character on every tape is always a tape mark (TM). It must be at the end of every read tape. The purpose of this character is to indicate to the sorter that all the valuable information on the tape has been read and processed. At the end of the first half of one bit sort, the read tape will sense the tape mark which instructs the sorter to rewind the input tape only. When the input tape is completely rewound, it will once again pass the tape through the read heads and the remainder of the records that had not been transferred on the first pass will now be transferred to the output tape. When the tape mark is once more sensed at the end of the second pass of the input tape, this indicates to the sorter that all valuable information has been read from the input tape since the sorter has an internal memory of the fact that the input tape drive was rewound at the end of its first pass. The combination of this first rewind memory and the sensing of the tape mark on the input tape at the end of the second pass will cause the write unit to write a tape mark on the output tape and thereafter cause the rewinding of both tapes.

In Fig. 29*b* a tape mark impulse is recognized by the regular recognition matrix and is tested by the switch 94 which emits a tape mark pulse from its output pin 4 when this character is recognized. The tape mark pulse is emitted from the switch 94 to a single shot multi-vibrator 412 (Fig. 29*e*). The single shot multi-vibrator 412 has a long time constant, the purpose of which is to allow the writer drive to start up and write a tape mark, whereafter it initiates the rewind of the tape drive. When the tape mark is sensed, the single shot multi-vibrator 412 will produce an impulse which operates a trigger 416. The trigger 416 in turn conditions a switch 418 to pass an RMB impulse emitted from the peaker 140 (Fig. 29*a*). The RMB pulse will proceed through the switch 418 and into an inverter 420. The signal will be emitted from the inverter 420 and go through an inverter 422 to a trigger 424 (Fig. 29*d*) which is the read clutch control trigger, thus stopping the read drive.

From the inverter 420 the RMB pulse is also sent to an inverter 426 and through this inverter to another single shot multi-vibrator 428. The single shot multi-vibrator 428 suppresses the rewind signal until the read tape drive has come to a complete standstill. When the single shot multi-vibrator 428 drops, it transmits a pulse to an inverter 430 and through this inverter to the rewind circuits which will be discussed in detail at a later time. This is the sequence of events after the first tape pass of a bit sort.

The input tape is now rewound, and upon completion of rewinding it will once again be passed through the read heads of the reader drive. Eventually the tape mark is sensed again by the switch tube 140 (Fig. 29*a*), and the signal is again transmitted to the single shot multi-vibrator 412. However, at this time the trigger 432 has been set to indicate that one rewind has taken place in this bit sort. Therefore, when the single shot multi-vibrator 412 is operated by the tape mark, the signal generated by the single shot multi-vibrator 412 will now be allowed to pass through the switch 414. The output of the switch 414 is transmitted to the write trigger 270 (Fig. 29*d*), thus starting the output tape drive. With the output tape drive started , the writing circuits will allow the transmission of any information read by the "B" head of the input tape drive.

The tape mark is sensed when it passes the "A" head. When the tape mark is read by the "B" head, it will be written on the output tape. Shortly after the tape mark is written, the single shot multi-vibrator 412 will produce a signal to operate the trigger 416. The RMB pulse generated by the reader head "B," due to the fact that it read a tape mark, will now be allowed to go through the switch 418 and through the circuits to stop the reader and to initiate a normal rewind. The switch 418 produces the RMB pulse, sends it to the inverter 420 and through it to the inverter 422, and through it to turn off the reader trigger 424. The output of the inverter 420 also goes to the inverter 426, through the inverter 426 to the single shot multi-vibrator 428, and after its time delay to the inverter 430 and from the inverter 430 to the normal rewind circuits which, as stated, will be discussed at a later point herein. The input tape drive will now be stopped through its normal stop circuits via the single shot multi-vibrator 376, inverter 378, switch 382 and turn off the trigger 270, thus stopping the output tape drive.

On the plugboard (Fig. 56), the units position of the field to be sorted is selected from the program level starting with program #1, as briefly stated hereinbefore. The columns marked "U" for units and "T" for tens are plugged from the program level to the hubs above marked "units" and "tens." With this arrangement the selection of the column to be sorted is extremely flexible, since any column up to 99 may be wired for sorting. From the hubs marked "U" and "T" in program level #1 is emitted an impulse that enters the hubs marked "units" and "tens," and from there proceeds to the relay point network consituting the coding matrix (Fig. 29*k*). Fig. 29*k* represents one of a pair of identical circuits, one for units and one for tens. The column wired to "units" enters into the coding diode matrix to pick up a combination of relays. Depending on the combination of transferred relay points, the exits of the relay point network shown at the bottom of the figure will produce a voltage at all outputs except the one corresponding in number to that wired on the control panel. Thus, if the digit 5 were wired on the control panel, a relay 434 will be picked up, the other three relays remaining in their normal position. Entering the relay point network at point 436 is a voltage that will go through the relay point network and establish a corresponding voltage at all output points shown below except at number 5. The output lines marked "0" through "9" at the bottom of Fig. 29*k* are connected to the correspondingly numbered lines on the stepping switch in Fig. 29*h*. Since a voltage is developed on all these points but one, there is a voltage then on the corresponding wires in Fig. 29*h* in the stepping switch. The 40 volt power source connected to the bottom row will cause the relay to step past this point while searching for the terminal without voltage under control of the coding matrix (Fig. 29*k*). Therefore, when the plugboard is wired and inserted into the sorter, the sorter will set up the "units" and "tens" step switches.

At the start of a new sort, a trigger 462 (Fig. 29*g*) generates a pulse from its output pin 4 to an inverter 464. A signal is transmitted from the output of the inverter 464 to a single shot multi-vibrator 466, the output pulse of which goes to and through an inverter 468. The plate pulse of the inverter 468 is transmitted to a thyratron 470 (Fig. 29*h*). Thyratron 470 is fired and passes the current required to pick up a relay 472. When the thyratron 470 is fired, current is drawn from ground to its pin 9 and is discharged through its plate, pin 5, to and through the relay 472 and to a commutator 448 of the units step switch. If the common brush **448*b* on commutator 488** is resting on any position except the one called for by the plugboard via its matrix in Fig. 29*k*, the relay will pick up and hold until such time that the common brush **448*b*** is stepped to a neutral position. The actual stepping of the units step switch is controlled by the circuitry about to be described.

From ground the circuit extends to and through a relay point **474*a*, to and through a relay point 472*c*, to and through a relay coil 474, through a point 472*a* to the commutator 448, through its common brush 448*b***, through the segment on which the commutator is resting, to the coding matrix of Fig. 29*k*, and through the relay point network to the voltage supply. As the relay 474 picks up, it causes the stepping switch to be advanced one position in a vertical direction. The relay point **474*a* interrupts the circuit of the relay 474. Thus, as the switch is stepped from one position with voltage to the next position with voltage, the relay 474 will receive repeated impulses until such time that the commutator brush 448*b* arrives at a segment without voltage. When this occurs, since the power supply circuit is broken, the relay 474 and the relay 472** will both be deenergized. Thus, the stepping switch has been homed to the position dictated by the plugboard.

A set of commutators 438 through 444 and their associated points are wired to form a coding matrix. This matrix is supplied with two voltages, both of which are removable to cause first resetting and then presetting of the column counter triggers 220, 222, 224, 226, 228, 230, 232, 234, 236, 238 and 240 (Fig. 29*c*).

Since the units and tens step switches are under control of the plugboard (Fig. 56), they will be set up in such manner as to select the first tape column to be sorted. The column counter is, therefore, preset so that when the column of the input tape to be sorted is sensed the counter will emit a carry pulse. In order to do this it is necessary to set the counter in a nines complement of the number of the column to be sorted. Thus, if column 5 is to be sorted, it is necessary to set the counter to the value of 95 so that when the fifth column has been sensed and causes an addition into the column counter, the counter will carry and test the decision for the fifth column. The testing of the decision of the fifth column has already been discussed.

It remains to be seen how the column counter is preset. For the purpose of this discussion, let it be assumed that it is desired to begin sorting on the fifteenth column. The tens and units step switches are in the position to preset the counter to sense column fifteen. Basically, a trigger is designed in such fashion that its bias voltages enter it at two different points. The removal of voltage from either one of these two points will cause the trigger to be pulled over to the side from which the voltage has been removed. Thus, if the trigger is conducting on its left-hand side and the bias voltage is removed from the right-hand side, the trigger will flip to the right-hand side. Conversely, if it is conducting on the right and the bias voltage on the left cut off, the trigger will flip to the left.

Before the start of each individual record, it is necessary to set the column counter to the proper column so that when a new record arrives its columns will be counted in their proper sequence. Thus, on sensing a record mark pulse in the inverter 388 (Fig. 29*d*), the record mark pulse will be emitted from the inverter, pin 6, to a single shot multi-vibrator 390. The single shot multi-vibrator 390 has two outputs. When the output pin 7 produces a signal, this signal enters an inverter 398, passes through the inverter 398 to a switch unit 400 and out of its plate, pin 4, to a power unit 402. The output of the power unit 402 operates the column counter reset circuits which turn off the entire column counter. The output of the power inverter 402 is tied to pin 4 of the triggers 220, 222, 224 and 226, and 232, 234, 236 and 238 (Fig. 29*c*). An inverter 392, a switch 394 and a power unit 396 control the bias voltage of the column counter. When the inverter 392 receives an impulse, the power unit 396 will produce an output from pin 3, removing the bias on the pins to which it is tied in the column counter, thus causing the column counter to be reset to "0." When the single shot multi-vibrator 390 emits a signal from its output pin 3 slightly after the reset time, the signal will go through the inverter 392 (output pin 8) to the switch unit 394, out of inverter output pin 4 to the power unit 396, and from the output pin 3 of the power unit 396 to operate the counter preset circuits. The preset impulse entering point 476 (Fig. 29*h*) enters the stepping switches shown and is fed to the various levels of these switches such as to cause the column counter which is connected to these switches to indicate the nines complement of the column being sorted. This follows as the result of the matrix which is set up here.

The wiring of the units and tens step switches forms a code to convert the decimal indication furnished by the plugboard into a binary form acceptable to the sorter. To simplify the study of these switches, those connections to the preset voltage are shown darkened. Thus, when the preset signal is received, all darkened points will receive this signal. However, only those darkened points that are connected to their associated commutator via the common brush will have any effect on the output of the various commutators, and consequently on associated column counter triggers. The coded wiring on these stepping switches not only converts the decimal information received from the control panel to a binary form, but it also converts this information into nines complement form. This is done for the purpose of simplifying the sorter's search for the proper column to be sorted on. Thus, if the column to be sorted on were column 15, as the stepping switches are shown connected, the counter should be preset to the value of 85, which is the nines complement of column 15. The example shown in Fig. 29*h* is column 15. If a preset signal were received on line 476 after the counter had been reset, this preset signal would go into the stepping switches and up the four lines shown. There is no connection between the preset signal and the commutators 438, 440 and 444. As a consequence, these three positions will remain unchanged. However, commutator 442 is connected to the preset line at point 442*a*. The commutator emits this signal to the trigger 224 (Fig. 29c), thus causing trigger 224 to conduct. Thus, the unit position of the counter is preset to the binary value 4.

For nines value control, the preset signal entering the point 476 on Fig. 29*h* will enter the tens step switch and proceed to all darkened spots, since there is no preset signal connection to the commutators 450, 452 and 454, these three positions will remain unchanged. A commutator 456 is connected to the preset signal at 456*a* which is transmitted from this commutator to the trigger 238 (Fig. 29*c*), thus turning on the binary 8 value. The value of 84 is now set in the column counter shown in Fig. 29*d*. When the next record is sensed by the reading head "A," it will, in the manner previously discussed, cause a count of the columns to be added into the column counter as they are read. The field mark at the start of the record, being considered column zero, will add one to the counter, causing the column counter to register 85.

The first column of valuable information on tape when added to the counter increases the amount standing in the counter to 86. This count will continue until the fourteenth column is sensed, at which time the column counter value will have advanced to the value 99. When the fifteenth column is sensed, it will be processed in normal fashion and the decision will be made to transfer or not transfer under the control of its bit value. At the end of the fifteenth column of scanning, an additional one will be entered into the counter which will cause the column counter to emit a carry pulse. As previously mentioned, the carry pulse emitted from the inverter 242 (Fig. 29*d*) is transmitted to the single shot multivibrator 268 and from the output of the single shot multivibrator (pin 3) it is sent to test the bit weight under test. Thus, it is possible by means of the stepping switches shown in Fig. 29*h* to select any column from the "0" to "99" as the units position of a sort.

The units and tens step switches are essentially under control of the plugboard and are set to correspond to the numeric value plugged therein. Having set the stepping switches to the first column to be sorted, the sorter is now ready for operation. When the start key is depressed, the machine will proceed, read the input tape, and sort on the first bit. As it completes each individual bit sort, the sorting bit step switch (Fig. 29*f*) will advance one step for each bit completely sorted as was previously mentioned.

When the fourth bit of a numeric sort has been completed, the sorting bit step switch will advance to the fifth position and the sorter will recognize this fact. Due to the lack of alphabetical sort wiring on the plugboard, the sorter will recognize that a complete column has been sorted. When the stepping switch (Fig. 29*f*) has advanced to the fifth level, a brush 194*b* will complete a circuit from the power source through the relay points 182*a*, through the brush 194*b*, to a commutator 194*a* and to the input of a thyratron 174. Thyratron 174 will fire and from its output pin 5 it will pick up a relay 178. The circuit extends through the relay 178 to a commutator 198*a*, to a brush 198*b* and through whatever segment the brush is on, to the power source. The relay 178 will allow the pick-up of the relay 172, which is the advancing coil for the step switch. The circuit for control of the relay 172 is from ground through the relay point 172*a*, through a point 178*c*, through the coil of relay 172, through the relay points 178*a*, through the commutator 198*a*, through the commutator brush 198*b*, to the segments and to the power source.

The energization of the relay 172 causes the switch to advance to the sixth position, which once again completes the circuit for the relay 172, allowing it to be re-energized again, thereby advancing it to the next stage and so on until the switch has completed a revolution and has come back to the first level at which time the circuit of relay 172 will be broken because the common brush 198*b* is now on an unconnected segment as shown. Thus, after one complete column of sorting, the switch will automatically home itself to the first level. During the homing of the sorting bit step switch, it proceeded from the fifth, through the sixth, seventh, eighth, ninth, tenth and eleventh levels, and from there to home. When the sorting bit step switch steps to the eleventh level, a connection is made from the power supply, through the relay point 180*c* to the commutator 196*a*, through the brush 196*b* to a trigger 478 (Fig. 29*g*). Trigger 478 generates a pulse from its output pin 5 which is transmitted to thyratrons 480 (Fig. 29*g*) and 482 (Fig. 29*h*). The trigger pulse fires thyratron 482 and produces a signal from its output pin 5 to impulse the relay 474, the circuit extending through the relay 474, through the points 472*a* and to the power supply. The coil 474 is the stepping coil for the units stepping switch (Fig. 29*h*).

The units stepping switch having advanced one position will now cause the counter to be preset differently. The example cited earlier was column 15, and at that time the column counter was preset through the value 84. However, having completed the sorting of column 15, the sorter will advance to sort column 14. The unit step switch connections at this level will cause the column counter to be preset to the value 85, in a fashion identical to that which preset it to the value 84. The new position of the stepping switch will now cause the sorter to scan column 14. It has now been shown how the units and tens switches are set up to select the column to be sorted on, and it has also been shown how the bit sort step switch (Fig. 29*f*) controls the sorting of a column.

Having sorted a column, it is now necessary for the sorter to determine how many columns are to be sorted, or in other words, the length of a sorting field. Once again this is a function determined by plugging of the plugboard (Fig. 56). It has been pointed out that the program section of the plugboard (Fig. 56) has a vertical row of hubs labeled "N" indicating the number of columns to be sorted. The hub "N" is wired to its right by the operator to preset the sorter for the number of columns to be sorted during the sorting operation in question. In the example shown, hub "N" is wired to the number 2 hub in the number of columns per sort section of the plugboard. By wiring from the hub marked "N" to the proper hub in the number of columns per sort section, it can be seen that any sort may consist of any number of columns up to ten in any one program level. Herein it will be possible then to sort 100 columns, since there are ten program levels of ten columns each.

The two stepping switches in Fig. 29*g* are used to control the program levels, number of columns per sort, and stop instruction to the machine when sorting is completed. A pair of commutators 486 and 488 (Fig. 29*g*) are commoned together and grounded. In the home or first program level as these brushes are shown, they are adapted to energize the first program level hubs marked "U" and "T" for units and tens, which in Fig. 56 are shown wired to the value 15. Thus, the circuit for column selection is completed. It can be seen that since the commutator brushes **486*b* and 488*b*** can rest on only one program level at any time regardless of how many vertical "U" and "T" hubs in the program section of Fig. 56 are wired, only the first program segments will energize the units and tens hubs to which they are wired. When the step switch (Fig. 29*g*) eventually advances to its second program level, then the wires shown in the program section of Fig. 56 will become inoperative and the second level will energize any circuits to which they are wired. In the illustration, none is shown at this point.

In the program section of Fig. 56 are two hubs marked "Alpha" indicating alphabetical sorting. One set of ten vertical hubs 502 has a direct connection to the points to the right of a commutator 490. The control for alphahetical sorting is, therefore, also under control of the control field selector stepping switch (Fig. 29*g*). The alphabetic control circuit extends from ground, through hubs 500 (Fig. 56), and through plug connections from the hubs 500 to their associate hubs 502 which are internally wired to the points associated with the alphabetic commutator 490 (Fig. 29*g*). Program level commutator brush **490*b*, therefore, connects the hubs 502 to the commutator 490 which is connected to a relay 182** (Fig. 29*f*) and through the relay to the power source.

In the preceding general discussion it was pointed out how the operator may determine the length of field to be sorted. It has been stated that the operator has wired from the end hub of program level #1 to select the number of columns in the sort. The circuitry involved here, therefore, is from the power source (Fig. 29*g*) through a relay point **504*b*, to a commutator 484, the commutator brush 484*b***, to the plugboard hub marked "N" in program level #1, via the plugboard wire to the number selected by the operator as the number of columns in this sort, back through the hub (Fig. 29*g*) associated with a commutator 494, through the commutator brush **494*b* to the commutator 494, and from there to a trigger 506. At the start of a sort, the columns per sort switch is in its home position as are the other stepping switches shown. Consequently there is no connection between the hub marked "N" (Fig. 56) in the program level #1 to the commutator 494, since the brush 494*b* is located in its home position and has no connection to the point connected to the count of 2 selected by the operator as the length of field. Therefore, when the machine is operated, a sort will commence, and as previously mentioned will go through a complete column of sorts, at which time an impulse will be transmitted to the trigger 478** (Fig. 29*g*). The circuitry by which this pulse is derived was previously traced. A signal is transmitted from the output of the trigger 478 to the thyratron 480. The thyratron 480 in turn produces an impulse from its output pin 5 to operate a relay 508. Energizing relay 508 causes the column per sort step switch to advance to its next position. A new column of sort will be initiated at this time, and the entire operation of the bit sorting switch will be repeated.

When the second column has been completely sorted once again, an impulse is transmitted to the trigger 478, out of its pin 5, to the thyratron 480, to energize the relay 508 once again and cause the column per sort step switch to advance one additional stage. At this time the control panel hub marked "N" in Fig. 56 is connected to the #2 hub in the number of columns per sort section to complete a circuit to the #2 hub associated with the commutator 484. The commutator has a connection via the brush **494*b*, completing the circuit through the commutator 494 to the trigger 506. The output of the trigger 506 is transmitted to an inverter 510 and to a thyratron 512. Thyratron 512 will produce an impulse from its output pin 5 to operate a relay 514. The circuit extends through the relay 514 and through the relay point 514*a* to the power source. The relay 514** advances the program level step switch from the first program level to the second program level.

A recapitulation of the preceding operations shows that when the operator plugged the plugboard at the start of this sorting operation, he selected column 15 as the first column to be sorted and also selected the field length of two columns. Upon insertion of the plugboard, the units and tens step switches were set up in such manner as to cause the counter to scan column 15 as the first column of sort. The sorting bit step switch (Fig. 29*f*) went through its normal operations and completed first one column of sort. Upon completion of this first column of sort, an impulse was transmitted to the columns per sort step switch and to the units stepping switch, causing the sorter now to scan column 14 as the second column of sort. Once again the sorting bit step switch cycled through its normal positions and sorted the second column position completely. Upon completion of the second column of sort, the sorting bit step switch transmitted an impulse once again to the column per sort step switch and also to the units step switch, advancing the column of sort step switch to a point where, due to the control wiring (selection of two columns) there is an indication from this column per sort step switch that the first program of sorting has been completed.

By virtue of the multiple positions of the control field selector step switch, it is possible to set up for sort on a plurality of separate columns within a record.

When a sorting operation is to be undertaken, an input tape will be inserted into the reader drive and an equally long output tape into the writer drive. The operator will then depress the reset key 526 (Fig. 29*b*). Depression of reset key 526 completes the circuit for the energization of a relay 524. Upon energization of the relay 524, the relay point **524*a* completes a circuit from the power supply to the trigger 462** (Fig. 29*g*). The trigger 462 produces an impulse from its output pin which is transmitted to the inverter 464 and to a thyratron 520. The thyratron 520 produces a pulse which transfers a relay 516. Relay 516 being energized will cause the control field selector step switch to rotate to its home position. This is accomplished by the circuits from ground, through the relay points 514a to relay points 516b, through the relay 514, through relay points 516a, to a commutator 492, and through its brush 492b to its associated segment and to the power supply. Thus, as long as the brush 492b makes contact with one of its associated energized segments, the relay 514 will receive repeated impulses to cause rotation of the switch until the brush 492 arrives at the unwired segment 492c. When it arrives at segment 492c, the control field selection step switch is considered at its home position.

The impulse that originated at trigger 462 is also transmitted to the inverter 464 and from the output of its pin 6 to the single shot multi-vibrator 466. The pulse of the multi-vibrator 466 is of sufficient duration to allow the control field selector step switch to home before it transmits the impulse that it has received as an instruction to home the remaining switches. This allows the control field selector step switch to get to its home position, and set up the units and tens coding relays, so that when the units and tens switches are instructed to home, they will home to the positions called for on the control panel.

Having homed the control field selector switch, the single shot multi-vibrator 466 transmits an impulse to the inverter 468 which from its output pin 6 transmits a pulse to the thyratrons 176 (Fig. 29*f*), 518 (Fig. 29*g*), 470 and 522 (Fig. 29*h*). These four thyratrons will produce a signal at their output pins 5 to operate their associated relays 180, 504, 472 and 528, respectively. The transfer of relays 180, 504, 472 and 528 initiates the homing of their associated step switches. The circuit initiating the homing function for all units originates from ground and extends through the relay points 172a, 508a, 474a and 530a, through transferred relay points 178c, 504c, 472c and 528c, and then to the relays 172, 508, 474 and 530, through these relays to relay points 173a, 504a, 472a and 528a, and from there to the commutators of the stepping switches 198, 498, 448 and 460, respectively, through their associated commutator brushes 198b, 498b, 448b and 460b, and through the segment associated with each of these commutators to the power supply. In the case of the units and tens stepping switches, the power supply originates with the coding matrix set up by the wiring of the control field selector step switch through the control panel, where the first column to be sorted is selected.

The operator having depressed the reset key 526 (Fig. 29*m*) will have reset the sorting bit step switch, the columns per sort switch, the control field selector step switch, and will have set up the units and tens step switches to search for the first column to be sorted in the succeeding operation. In case the operator has neglected to wire a "0" value on the control when a column such as 10 or 20 is selected as the units position of sorting, a circuit has been provided internally to produce such "0" value automatically.

If a sorting field units position is selected at some number, for example column 12, and the field length is say five columns, the machine will set the units and tens step switches to column 12, and by means of the sorting bit switch will progressively change the units switch from 12 to 11 when column 12 is completed, to 10 when column 11 is completed, and to column 9 when column 10 is completed. However, in stepping from column 10 to column 9, it is necessary to change both the units and the tens stepping relays. While there are 11 positions on the stepping relays only 10 of them are used to select the digit for the column to be sorted. The first level, i. e. the home position, of the units and tens step switches are not connected to the column counter. However, if it is necessary to change the setting of the switch from "0" to "9," it is necessary to go past this position on the stepping relay. When the sorting bit step switch emits an impulse indicating that a column has been sorted (column 10), it transmits an impulse to the trigger 478 in Fig. 29*g* and from this trigger to the thyratron 482 (Fig. 29*h*). This causes the thyratron 482 to fire, operating the relay coil 474 and causing the stepping switch to progress from the "0" to the home level. As mentioned just previously, the home level is not used and consequently the switch must be advanced one more position to the "0" level. Moreover, since column 10 has been changed to column 9, it is necessary to reduce the tens position to "0" from "1." This is done in the following manner. A circuit is established from the power source, through relay points 472b, which indicate that the switch is not in a homing operation, through points 472b to points 466C, through the commutator brush, through the commutator 466, from the commutator to a trigger 532. An impulse passes from the output of the trigger 532 to the thyratrons 482 and to a thyratron 534. The thyratron 482 will operate the relay coil 474 in the previously described manner and cause the units stepping relay to advance from the "0" level to the "9" level. The thyratron 534 emits an impulse from its output pin 5 to energize the relay coil 530 and advance the switch from the "1" to the "0" level.

The sorter is adapted to sort data into either ascending or descending order under the control of the plugboard wiring. On the plugboard (Fig. 56) are two hubs 544 labeled "ASC" and "DES." These hubs are also shown on Fig. 29*f*, and when wired will allow a relay 184 to be energized. Upon energization of relay 184, the normal "no" and "yes" scanning circuits will be reversed. Thus, the wire marked "0" at the seventh level of the sorting bit step switch which normally scans the characters for the presence of a "no" and the wire marked "1" at the eighth level which normally scans for "yes" bits are reversed, since relay 184 has been energized and the points thereof are transferred. Relay 186 (previously discussed) is in its normal position, since this is the start of a bit sort.

Under these conditions a circuit will be completed from the power supply, through the points of relay 186, through the commutator brush 192b, to the commutator 192a, to the relay point 184a but not through it, to the relay point 184b and through it down to the "1" line on the eighth level. Thus, by energizing the relay 184 the normal sorting sequence has been reversed. Whereas in an ascending order the records containing "no" bits are transferred first, with relay 184 transferred the records containing "yes" bits are transferred first instead. Sorting in ascending or descending sequence is, therefore, merely a function of which bit is transferred on the first half and which bit is transferred on the second half of one bit sort.

Having selected either ascending or descending order, the sorter will continue through the entire sort, and when completed all records will be in proper order, either ascending or descending depending on whether or not the control panel hubs 544 were wired. During the "yes" bit sort, as was mentioned previously, the input tape is passed through the read heads once, and when sorting in ascending sequence all records containing a "no" bit are transferred to the output tape. When the complete tape has passed through the reader unit, this tape is rewound. When rewind is completed, the input tape is started up again and passed through the reading head a second time, this time transferring all records containing a "no" bit in the weight being sorted.

It is necessary for the machine to remember whether the "no" bit has already been transferred and whether it is in the process of transferring the "yes" bit, or whether no bits have yet been transferred. This memory is maintained in the machine by the setting of the trigger 164 (Fig. 29*f*). As mentioned previously, whenever a reader unit is thrown into a rewind, the contact point 288c is operated, which in turn operates the trigger 162, which in turn transmits an impulse from its output pin 8 to the trigger 164. When the first bit sort is initiated, trigger 164 is in its normal off position. As a consequence, the output of trigger 164 prevents the inverter 168 from operating, and therefore leaves relay 186 in the off state. A circuit is, therefore, completed from the power source to the commutator 188*a*, through the commutator brush 188*b*, to and through relay points 186*e* to 186*c*, and from relay point 186*e* to an inverter 550 (Fig. 29*m*). The inverter 550 will allow a relay 556 to be energized. The relay 556 at this time having transferred will have broken the circuit energizing the T1—T2 relay 558, via its relay points 556*a*. A voltage is furnished by the power supply to the relay points 556*b* and 556*c*. Since the relay 556 has been energized, the points 556*b* are open and therefore prevent the voltage from the power supply from getting through them and through the points 552*b* to the trigger 432 (Fig. 29*e*). However, relay point 556*c* having closed will pass this potential to the trigger 532 (Fig. 29*e*). Since the machine is in pass status, a circuit is completed from ground to a relay 562 (Fig. 29*m*) from the relay 562 to relay point 564*b* (Fig. 29*n*), through it, through the points 556*f*, 568*f* and 570*b* to the power source.

Operation of the trigger 432 (Fig. 29*e*) on the pin 6 side produces a signal when a tape mark is sensed to initiate a rewind of the input tape only. Transfer of the relay 556 and the opening of its 556*a* point prevents the transfer of the T1—T2 relay 558 until the end of the first bit pass. Upon the completion of the first run of the input tape, a tape mark will be sensed by a reading head. The tape mark so sensed goes through its normal control circuits in Fig. 29*e* and finally emerges from the inverter 430 (Fig. 29*e*) to a thyratron 560 (Fig. 29*m*). This impulse fires the thyratron 560 which will allow a relay 556 to transfer. A circuit then is completed from ground, through the points 562*a*, to the cathode pin 9 of the thyratron 560, out of its output pin 5 to pick up a relay 288.

Figure 29P:
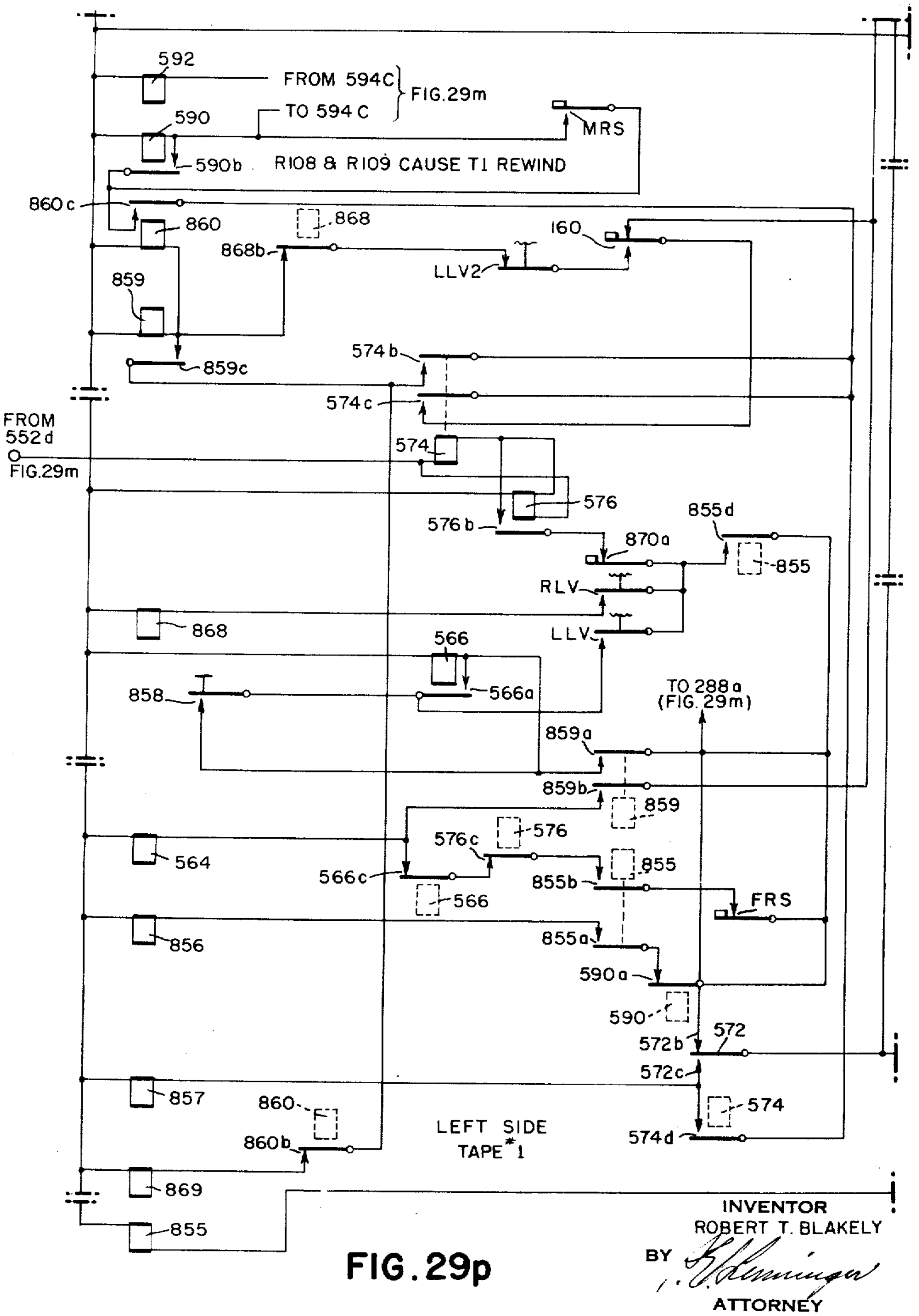
Figure 29Q:
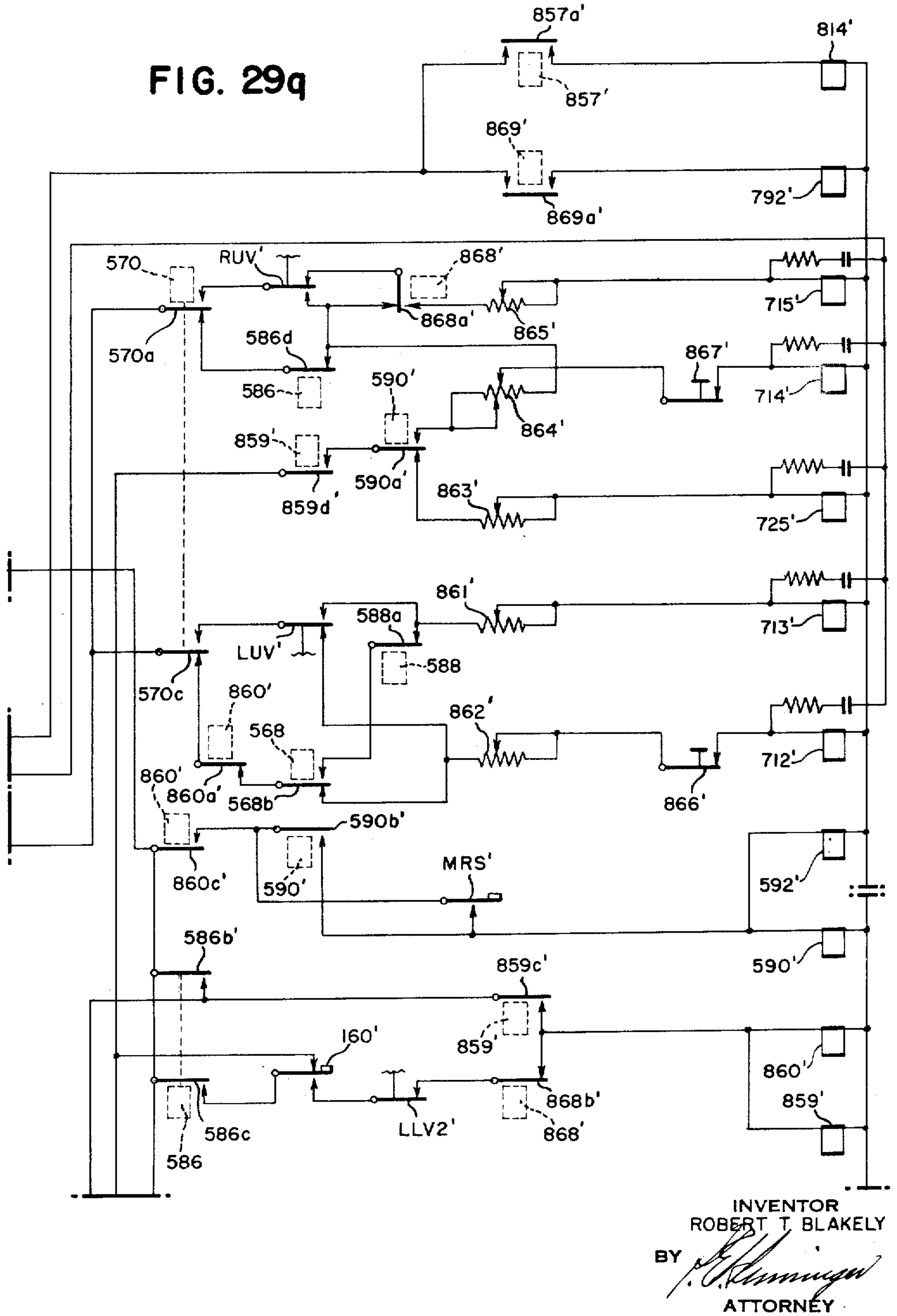

Having transferred the relay 288, a circuit is then completed from the power supply through a switch 572 (Fig. 29*p*), though the switch points 572*b* (Fig. 29*p*), and from there to point 288*a* on Fig. 29*m*, through point 288*a* to the relay point 552*d*, to a pair of relays 574 and 576 (Fig. 29*p*). Relays 574 and 576 initiate a rewind. Upon rewind of the reader unit, the contact 288*c* (Fig. 29*f*) will have operated, operating the trigger 162 which in turn operates the trigger 164 to indicate that one rewind has been completed. The trigger 164 operates the inverter 168 and energizes the relay 186. Relay 186 having transferred will now complete a circuit from the power supply through the commutator 188*a*, through its brush 188*b*, through to point 186*c*, through 186*d* to an inverter 548, and through inverter 548 to operate a relay 554 (Fig. 29*m*). The sole purpose of this relay 554 is to prevent the pick-up of the relay 558 during the second half of the first bit pass.

The sorter is now rerun to read tape a second time. At the end of the second pass the tape mark is sensed again. When the relay 554 was energized, the relay 556 was deenergized. Therefore, there will now be a complete circuit from the power supply, through the relay points 556*b*, through relay 552 and to the trigger 432 (Fig. 29*e*). When the trigger 432 is operated, it instructs the sorter that upon the reception of the next tape mark, both input and output tape drives are to be rewound and a new pass initiated. Upon the completion of the pass, the sorting bit step switch was advanced to the second level by its normal circuits. Having been advanced to the second bit level, there is now a connection from the power supply to the commutator 188*a*, through its brush 188*b* to relay point 188*c*, and from this point through the closed points 186*b* to an inverter 546 (Fig. 29*m*), and through inverter 546 to operate a relay 552.

Relays 554 and 556 (Fig. 29*m*) being in a deenergized condition, allow a circuit to be completed from ground to relay point 556*a*, through the relay points 554*a*, and to the T1—T2 relay 558. Having completed the entire first pass, the original information on the input tape has now all been transferred to the output tape in a different sequence. It is now necessary to use the tape drive that was a writer during the first pass as a reader and the tape drive that was a reader during the first pass as a writer. This is done by transferring the relay 558. The majority of points for this relay are shown on Fig. 29, where it can be seen that upon transfer of these points the function of the tape drives are reversed.

Figure 29R:
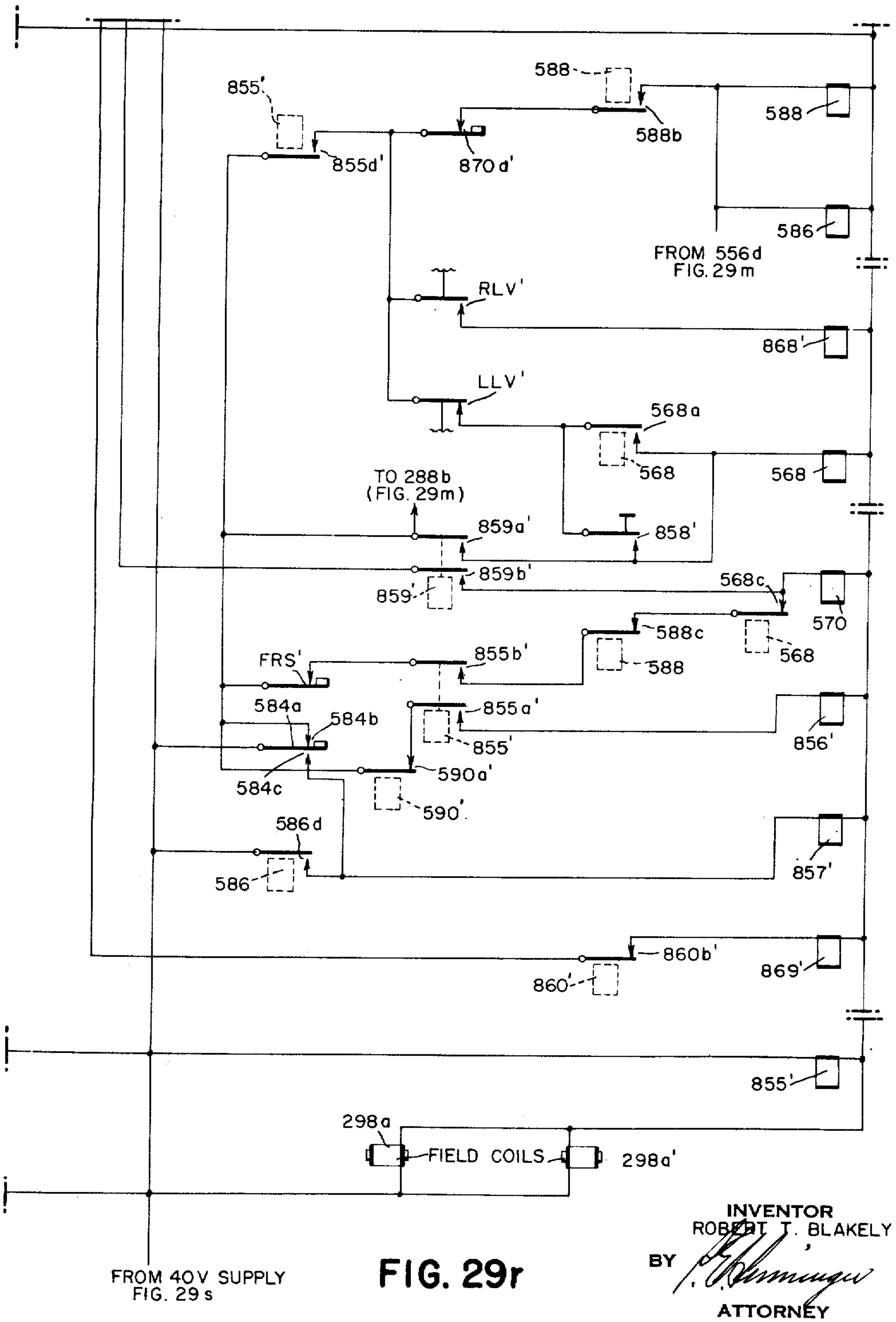

On the plugboard (Fig. 56) are two hubs 578 labeled "Remove File Reel." If the master tape in tape drive #1 is to be saved, either for further processing or for preservation, hubs 578 are wired by the operator, and their operation will be as follows. Upon completion of the first pass, a circuit will be completed from ground, through the hubs 578, through the relay points 552*a* which have been transferred, from there through the relay points 580*a* to pick up a relay 582. Relay 582 being energized will break the normal running circuits through its 582*c* point. Since a rewind of both tapes has just been completed, it is desirable once again to rewind only one tape, namely T2. The trigger 432 (Fig. 29*e*) will be so set that upon reception of a tape mark only tape T2 will be rewound. Thus, relays 552, 554 and 556 act as a memory within the sorter to determine which tape unit or units are to be rewound upon completion of any given pass. Rewinding of T2 follows from the fact that relay 552 is transferred. When relay 552 is transferred, it opens the rewind circuit of tape drive #1, and since the relay 556 is deenergized the circuit for rewind of tape drive #2 is closed. The rewind is identical for tape drives #1 and #2, the sole difference being the direction in which the rewind impulse is sent by these points. Thus, for rewinding T2, the signal will initiate at the power supply and extend to point 584*a* (Fig. 29*r*), through point 584*b* to point 288*b* (Fig. 29*m*), through point 288*b* to point 556*d*, through point 556*d* to pick up a pair of relay coils 586 and 588 (Fig. 29*r*). These two relays initiate rewind of the T2 tape. Thus, on the preceding pass to initiate rewind of only T1, the relay coils 574 and 576 (Fig. 29*p*) were energized and initiated rewind of drive T1. Relay coils 586 and 588 (Fig. 29*r*) initiate rewind of T2. When it is desired to rewind both T1 and T2, all four of these relay coils are energized by the circuits just discussed, since both points 552*d* and 556*d* (Fig. 29*m*) will, at such time, be in their normal deenergized position.

The sorter is initially started by depression of a start key 612 (Fig. 29*m*). Depression of the key 612 completes a circuit from ground through the key 612, through 610 (the stop key) through 598*c*, through 582*c*, through a relay 594 to the voltage source, the relay 594 being the start relay. The circuit is completed to hold this relay, by-passing the start key, by means of a circuit starting at ground and extending through relay point 594*d*, through the stop key 610, through points 598*c*, 582*c* and thence to the coil 594 and the power supply. Relay 594 is held in its energized position until dropped by either the depression of the stop key, by a pulse indicating that the operation being performed is completed, or by instructions from the plugboard to stop the sorter in order to remove the file reel.

Previously the relay 582 had been picked up under control of the remove file reel hubs 578 and the indication of a completed first pass via point 552*a*. When the relay 582 is transferred, the hold circuit of relay 594 is broken at the 582*c* point and consequently the sorter will stop. When the relay 582 is energized, a circuit is completed from ground, through the 582*b* point and through the 598*a* point to energize a coil 580. Energization of the coil 580 serves as a memory to the sorter hereafter that the file reel has been removed. Relay 580 will remain energized hereafter until the sort is completed via the 598*a* points and the 580*b* points to ground. As long as the relay 580 is energized, the points 588 break the circuit of the relay 582, thus avoiding stoppage under remove file reel controls. When the relay 582 is energized, its points 582*a* complete a circuit from ground to energize a relay 596. When relay 596 closes its points 596*a*, a circuit is completed to keep relay 596 energized via these points 596*a* and via the points 594*b* to ground. Thus the relay 594 is deenergized by the energization of the relay 582, and a relay coil 596 will remain energized until the relay 594 is once again energized.

Relay point 596*b* completes a circuit from ground to an indicator light 604 indicating to the operator that the file reel is to be removed. Thus, light 604 will glow until the machine is restarted. When the start key is depressed, relay 594 is energized and transfers its associated points. A circuit is completed from ground to and through points 594*a*, to and through an indicating lamp 608 which will apprise the operator that the machine is running.

The program hub marked "N" on the program section of the plugboard is wired to hubs 614 (Fig. 56). When the stop hubs emit an impulse into an inverter 602, the inverter will emit an impulse to pick up a relay 598. Relay 598 is the "operation complete" indicating relay, and when it transfers it will break the circuit for the run relay 594 via the points 598*c*. It will reset the indication that the file reel has been removed via points 598*a*, since at this time this information is not valuable. The relay point 598*b* completes the circuit from ground to an "operation complete" indicating light 606 and from there to the power supply. As previously mentioned, the relay 562 is normally energized, and as a consequence its points are in a transferred state. A relay 600 may then be energized via the 562*b* points and the 594*b* points to ground. Thus, when the start key is depressed, or while the machine is in running condition, relay 600 will be transferred while the tape is being run through the reading heads.

When the machine is instructed to rewind, the relay coil 562 is deenergized and consequently the relay coil 600 is also deenergized. The center of the relay point 600*c* is connected through a resistor to the power source. The operating points of 600*c* are connected to the trigger 404 (Fig. 29*e*). Thus, when the machine is instructed to rewind, either or both tape drives will transmit a signal to point 600*d* and from there to pin 6 of the trigger 404 (Fig. 29*e*). When the rewinding operation is complete, the coil 600 will be reenergized causing the point 600*c* to transfer its signal, which in turn transmits it to the trigger 404 (Fig. 29*e*). Trigger 404 in turn transmits the signal from the single shot multi-vibrator 406 to the inverter 408, and from there to the switch 410 to again start the sorter.

TAPE DRIVE MECHANISM

Since the invention is designed to read data magnetically recorded in random fashion on a tape and to sort such data in rearranged order into a second magnetic tape, mechanism has been provided herein for driving tape through tape reading, writing and erasing heads.

Figure 11:
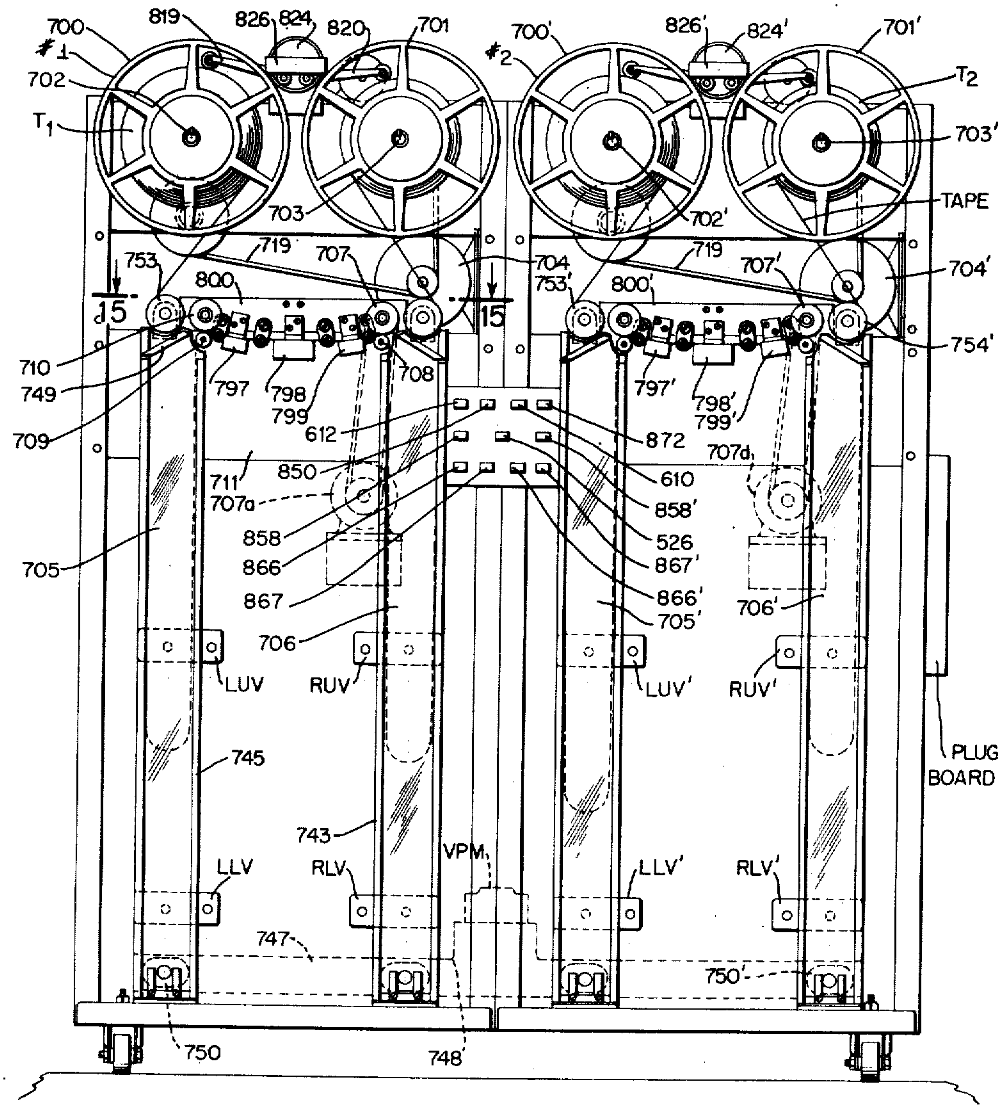
Fig. 11 is a front elevational view of a pair of identical tape driving mechanisms for driving a pair of record tapes during the sorting operations.

A general understanding of the tape winding and unwinding mechanism which shall be generally referred to herein as the tape driving mechanism may be attained by brief reference to Figs. 11 and 12 of the drawings wherein there are general views of the structure involved. By reference to Fig. 11 it will be seen that the tape driving mechanism comprises a tape drive #1 and a tape drive #2. For purpose of this description the tape in tape drive #1 may at least initially be considered as the file or input tape on which data is magnetically recorded in random fashion, and the tape in tape drive #2 may be considered as a blank tape into which, at least in the first instance, the initial sort of data is recorded. Throughout the specification the tape in tape drive #1 is designated as T1, while the tape in drive mechanism #2 is designated as T2. Inasmuch as the structure and function of tape drive mechanism #1 and tape drive mechanism #2 is identical in all respects, a detailed description of the mechanism and function of tape drive mechanism #1 will suffice as a description of both. The same parts in tape drive mechanism #2 are identified by the same reference numerals with a superimposed prime.

In Fig. 11 a pair of tape reels 700 and 701 adapted to hold a coil of record tape are intermittently driven to provide a pair of tape loops upon which the mechanism for feeding the tape through the reading, writing and erasing heads may call as the tape is fed during either a reading or recording operation. Special mechanism has been provided, as will be developed later herein, for rewinding the tape. The tape reel 700, which in the first instance may be the file reel, is mounted on a drive spindle 702. It may be assumed that the data on T1 in the first instance is numerical data recorded thereon in random fashion, and that it is desired to drive the tape through the reading, writing and erasing heads and rewind the tape onto reel 701 during the reading or recording operation. For this purpose the reel 701 is also mounted on a spindle 703 which may be driven. For the purpose of this description we shall refer to the spindle 702 as the file reel spindle and to the spindle 703 as the machine reel spindle.

The file reel drive spindle 702 and the machine reel drive spindle 703 are selectively rotated by a motor 704. The motor 704 normally imparts constant drive to a pair of electromagnetic clutch mechanisms mounted on each of the drive spindles 702 and 703. An electromagnetic brake is mounted on each of the drive spindles so that the spindles may be locked against rotation. The nature of the electromagnetic clutches and the electromagnetic brake will be developed in greater detail at a later point herein.

Upon selective clutching of the electromagnetic clutch mechanisms in drive relation to the drive spindles 702 and 703, these spindles and consequently the tape reels 700 and 701 attached respectively thereto may be caused to turn.

Since the mechanism is designed for high speed feed of tape through the tape processing heads, it is important that a supply of tape be provided with little load or tension thereon, and to this end the driving mechanism for the reels 700 and 701 provides a pair of tape loops each one of which is disposed in tape control columns identified in Fig. 11 by the reference numerals 705 and 706 respectively. Each of the columns 705 and 706 has therein means responsive to the position of the respective tape loops for maintaining a relatively stable position of these loops within their respective columns. The loop sensitive means within the columns 705 and 706 control the reel drive mechanism in such manner that the loops, so to speak, are self-compensating. The tape reel drive mechanism for each reel operates independently of the other, and both reels are driven independently of feed of tape through the tape processing heads.

Tape from the loop supply in the column 705 is driven through the erase head, the reading head "A" and the writing head "B" by means of a constantly rotating tape drive capstan. In Fig. 11 a tape drive capstan 707 may be deemed to be constantly rotating in a counterclockwise direction. In connection with the drive capstan 707 there is provided a tape moving idler pulley 708. The pulley 708 is adapted to move a tape passing thereover into driving contact with the drive capstan 707. As will be pointed out more fully as the description hereof proceeds, the tape idler pulley 708 is mounted on a common linkage system with a movable tape braking idler 709 which is operatively positioned with respect to a fixed tape braking idler 710, so that a common control is provided for either driving the tape through the tape processing heads or for halting drive thereof.

Figure 14:
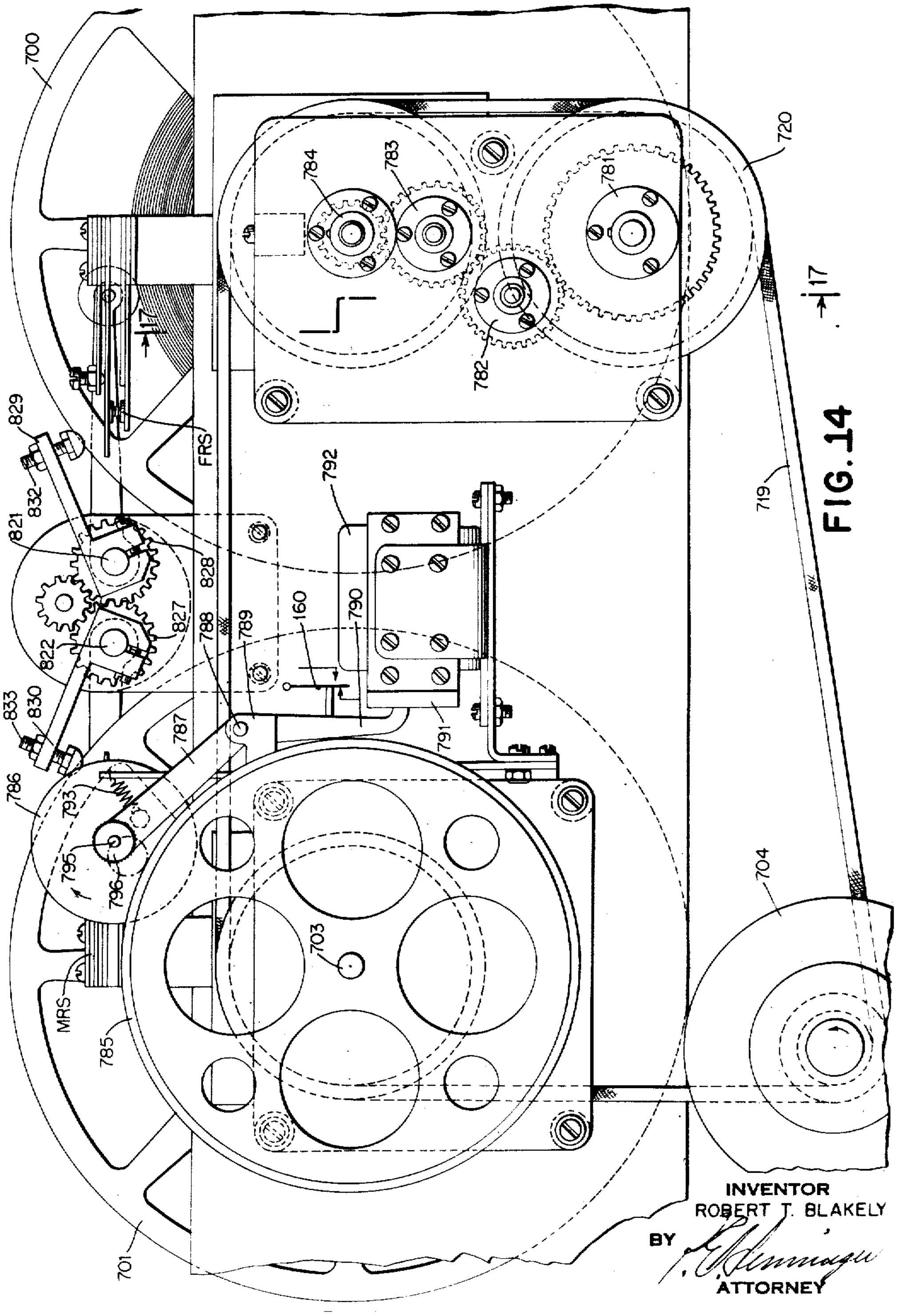
Fig. 14 is a rear elevational view of the tape reel driving and control mechanism taken on the line 14—14 of Fig. 12.
Figure 16:
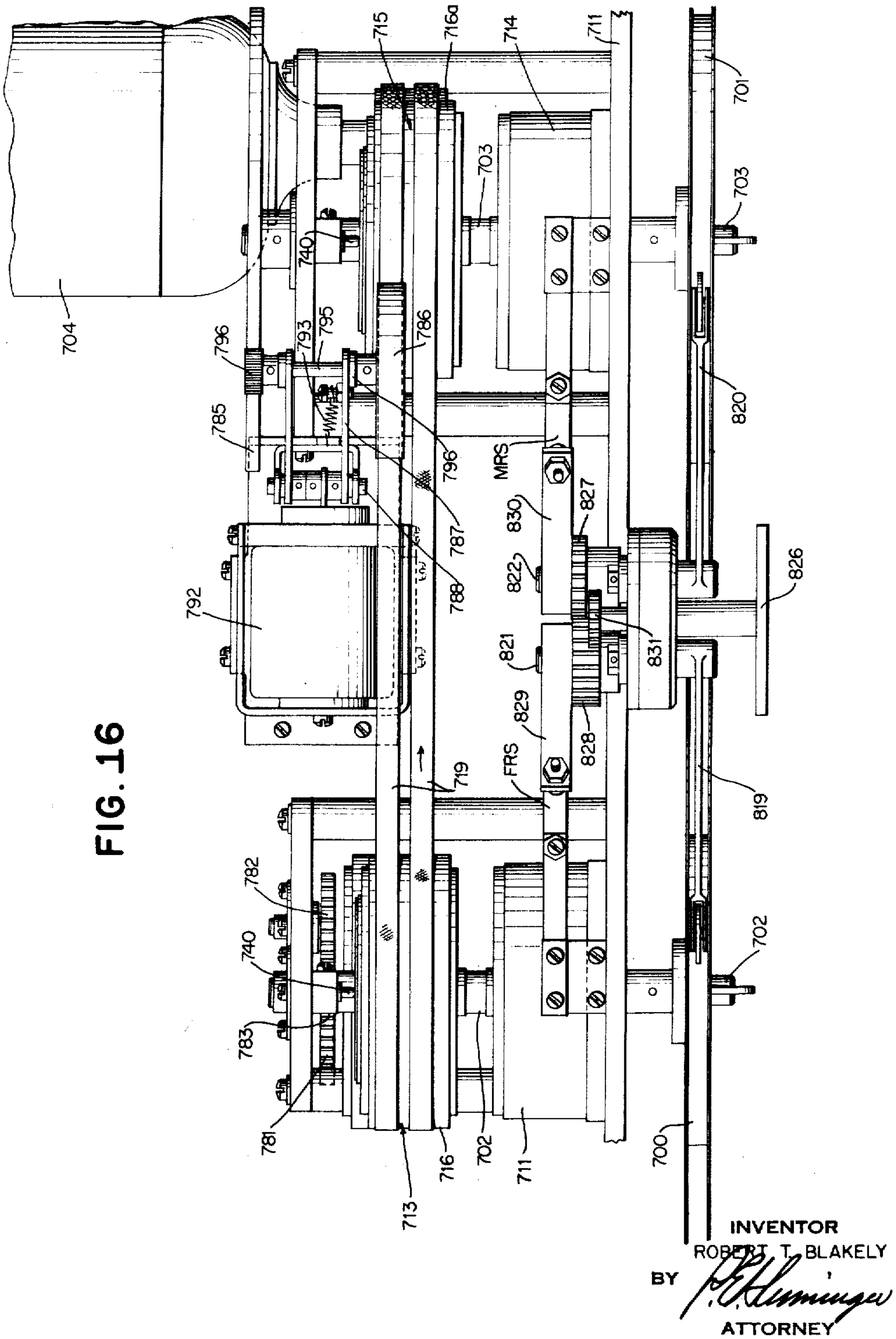
Fig. 16 is an elevational view of the reel drive and control mechanism of Fig. 14.
Figure 17:
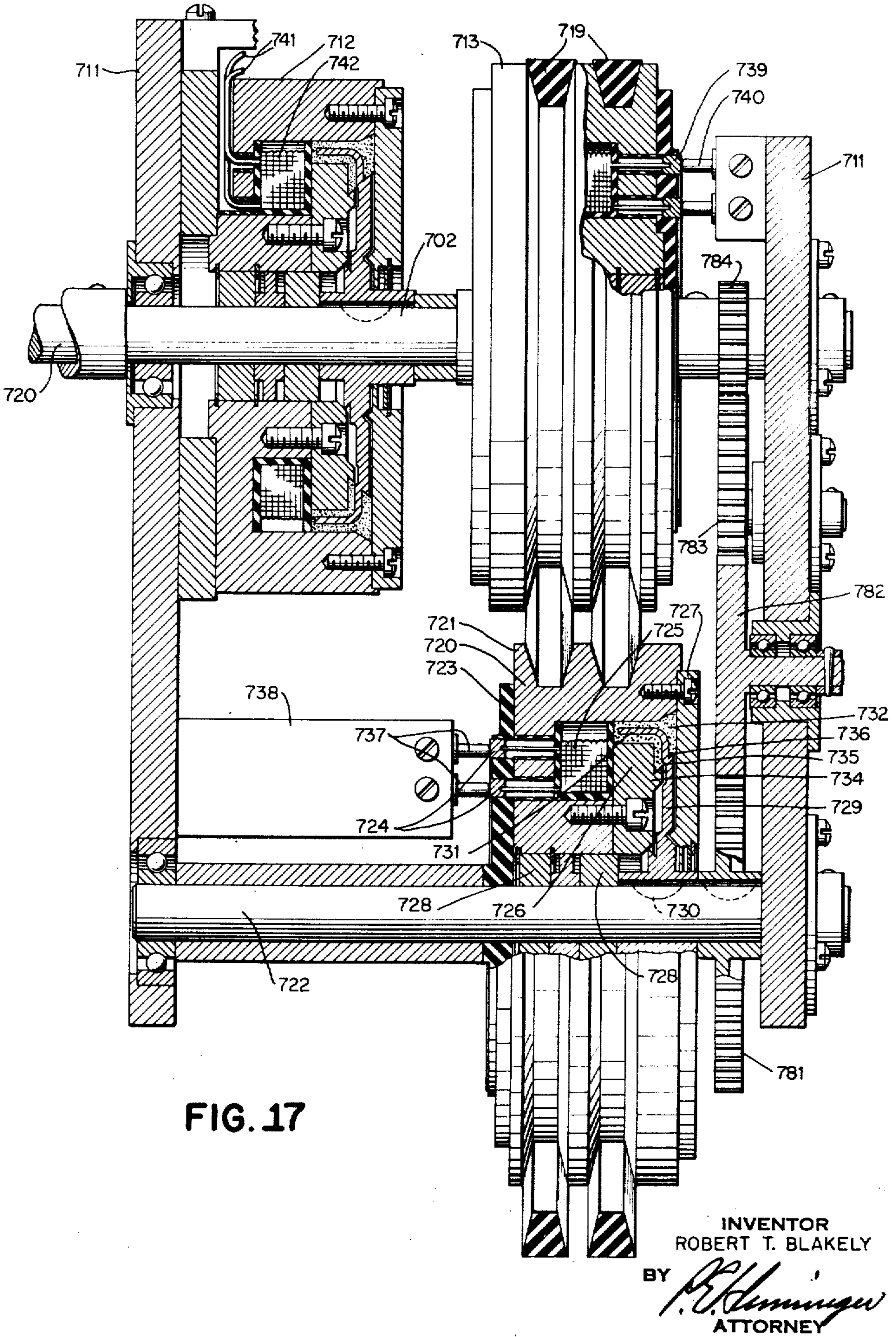
Fig. 17 is a view taken on line 17—17 of Fig. 14, wherein some of the structure is shown in section.

The mechanism for driving the spindles 702 and 703, and consequently their respectively attached reels 700 and 701, may now be referred to in connection with Figs. 14, 16 and 17, and particularly Figs. 16 and 17. The spindles 702 and 703 are mounted for rotation in a frame member 711. The spindle 702 has mounted thereon an electromagnetic file reel brake 712 and an electromagnetic drive clutch 713. The drive clutch 713 may be considered as a forward drive clutch. The machine reel spindle 703 has mounted thereon an electromagnetic machine reel brake 714, and an electromagnetic tape take-up clutch 715. Drive rings 716 and 716a of the clutches 713 and 715 respectively are adapted for constant rotation under the influence of the drive motor 717.

By reference to Fig. 12 of the drawings it will be seen that the drive motor 717 is mounted on a supporting structure in such position that the motor shaft 718 extends forwardly into substantially vertical alignment with the related clutch ring 716a. The clutches 713 and 715 are driven in a clockwise direction by the motor 717 through a pair of drive belts 719 which engage in peripheral grooves of the drive rings.

In Fig. 11 of the drawings it may be seen that the tape T1 is so trained about the reels 700 and 701 that when these reels are driven in a clockwise direction, the clutch 713 operates as an unwinding clutch, whereas the clutch 715 operates as a winding clutch.

The file reel brake 712 and the machine reel brake 714 each has the outer shell thereof fixed to the frame member 711 by means of machine screws, thereby providing an anchor for these shells when either brake is energized to lock its respective shaft against rotation.

Fig. 17 of the drawings illustrates the specific nature of the brake and clutch units. These units, other than described above, are of identical structure and a description of the rewind clutch 720 will, therefore, suffice as a description of both of the drive clutches and their associated brakes. The driving member, including the outer shell 721, is mounted on the rewind shaft 722 for free rotation thereon. The driving member includes an end plate 723 in which is mounted a pair of commutator rings 724 which are in the electrical circuit of an electromagnetic coil 725 mounted within an annular recess in the driving member or outer shell 721. The coil is held in its recess by an annular plate 726. The opposite face of the clutch structure, that is to say the outer shell thereof, has fixed thereto a closure plate 727. Suitable hub rings 728 support the driving member 720 for rotation on the shaft 722.

A rotor 729 is spaced from and disposed between the annular plate 726 and the closure plate 727. The rotor 729 is keyed to the shaft 722 by means of a suitable keying structure 730 and extends radially from the shaft 722 into the gap formed between the annular plate 726 and the closure plate 727. The peripheral portion of the rotor 729 is dished inwardly into a plane substantially coaxial with the axis of the shaft 722.

It will be apparent now that when the outer shell 721 of the clutch structure and the rotor 729 are caused to rotate in unison, drive will be imparted to the shaft 722.

Such drive coupling is achieved through the use of iron powder 732 disposed between the clutch shell 721 and the rotor 729. The dished portion of the rotor 729 is spaced from the inner wall of the recess formed in the drive shell 721. The recess in the drive shell in effect forms an annular channel adapted to receive the inturned or dished portion 731 of the rotor 729. The inturned portion or flange 731 is so positioned as to provide a substantially equal space on opposite faces thereof in reference to the oppositely disposed walls of the annular channel formed between the inner face of the shell 721 and the outer face of the annular plate 726. The iron powder 732, in a sufficient amount to substantially fill the remaining space of the channel, will "freeze" and thereby clutch the inturned flange 731 of the rotor 729 to the shell 721 of the clutch structure whenever the coil 725 is energized.

Centrifugal force acting on the iron powder 732 ordinarily maintains the powder in the channel adjacent the inturned or dished end 731 of the rotor. However, in order to avoid the possibility of powder loss into the bearing structure of the clutch assembly, the annular plate 726 is provided with an annular rib 734 which extends into an annular groove 735 on the inner face of the rotor 729. The annular rib 734 is outwardly slanted to provide a trough for powder that may find its way inwardly along the clutch structure, particularly at such times when the coil 725 is deenergized. A similar rib and trough 736 are formed on the outer face of the rotor 729 for preventing passage of powder inwardly along the outer face of the rotor.

The commutator rings 724 are in contact with a pair of brushes 737 carried on the end of a connector block 738 which is fixed to the frame 711. The clutches 713 and 715 are identical in structure to the rewind clutch just described, with the exception that the commutator rings, for example 739 in Fig. 17, and the contact brushes 740 are arranged at the opposite face thereof. This is the same as saying that the clutches 713 and 715 are reversed in their position on their respective shafts.

A comparison of the structure of the brake 712 in Fig. 17 with the details of the rewind clutch, which has been specifically described, will disclose identity with the exception that no commutator rings need be employed for the reason that the shells of the brakes, as hereinabove noted, are fixed to the frame 711. This makes it possible to effect a direct circuit connection by means of leads 741 between the coil 742 of the brake and the power source.

It now follows that the energization of the coils in the several clutch assemblies, while the shells thereof are driven, will result in the corresponding drive of their respective spindles. By the same token these spindles will be held against rotation whenever the clutch coils are deenergized and the coils in the brake assemblies associated therewith are energized.

As will be seen at a later point herein, the control circuit for the respective reel clutches is such that drive through either thereof on a drive spindle will take place only upon deenergization of the associated brake assembly coil, and that ordinarily the coil in the brake assembly will be energized to hold its associated spindle against rotation when the clutch coils are deenergized.

It has been mentioned heretofore that the position of the tape loops in the control columns 705 and 706 is utilized to control the rotary movement of the tape reels 700 and 701. Herein, by way of example, there has been illustrated a vacuum switch control system for achieving this objective. The control columns 705 and 706 are of the same construction, and the specific nature thereof may be seen in Figs. 18 and 19 of the drawings. The columns comprise a pair of side walls 743, a back panel 744, a transparent face panel 745 and a bottom wall 746, all joined together in air-tight contact.

At the base of the columns 705 and 706 is a header 747 (Fig. 11) with which the columns communicate. The header 747 is connected with a vacuum pump 748 (Fig. 11) adapted to be driven by a suitable motor VPM. The foregoing provides a structure by means of which the control columns 705 and 706 may be evacuated when the upper ends thereof are closed against the atmosphere.

At the upper end of each control column is a guide plate 749 whose lower surface is slightly spaced from a correspondingly shaped upper edge of the transparent face panel 745. The lateral extremities of the guide plate 749 serve to support the opposite bights of the tape loop within the control column and the space between the guide block and the upper edge of the column face panel constitutes a slot through which a tape loop may be threaded for insertion into the control column. The face plate 745 of the column has formed at the bottom thereof a hand opening 750 normally closed by an air-tight closure 751 which is held in position by a spring clip 752. This opening constitutes a clean-out passage.

The side walls 743 of the vacuum columns 705 and 706 are of a width substantially equal to the width of the tape being processed in the sorter. When a tape loop is formed, therefore, in either of the tape control columns 705 or 706, the oppositely disposed marginal edges of the loop will be in substantial contact with the base plate 744 and the face plate 745 of the respective vacuum columns. The back of the tape in the tape loop is slightly spaced from the side walls of the vacuum columns through substantially the entire length of the loop, but the bight of the loop is in substantial contact with the side walls. This disposition of the tape loop within the vacuum columns 705 and 706 is assured by the tape guide structure. As the tape is fed into and out of the control columns 705 and 706, it passes over idler guides 753 and 754 positioned at the outer sides of the control columns 705 and 706 respectively. At the opposite sides of the columns are the idlers 709 and 708, respectively, which have heretofore been referred to. The horizontal distance between the guide peripheries of the idlers 753—709 and 754—708 is somewhat less than the spacing of the inner faces of the column side walls 743.

The particular horizontal spacing of the guide idlers assures that the inner face of the tape is in contact with the oppositely disposed ends of the guide plates 749 at the top of the vacuum columns. These guide plates, therefore, determine the spacing of the tape bights at the entrance to the columns. Since the distance between the ends of the guide plate 749 is somewhat less than the internal width of the vacuum columns, the back of the tape will be spaced slightly from the column side walls through the major portion of the tape loops, the loops, however, widening out at their lower ends to contact the side walls of the columns, thereby forming an air seal between the lower portion of the tape column and the column walls.

Figures 18, 19, 20, 21:
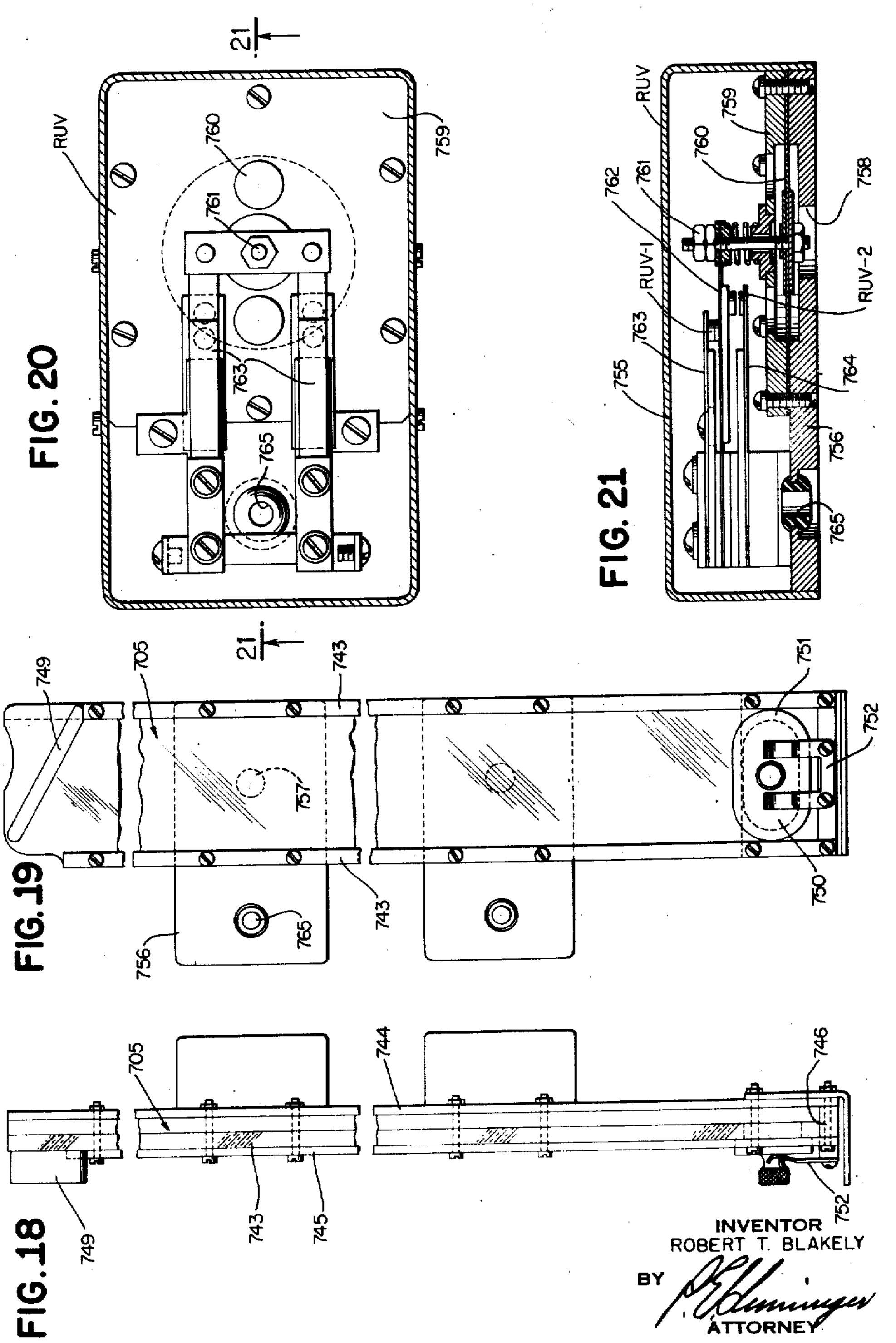
Fig. 18 is a side elevational view of a tape controlled vacuum column.
Fig. 19 is a front elevational view of the column shown in Fig. 18.
Fig. 20 is a plan view of a vacuum switch utilized in the vacuum columns of Figs. 18 and 19.
Fig. 21 is a sectional view on line 21—21 of Fig. 20.

Spaced along the length of each of the control columns 705 and 706 are two vacuum operated switches, the details of which are shown in Figs. 20 and 21. In Fig. 11 of the drawings the vacuum switch LUV is the left upper vacuum switch, while the switch LLV is the left lower vacuum switch. In similar fashion the control column 706 has a right upper vacuum switch RUV and a right lower vacuum switch RLV.

The vacuum switches have a normally closed contact point and a normally open contact point. The switches communicate with the interior of their respective control columns through an aperture in the back plate 744 thereof. By reference to Fig. 21 it will be seen that the vacuum switch structure is enclosed in a shell 755 which fits snugly against a base plate 756, the base plate being attached to the back panel 744 of the control column, so that an aperture 757 (Fig. 19) of the back panel registers with a passage 758 (Fig. 21) in the base 756 of the switch structure. Within the cavity formed between the base plate 756 of the switch structure and an overlying block 759 is a pressure-responsive diaphragm 760 to which a contact operating shaft 761 is attached, this connection between the diaphragm and the shaft 761 being air-tight. Adjustably secured to the opposite end of the contact operating shaft 761 is a spring contact 762 having contact points thereon adapted to contact corresponding points on fixed contact fingers 763 and 764. Outward deflection of the diaphragm 760 under the influence of atmospheric pressure when its associated control column is evacuated will cause the points on the contact finger 762 to transfer.

For the sake of uniformity herein, it may be assumed that the contact carried on the finger 763 is a normally closed contact, while the contact on the finger 764 is a normally open contact. Furthermore, the contact on the finger 763 may be designated as the RUV-1 contact, whereas the contact on the finger 764 may be designated as the RUV-2 contact. A similar system of numbering is applied to the other vacuum switches when the circuit description is rendered in connection with the electrical control diaphragms of the drawings, and particularly in reference to Figs. 29*m*, 29*p*, 27*q* and 29*r*.

Under the foregoing conditions, any time that the diaphragm 760 is subjected to vacuum within the vacuum columns, atmospheric pressure on the opposite face of the diaphragm will cause transfer of the switch points, i. e. the points RUV-1 of Fig. 21, for example, will open, while the points RUV-2 will close. Electrical connections with the switch blades are made through a connecting bushing 765 at one end of the base plate 756.

During normal operation of the machine, the tape loops in columns 705 and 706 will be disposed between switches RUV—RLV and LUV—LLV of the respective column pairs. Under these conditions the switches LUV and RUV are subject to atmospheric pressure only, whereas switches LLV and RLV are influenced by vacuum in the columns 705 and 706, the tape loops constituting an air column seal above the switches LLV and RLV. The tape drive mechanism is designed so that the tape loops in the columns 705 and 706 are maintained between the respective upper and lower vacuum switches. To this end two of the vacuum switches are in the control circuit of the magnetic coil in the tape drive clutches, while the other two are in the control circuit of the magnetic coil of the brakes.

The vacuum switch control of the clutch and brake coils will appear from a reading of the tape drive control circuit description which is to follow at a later point herein. It is sufficient to state at this point that the operation of the tape reels 700 and 701 is in effect a self-compensating operation, whereby the tape loops in the control columns 705 and 706 are maintained in an optimum position, and, furthermore, that the controls for the reels 700 and 701 are independent each from the other.

Figure 22:
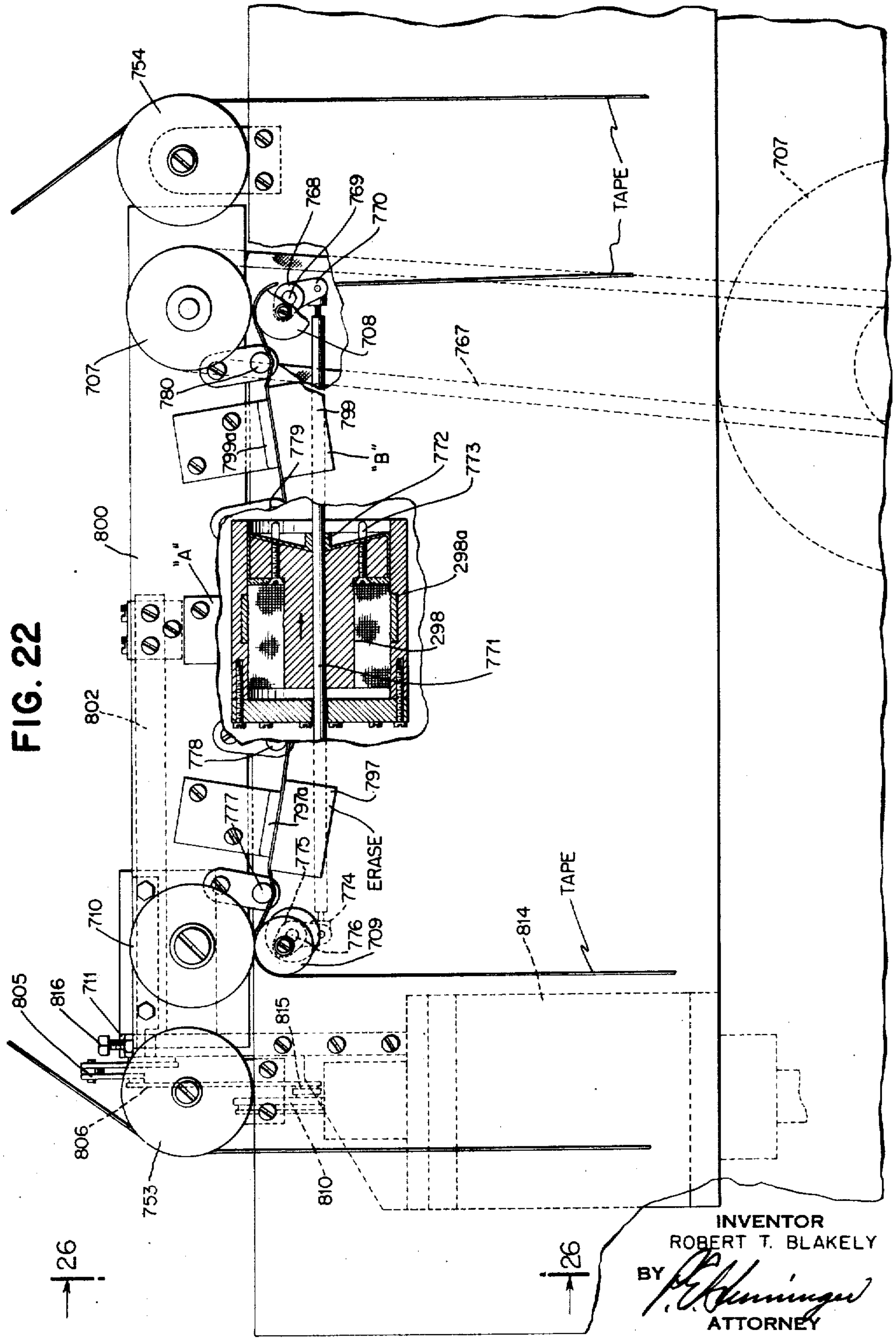
Fig. 22 is a front elevational view of the mechanism for driving a record tape through the tape processing heads, part of the face panel having been broken away to show a sectional view of an underlying operating coil.

In the very brief statement of the operation of the tape drive mechanism hereinabove, it was pointed out that the tape is driven through the tape processing heads in one direction only. Fig. 22 of the drawings shows the mechanism by which the tape is driven from left to right. It has been stated hereinabove that the drive capstan 707 is constantly driven, this drive being under control of a capstan drive motor 707*a* (Fig. 11). The drive is effected through a suitable drive belt 767, and the rotation of the capstan 707 is in a counterclockwise direction. It has also been pointed out that when the tape moving idler 708 is moved to project the tape into contact with the drive capstan 707, the tape will be driven by pulling the same through the various processing heads. It remains to consider the specific structure by which the drive control is effected.

The tape moving idler 708 is mounted for rotary movement on one arm of a bell-crank lever 768, the latter being mounted for rocking movement about a pivot point 769. The opposite arm 770 of the bell-crank lever receives an actuating rod 771, which, when reciprocated, will either project the tape moving idler 708 into contact with the rotating drive capstan 707 or break such contact, depending on the direction of movement.

The actuating rod 771 passes through and is fixed to a moving clutch coil 298 and has joined thereto a cup-shaped member 772 which is conformed to the shape of one end of the core about which the coil 298 is disposed. A plurality of pins 773 are carried by the core 298*a* and are adapted to cooperate with guide holes in the cup-shaped member 772.

The moving clutch coil assembly is comprised of coils 298 and 298*a*. The coil 298*a* has a constant voltage applied thereto and consequently a correspondingly unchanged magnetic field. The coil 298a is in a fixed position within its housing. The coil 298 is, however, wound on a movable core which is attached to the tape control rod 771. The coil 298 is so arranged that a flow of current may be established therethrough from either direction. The field set up by the current in the coil 298 may either oppose the field set up by the coil 298a in which case the tape drive control rod 771 is driven in one direction along with the moving coil, or if the fields do not oppose each other it will move in the opposite direction with the coil 298. Thus the shifting of the tape drive control rod 771 with its associated mechanisms 708 and 709 can be controlled in either of two directions.

The opposite end of the operating rod 771 is adapted to engage the free arm 774 of a bell-crank 775 adapted to rock about a pivot pin 776. The construction and mounting of the bell-crank 775 is identical to that of the bell-crank 768. The upper arm of the bell-crank 775 has a tape braking idler mounted thereon which, when projected against the fixed tape brake 710, will clamp thereagainst the tape and prevent further movement thereof through the processing heads.

When current in the coil 298 flows in one direction, the brake idler 709 will cooperate with the fixed tape brake 710 to clamp the tape, because under these conditions the operating rod 771 is in its limit position toward the left as viewed in Fig. 22, and as a consequence the bell-crank 768 is rocked in a counterclockwise direction about its pivot 769 to separate the tape moving idler 708 from the drive capstan 707.

When, however, the coil 298 is energized by current flowing in the opposite direction, the operating rod 771 will move to its limit position toward the right, thereby projecting the tape moving idler 708 against the tape drive capstan 707, while at the same time rocking the bell-crank 775 in a counterclockwise direction to separate the tape braking idler 709 from the fixed tape brake 710.

The tape is guided through the "erase" head, the reading head "A" and the writing head "B" by means of a plurality of guide pins 777, 778, 779 and 780.

It is contemplated that the tape may be driven through the tape drive mechanism while processing of the tape at one speed, for example 140 inches per second, and that the same will be rewound at a greater speed, for example 800 inches per second. This differential in the processing and rewinding speed results in the saving of a substantial amount of tape processing time in light of the fact that each sorting operation contemplates a plurality of rewinding operations for each complete sort.

The mechanism for rewinding the tape back onto the reel 700 is best shown in Fig. 14 of the drawings, and the mechanism is further illuminated in Fig. 17 of the drawings.

It will be recalled that the description of the clutch structures was specifically recited in respect to the rewinding clutch 720. When the control circuits receive a rewind signal, the coil 725 of the rewinding clutch 720 is energized, thereby transmitting rotary motion to the rewind shaft 722. The rewind shaft 722 is operatively coupled to the file reel spindle 702, through a train of gears having a ratio to secure the desired accelerated rewind.

By reference to Figs. 14 and 17, it will be seen that the rewind clutch shaft 722 has fixed thereto a gear 781 of large diameter. This gear is in driving engagement with a pinion 782 mounted for rotation in the frame 711. The drive is further continued through a second pinion 783 which is also mounted for rotation in the frame 711, and finally the pinion 783 imparts drive to a relatively small pinion 784 which is fixed to the file reel drive shaft 702. By virtue of the intervening pinions 782 and 783, the file reel will be driven in a counterclockwise direction to recoil the tape thereon. By reference to Fig. 14 it will be seen that as viewed from the back of the tape drive mechanism, the gear 781 is driven in a counterclockwise direction, the pinion 782 is driven in a clockwise direction, the pinion 783 is driven in a counterclockwise direction, and the file reel shaft 702 through its pinion 784 is driven in a clockwise direction. This motion when viewed in Fig. 11 imparts counterclockwise or rewinding rotation to the file reel 700.

If the tape being processed is pulled out of the control columns 705 and 706 and snapped tight between the reels at high rewind speed, there is serious danger that the tape may be damaged. In order to avoid this condition and to avoid attendant damage to the tape, there has been provided herein means for pulling the tape out of the vacuum columns and into high speed rewind position by supplemental means that is operative prior to the high speed rewind operation. The mechanism involved is illustrated in Figs. 14 and 16.

The inner end of the take-up reel drive shafts 703 has attached thereto an operating disc 785 which when rotated is effective to turn the spindle 703 and its attached tape take-up or machine reel 701. The means for imparting rotary movement to the operating disc 785 comprises a friction disc 786 mounted on one arm of a bell-crank 787. The bell-crank 787 is mounted for rocking movement on a pivot pin 788 carried by a bracket 789 fixed to the frame 711. The opposite arm 790 is attached to the core 791 of a solenoid 792, whereby movement of the solenoid core 791 is effective to rock the bell-crank 787 about its pivot 788, thereby pressing the friction disc 786 into contact with one of the drive belts 719. In this regard it will be noted that a spring 793, which has one end thereof attached to the bell-crank 787 and the other thereof to a fixed, upstanding post 794, effectively biases the bell-crank 787 about its pivot 788 to maintain the friction disc 786 in an elevated position and thereby out of contact with the drive belt 719. When the solenoid 792 is energized, however, its core 791 will be drawn inwardly, thereby rocking the bell-crank about its pivot point in a counterclockwise direction against the tension of the spring 793 to such a degree that the friction disc 786 is pressed into driving engagement with the drive belt 719. Under these conditions the shaft 795 to which the friction disc 786 is attached, and which is mounted for rotary movement in the bell-crank 787, will rotate. The depressed driving position of the friction disc 786 will result in engagement between the shaft 795 and the periphery of the operating disc 785. The shaft 795 preferably has a knurled wheel 796 attached thereto in the vertical plane of the operating disc 785, as best seen in Fig. 16, thereby assuring an adequate frictional drive contact between the wheel 796 and the peripheral edge of the operating disc 785.

Since the drive belt 719, as viewed in Fig. 14, is driven from right to left, the friction disc 786 will be driven in a clockwise direction, with the result that the operating disc 785 will be driven in a counterclockwise direction. This means, of course, that the tape take-up reel 701, as viewed from the front in Fig. 11, will be driven in a normal or clockwise direction to continue taking up tape. Such take-up will proceed at a relatively slow speed until the tape loops in the control columns 705 and 706 have been taken up onto reel 701 and the tape between the reels 700 and 701 is relatively tight. At the end of this preliminary slow speed take-up, the high speed rewind mechanism heretofore described will come into operation to rewind the tape onto the file reel 700.

Movement of the bell-crank arm 790 controls the position of the switch blade 160. In the normal, inoperative position of the preliminary take-up mechanism, the blade 160 is in contact with the switch point at the left of Fig. 14, whereas upon operation of the preliminary take-up mechanism, when the bell-crank arm 790 is rocked to the right in Fig. 14 by the solenoid core, the left contact will be broken but the switch blade 160 will be transferred to the right position into contact with the point at the right as viewed in Fig. 14 of the drawings. The function of the switch blade 160 has been referred to hereinbefore, and shall be dealt with further in the more detailed description of the tape drive mechanism control circuits.

Figure 15:
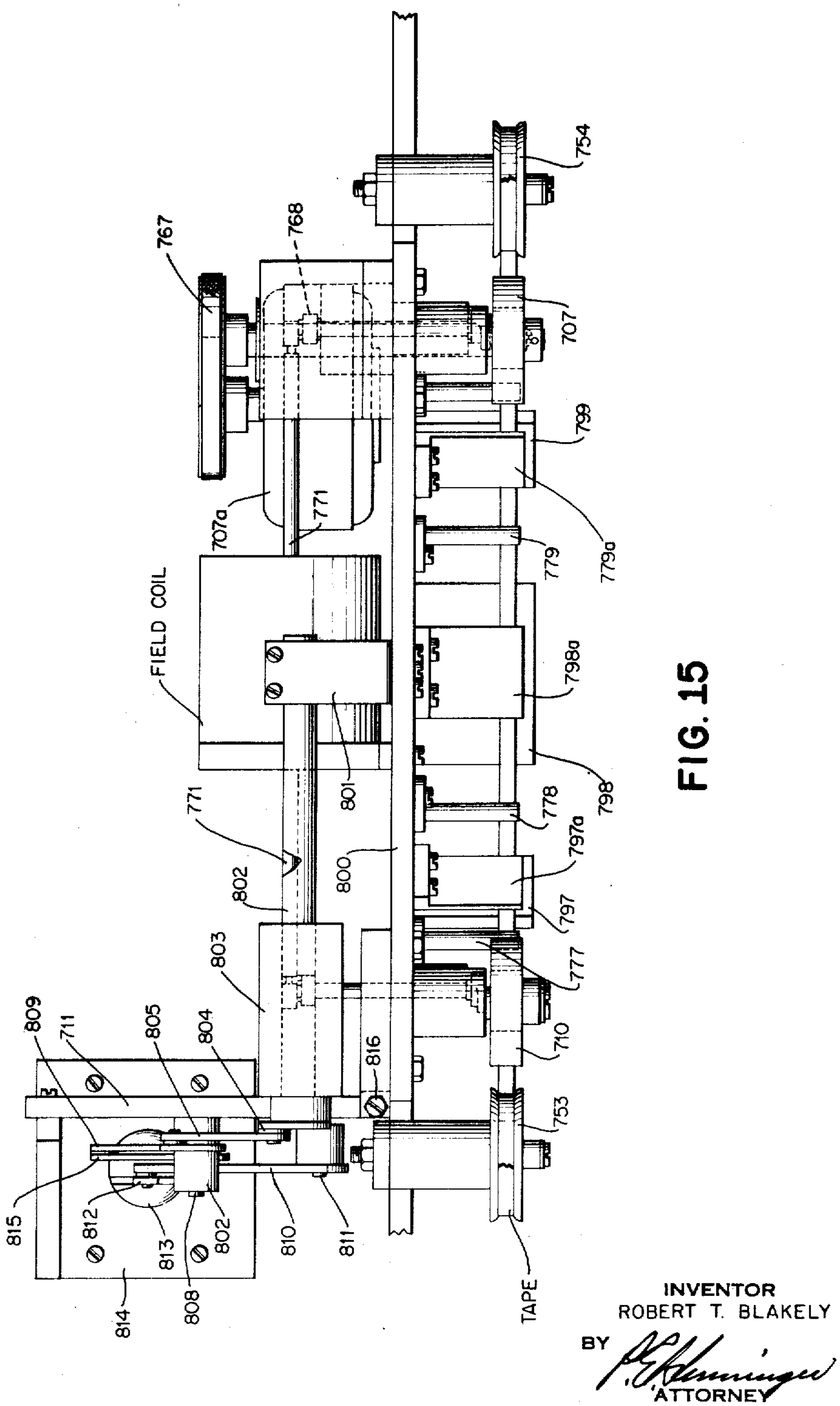
Fig. 15 is a plan view taken on the line 15—15 of Fig. 11.

The erase head, the reading head "A" and the write head "B" have their circuit connections in the bases 797, 798 and 799, respectively. The bases of these processing heads are fixed to the face panel of the frame 711, but each, as best seen in Fig. 15 of the drawings, includes a cover element 797*a*, 798*a* and 799*a* which, if immovably positioned, would constitute an impediment to the threading of the tape and to the rewinding thereof. Consequently, these covers, as well as the guide pins 777, 778, 779 and 780, together with the drive capstan 707 and the tape brake 710, are carried by a plate 800 which may be swung upwardly. The arrangement referred to is best shown in Figs. 26 through 28 of the drawings.

The plate 800 has a rearwardly extending bracket 801 (Fig. 15) by means of which the plate is supported from a shaft 802 which is mounted for rocking movement in an elongated bearing 803. The outer end of the shaft 802 has affixed thereto an arm 804 to the outer end of which is pivoted a link 805. The link 805 has its opposite end pivoted on an arm 806 of a bell-crank 807. The bell-crank 807 is mounted for rocking movement on a pivot stud 808 extending laterally from the frame 711. The opposite arm 809 of the bell-crank 807 has a pivoted connection between a toggle linkage to which an operating force is applied. The toggle linkage consists of a lever 810 which has one end thereof mounted for rocking movement on a stud 811 extending outwardly from the frame 711. The opposite end of the lever 810 is connected by means of a link 812 to the core 813 of a solenoid 814. The arm 809 of the bell-crank 807 is connected to the lever 810 at a point between the core 813 and the pivot stud 811 of said lever by means of a link 815.

Figure 27:
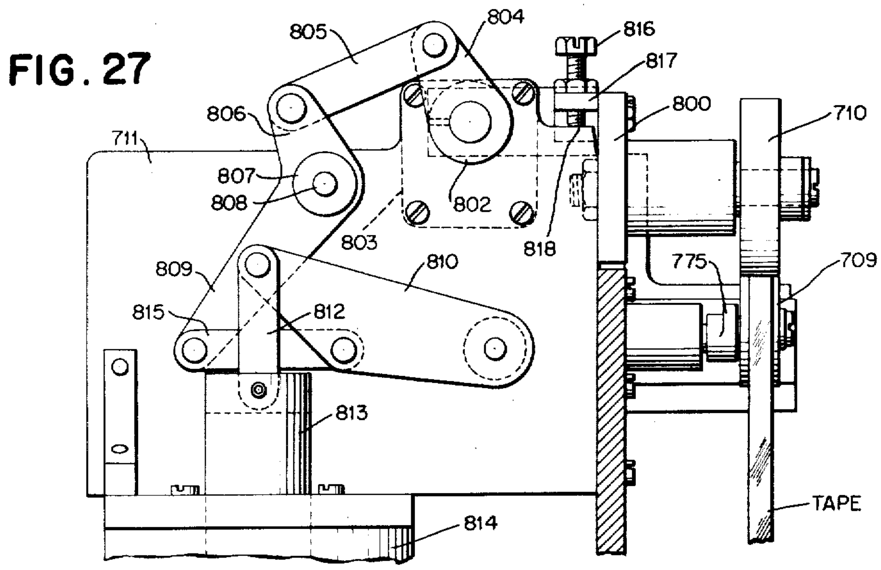
Fig. 27 is a side elevational view taken on line 27—27 of Fig. 22.
Figure 28:
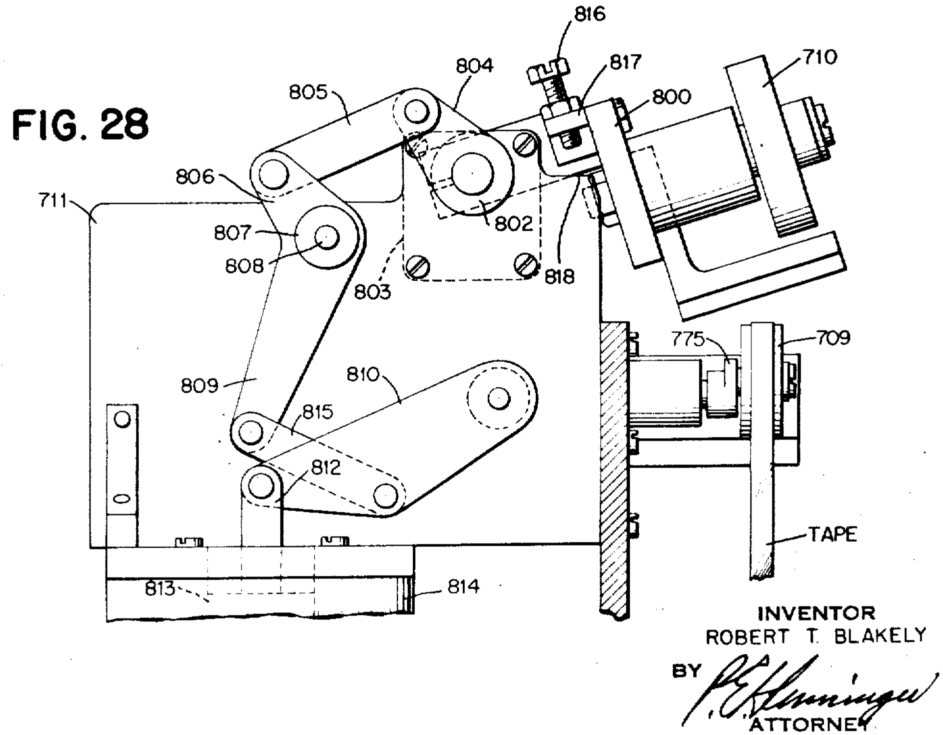
Fig. 28 is a side elevational view of the mechanism of Fig. 27 with that mechanism in a second position of operation.

The weight of the plate 800 and the devices carried thereby is sufficient to hold it in its normal operative position, which is the position shown in Figs. 26 and 27. However, when the solenoid 814 is energized, its core 811 will be attracted and pulled downwardly with the result that the lever 810 is rocked in a counterclockwise direction about its pivot stud 811 into the position shown in Fig. 28. This results in the counterclockwise rocking of the bell-crank 807 and the rocking of the shaft 802 in a counterclockwise direction with the result that the plate 800 and the devices carried thereby will be rocked into the position shown in Fig. 28 of the drawings. This at once opens the various processing heads for the threading of tape therethrough, or in the alternative operation it frees the tape for rewind under the influence of the preliminary take-up operation described hereinabove.

The ultimate operative position of the plate 800 and the devices carried thereby can be determined and adjusted by means of an adjusting screw 816 extending through a flange 817 attached to the upper edge of the plate 800 and abutting a shoulder 818 formed in the upper edge of the frame member 711.

Figure 23:
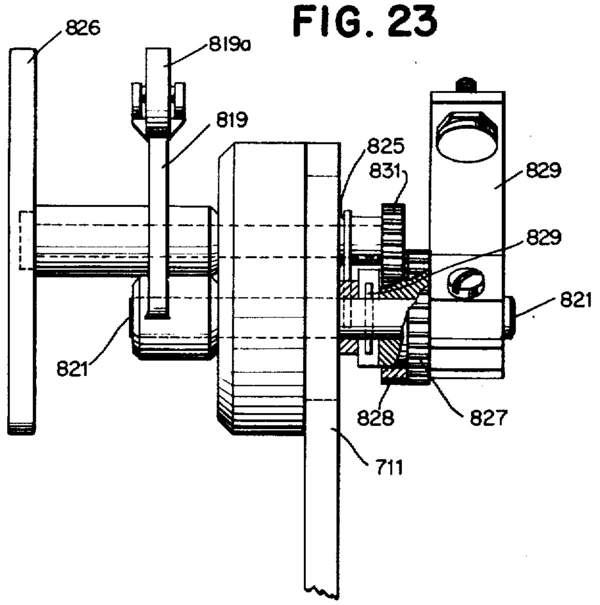
Fig. 23 is a side elevational view of a tape coil sensing mechanism.
Figures 24, 25:
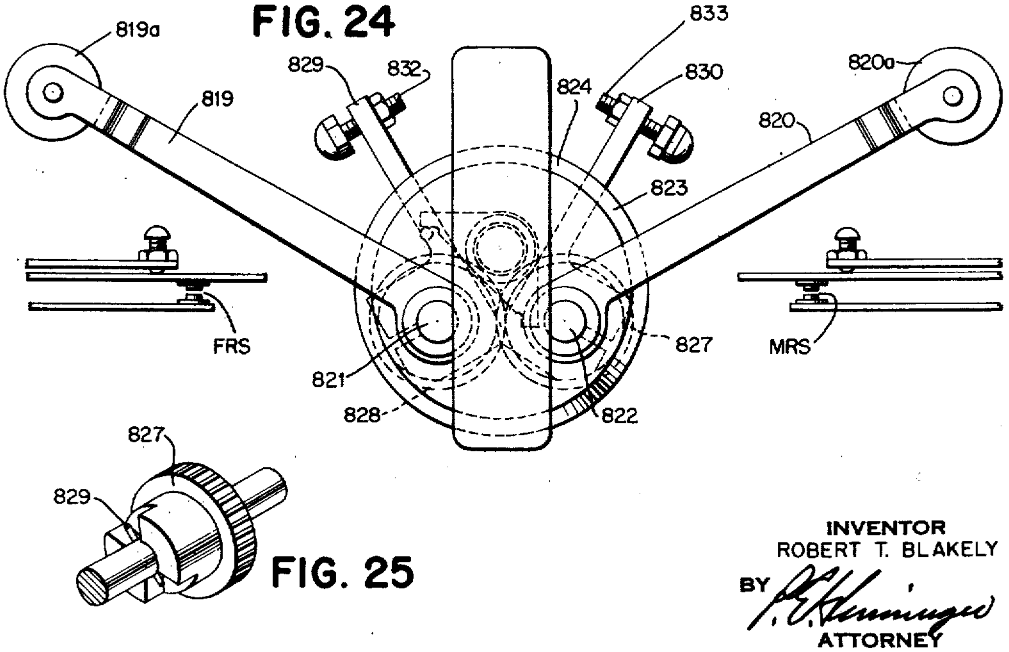
Fig. 24 is a front elevational view of the mechanism shown in Fig. 23.
Fig. 25 is a detailed structure of the mechanism in Figs. 23 and 24.

In Fig. 11 is shown a pair of tape contact arms 819 and 820. These arms are mounted for pivoting movement so that the ends thereof may ride freely in contact with the tape coils in the respective reels 700 and 701. Through this medium is provided a control mechanism to prevent the inadvertent complete run-out of tape from either of the reels, and also a safety control means operative when the arms 819 and 820 are retracted during the change of tape reels. Figs. 23 through 25 of the drawings illustrate the particular details of the tape contact arm mechanism. Specific reference may first be made to these figures for an understanding of the details of construction. The tape arms 819 and 820 have tape contacting rollers 819*a* and 820*a* at the free end thereof, respectively. These rollers are freely rotatable in the bifurcated free end of the arms 819 and 820 so that they ride lightly on the tape coil of the tape reels 700 and 701. The inner ends of the arms 819 and 820 are keyed to shafts 821 and 822, respectively. These shafts are journalled for rocking movement in a mounting block 823 which has a flange 824 by means of which the mounting block is mounted in the face panel of the frame 711 as shown in Figs. 11 and 23. An operating shaft 825 is mounted for rocking movement in the block 823 at a point midway between the shafts 821 and 822 and slightly thereabove. The forwardly projecting end of the operating shaft 825 has an operating handle 826 affixed thereto.

The distal ends of the shafts 821, 822 and 825 extend beyond the rear face of the mounting block 823 at which point intermeshing gears are mounted on the respective shafts.

The shafts 821 and 822 have mounted thereon a pair of gears for limited rotation in respect to the shafts. Fig. 25 of the drawings illustrates one of these gears which may be recognized as the gear 827 on the shaft 821. The other shaft 822 has a gear 828 mounted thereon in similar fashion to permit a limited relative movement between the shaft and the gear.

The relative movement between the shafts 821 and 822 and their respective gears 827 and 828 is for the purpose of permitting movement of the respective arms 819 and 820 and a pair of contact making and breaking fingers 829 and 830 which are fixed to the ends of shafts 821 and 822, respectively, without reference to rotation of the operating handle 826.

With reference to Fig. 25 of the drawings, it will be seen that the gear 827 and the gear 828, which is identical, are formed with a pair of outwardly diverging slots and a pair of pins, such as the pin 829, carried by each of the shafts 821 and 822. These pins extend into the slots of their associated gears. Thus, while the gears 827 and 828 are adapted for limited movement in respect to their respective shafts 821 and 822, the slot walls will engage the pins and rotate the shafts 821 and 822 when engagement between the pins and the walls is effected, as during rotation of the handle 826.

The manner in which movement of the handle 826 is imparted to the gears 827 and 828 is as follows: The operating shaft 825 has a gear 831 keyed thereto, and this gear, as best shown in Fig. 23 of the drawings, is in driving contact with the gear 828 which is relatively wide. The gear 827 in turn is in mesh with and drives the gear 828. By means of this arrangement, rotation of the shaft 825 is imparted through the gear 831 to the gear 828 and to the gear 827 with the consequence that the shafts 821 and 822 are rotated when the respective pins 829 come in contact with the slotted walls in their associated gears.

As intimated hereinabove, the shafts 821 and 822 have attached thereto a pair of circuit making and breaking fingers 829 and 830, respectively. The upper ends of these fingers mount adjustable studs 832 and 833, respectively. Contact between the studs 832 and 833 and a pair of normally open file and machine reel contacts FRS and MRS, respectively shown at the top of Fig. 14 and also in Fig. 24 of the drawings, will influence the control circuit as will be more fully described at a later point herein.

From the foregoing it will be seen that rotation of the handle 826 will transmit a torque through the gears to the tape contact arms 819 and 820 and to the circuit making and breaking fingers 829 and 830 and to elevate the arms and fingers. While the lost-motion connection between the gears 827 and 828 and their respective shafts 821 and 822 permits raising of the tape contact arms 819 and 820 and the circuit making and breaking fingers 829 and 830, consequently the circuit making fingers 829 and 830 are free to follow the tape coil on the reels 700 and 701.

The manner in which the tape drives are controlled by their associated control circuits may be gathered from a reading of the following description which is written mainly in reference to Figs. 29*n*, 29*p*, 29*q* and 29*r* of the drawings.

TAPE DRIVE CONTROL CIRCUITS

The power key 850 (Fig. 29*s*) is depressed and completes the circuit from the power source through the power key 850, through a pair of relays 851 and 852 to the other side of the power supply line. Contacts **851*a* and 852*a* close and furnish power to pick up a relay 853. Thus, the power supply is connected to a 40 volt rectifier 854 and through this supply and its associated circuits to the relays in the sorter. Having picked up the relay 853, its points 853*a* close and furnish power to the vacuum pump motor VPM and to the tape drive motors 704 and 704'. The power supply rectifier 854** (Fig. 29*s*) furnishes power to operate the relays located in the tape drives (Figs. 29*n*, 29*p*, 29*q* and 29*r*). This voltage is also used to power the tape drive clutches and brakes.

When power is applied to the control system, the vacuum pump motor VPM is immediately energized and draws air from the vacuum columns. When the 40 volt supply is energized, on-off relays 855 (Fig. 29*p*) and 855' (Fig. 29*r*) are energized. To energize these relays, their points **855*a*** (Fig. 29*p*) **855*a'*** (Fig. 29*r*) are closed and complete a circuit from the 40 volt power supply source, through the thread handle microswitch contacts **572*b* and 584*b*, through two relay points 590*a* and 590*a'*, through these points to the relay points 855*a* and 855*a'* to pick up a pair of relays 856 and 856'. Having picked up the relays 856 and 856', the circuit is now completed through the power supply, through the relay points 856*a* and 856*a'* and to the reel motors 704 and 704'** (Fig. 29*n*) and to the tape drive capstan motors **707*a* and 707*a'***, thus causing these motors to run.

At this point the operator will insert into tape drive #1 a master reel of tape having records thereon that are to be sorted. To load this tape it is necessary for the operator to raise the tape reel follower arms by means of the thread handle 826 (Fig. 11). When the handle 826 is operated, the contact 572 (Figs. 14 and 29*p*) is operated. When the contact 572 is operated, a circuit is completed from the power supply source through contacts 572 and **572*c* to operate a capstan relay 857. On tape drive #2, the thread handle contacts 584 correspond in every respect to the thread handle contacts of tape drive #1. Thus, if the thread handle on tape drive #2 is operated, the circuit will be completed from the power supply to the thread handle contact 584*c* and therethrough to energize a capstan relay 857'**.

When either capstan relay 857 or 857' is energized, their respective points **857*a* or 857*a'* are closed and complete a circuit from the power source through points 857*a* or 857*a'* to energize the capstan solenoid 814 or 814'. Upon energization of a capstan solenoid, the capstan plate 800 with its associated mechanism is turned to the open position shown in Fig. 28. The operator will now place the master reel on the file reel spindle of tape drive #1 as shown by reel 700 in Fig. 11. The tape is then threaded into the column 705 (Fig. 11), through the brake capstans 709 and 710, through the raised head 797, through the A-head 798, through the B-head 799, through the drive capstans 707 and 708 into the vacuum column 706 and from there to the machine reel 701**. The operator will follow a similar routine to load a blank or a tape with no useful information in the tape drive #2.

Since the vacuum pump motor VPM is energized, a partial vacuum or suction will exist in the vacuum columns, and as the operator threads tape into the drives the suction will take up any slack in the tape by pulling the tape into the columns. When the tape has been fully threaded, the operator will once again operate the thread handles 826 and 826', thus allowing contacts 572 and 584 in Figs. 29*p* and 29*r* to resume their normal position. As a safety measure for the operator when reels are being inserted, the thread handle contacts 572 and 584 have a normal position through which motor relays 586 and 586' are energized. These relays with their associated points control the running of the reel and capstan motors. Thus, while an operator is threading tape into the machine the motors cannot run and the operator cannot be injured.

During the loading process, when the operator threads the tape through the vacuum column 705 of tape drive #1, the tape may have stopped in any position depending on the amount of slack in the tape. Since it is the purpose of these vacuum columns to maintain sufficient tape to keep the tape drive capstans independent of the reels, it is necessary to determine if there is sufficient tape in the columns to accomplish this purpose. Therefore, load switches 858 and 858' are included in the control circuit. After the operator has loaded the tape, the load switch 858 (Fig. 29*p*) is depressed and the following action is initiated. A circuit will be completed from one side of the power line through the thread handle switch 572 to relay point **855*d* which was previously energized, to the lower left vacuum switch LLV and, if the tape is not properly loaded, through this point to load switch 858 and through it to energize relay 556. It can be seen, therefore, that if the tape is not properly loaded, depression of the load switch 858 will allow relay 566 to pick up. If the tape is not properly loaded and relay 566 has been energized, it will hold itself energized via the point 566*a*, through the left vacuum switch LLV, relay point 855*d*, through the thread handle switch 572 to the power source. As long as the lower left vacuum switch is closed, the relay 566 will remain energized. The tape must now be driven further into the column to effect a properly loaded condition. A circuit is established from the power supply, through the relay points 564*b*, through relay 860*a* to relay points 566*b* which are closed, through relay points 576*a* to resistor 861 and from there to the drive clutch 713. Having transferred relay points 566*b*, the circuit previously established for the brake coil 712 is broken. Thus, when the tape is not in a loaded condition, relay point 566*b* transfers and removes the energizing current from the brake and transfers it to the drive coil, thus causing the main reel to rotate and add tape to the left hand column 705 (Fig. 11). When the tape has been driven far enough into the column, the lower left vacuum switch LLV is caused to open by the suction in this vacuum column and the circuit for maintaining relay 566 in its energized state is broken. Having broken the energizing circuit for relay 566, relay points 566*b* resume their normal position and transfer the current which is being transmitted to the drive clutch 713 back to the brake 712. Thus through this procedure the operator has now, by depressing the load switch, caused the machine to put the proper amount of tape into the left hand vacuum column. For the loading of tape in tape drive #2 an identical procedure is followed. Upon completion of these operations, assuming the operator has inserted a properly wired plugboard, the machine is ready for operation. As previously discussed, the reset key is depressed to reset the machine circuits to their starting position. The machine is now ready for a column sorting operation. Upon depression of the starting key 612** (Fig. 29*m*), as was previously stated, the relay 594 was energized. Energization of the relay 594 causes transfer of its associated points and by its points also energizes relay 600 causing the triggers 432 and 404 in Fig. 29*e* to be operated. These triggers transmit impulses through their associated circuits and cause the triggers 272 and 424 (Fig. 29*d*) to be operated. As was previously mentioned, the output of the triggers 272 and 424 operates the clutch tape drive circuits as shown in Figs. 29*j* and 29*j'*.

As indicated in Fig. 22, the coil 298 is mounted on the tape drive control rod 771. In Fig. 29*r* are two field coils **298*a* and 298*a'* (see also Fig. 22) connected directly across the power source and are, therefore, constantly energized. In Fig. 22 the moving clutch coil assembly 298 is comprised of the aforementioned coils 298 and 298*a*. The coil 298*a* has a constant voltage across it and consequently a corresponding unchanging magnetic field. This coil is in a fixed position within a yoke of the assembly. Coil 298 is wound on a movable assembly which is attached to the tape drive control rod 771. It is a natural law that like magnetic fields repel while unlike magnetic fields attract. Since the current in coil 298a is unchanged, its magnetic field is fixed. The current flowing in coil 298 itself, however, is under control of the bridge including tubes 300, 302, 304 and 296** (Fig. 29*j*) so that the direction of the current flowing through this coil may be in either direction. It becomes obvious, therefore, since current can flow in either direction in coil 298, the field set up by this current may either oppose the field set up by coil 298a, in which case the tape drive control rod 771 is driven in one direction along with the moving coil, or it may be in the same direction in which case the tape drive control rod 771 will be driven in the opposite direction by the moving coil 298. Thus the shifting of the tape drive control rod 771 with its associated idlers 708 and 709 will be either to the left or right.

As stated before the idler 709 when driven against the roller 710 constitutes a brake mechanism to stop tape movement. Conversely, when the idler 708 is driven against the rotating drive capstan 707, the tape will be pulled through the heads to read or write depending upon the function of that tape drive. The operation of the coils 298 and 298a is independent of all control exercised by the vacuum columns. Upon depression of the starting key and operation of its aforementioned circuits, the tape drive control rod 771 is driven into the run position, i. e. to the left as shown on Fig. 22. As the idler 708 presses the tape against the rotating capstan 707, tape is pulled through the heads, from the left-hand vacuum column and is deposited into the right vacuum column. As tape is pulled from the left-hand vacuum column 705 in Fig. 11, and since the file reel 700 is at rest, the loop of tape within the vacuum column will shorten until it eventually is above the left upper vacuum switch LUV. At this point it becomes necessary to reenergize the clutch which controls the reel 700 to feed more tape into the vacuum column. To accomplish this end, point 564b of the run relay must be transferred to allow the left upper vacuum switch LUV to control the motion of the tape reel. A circuit is completed from the power supply through the thread handle switch 572 to file reel switch FRS, through the relay point 855b which has previously been closed, through the relay point 576c, through the relay point 566c to complete the circuit to energize the run relay 564. Thus, a circuit is completed from the power supply to the relay points 564b which have just been transferred, to the left upper vacuum switch LUV, through resistor 862, the left reel release switch 866, and to the brake coil 712.

As tape is pulled from the left-hand vacuum column, the tape rises above the left upper vacuum switch LUV which at this time transfers the current from the brake circuits just mentioned to resistor 861 and to the drive clutch coil 713, thus causing the machine reel 700 in Fig. 11 to rotate and feed additional tape into the left vacuum column. When sufficient tape has been fed into this column, the left upper vacuum contact LUV will drop back into the position shown in Fig. 29*p* and cause the current to flow through resistors 862 and once again through brake coil 712, thus stopping reel 700 from feeding more tape into this column. It is obvious, therefore, that the feed of tape into the left-hand vacuum column 705 from the reel 700 is under control of the left upper vacuum switch LUV.

The left upper and right upper vacuum switches are identical in structure, but the right upper vacuum switch is reversely wired as compared to the left upper vacuum switch. Thus, the reel 700 is driven when the tape is above the left upper vacuum switch LUV in the left column, whereas it is necessary to take up tape from the right column only when the tape is below the right upper vacuum switch RUV.

In order to pull tape from the right column it is necessary to close point 868a of the vacuum delay relay 868. Upon initial load of the machine, the circuit was completed from the power supply source through the thread handle switch 572, through relay points 855d which had previously been closed, through the right lower vacuum switch RLV, and through the switch RLV to energize the vacuum delay relay 868. A circuit is now completed from the power supply source, through the relay points 564a which have previously been transferred, to the right upper vacuum switch RUV, through the points shown closed, through the relay points 868a which have been transferred, through resistors 865 to energize the clutch drive coil 715. Thus reel 701 is caused to run and pull tape from the right vacuum column 706. When sufficient tape has been pulled from this column to activate the right upper vacuum switch RUV, the points will transfer the drive current through the RUV points to the resistor 864, through the right reel release switch 867 to the brake coil 714, thus stopping the right reel 701. It can be seen, therefore, that as the tape moves up and down in the right-hand column to a position below and above the right upper vacuum switch RUV, the clutch driven reel 701 will start and stop as required to keep the tape loop at a relatively stable point in the column.

The left and right lower vacuum switches LLV and RLV act as governors over the associated left and right upper vacuum switches LUV and RUV under the condition where there is no tape in the colums, which may occur during the initial load of these columns. Since no tape at all in the columns is identical to tape below the upper vacuum switches, their circuit is designed to instruct the reel 700 not to feed any more tape into column 705 and to instruct reel 701 to pull tape out of column 706. Since there is no tape in either column, if reel 701 attempted to take tape from the columns, it would snap the tape. The lower vacuum switches then override the instruction from the upper vacuum switches, causing reel 700 to feed tape into the column if the lower left vacuum switch does not sense tape in the column. The right lower vacuum switch prevents reel 701 from taking tape from the column if it senses there is no tape in the column.

Tape drive #1 is now running and prepared to read information and perform sorting operations on it resulting in transfer of certain selected records to T2 (drive #2). Eventually drive #1 will sense a tape mark, indicating the end of a tape being processed, circuitry for which is shown on Fig. 29*b*. The tape mark is transmitted from switch 94 (Fig. 29*b*) to the single shot multivibrator 412, in Fig. 29*e*. The thyratron 560 (Fig. 29*m*) energizes the relay coil 288. Since this is the first pass of tape as was previously described, the relay 556 is energized through its inverter 550. The inverter 550 is energized via relay point 186e (Fig. 29*f*). Since the sorting bit switch (Fig. 29*f*) is in its first position for the first bit sort, a signal is transmitted from the power source to the commutator 188a, to the segment 188b, to the commutator brush 188c and from those segments to the relay point 186e and thence to its closed points to energize the inverter 550 (Fig. 29*m*). The relays 552 and 554 at this time are deenergized. As a consequence of having only relay 556 energized, the 552d point is closed, and thus a circuit is completed from the power supply through the thread handle switch 572 (Fig. 29*p*) to relay point 288a (Fig. 29*m*) through this relay point 288a which has just been energized, through the relay point 552d, which is now closed, and back through relays 574 and 576 (Fig. 29*p*), thus energizing these two relays. Upon sensing the tape mark on the first pass of a bit sort, tape drive #1 picks up its rewind control relays 574 and 576. Tape drive #2 at this time will not initiate a rewind due to the fact that relay 576 (Fig. 29*m*)

is in an energized state under control of relay points (Fig. 29*f*) as previously described. Upon sensing of a tape mark, a signal is transmitted to deactivate trigger 424 (Fig. 29*d*). The trigger 424 is in direct control of the tape drive circuits of Fig. 29*j*. The trigger 270 (Fig. 29*d*) controls the clutch circuits in Fig. 29*j*′, and will be in an off position at this time. Thus both tapes will have stopped their forward travel. Since the relay coils 574 and 576 (Fig. 29*p*) have been energized, these relays would cause tape drive #1 to rewind.

Since there is tape in both the left and the right vacuum columns at the time of rewind, it is necessary to take this tape from the columns at the low speed before high-speed rewind is initiated. This will be done by rotating the machine reel 701 as follows: Energization of the relay 574 causes closure of the relay point 574*b* thus completing a circuit from the power supply to points 574*b* and 860*b* and from there to pick up the coil of the slow wind relay 869. The closing of the relay points at 869 completes a circuit from the power supply through the points 869*a* to energize the slow take-up solenoid coil 792. Thus, the slow take-up solenoid arm 790 (Fig. 14) is pulled in, thereby causing the arm to move on its pivot 788 and forcing the wheel 786 against the constantly driven V belt 719 and drive pinion against the periphery of the operating disc 785.

Relay point 576*c* (Fig. 29*p*) is opened by the operation of its relay coil 576 and thus breaks the hold circuit for the run relay 564 causing this relay to be deenergized. With the coil 564 deenergized, the points 564*a* and 564*b* drop back to their normal position. In order for the take-up mechanism to pull tape from the columns, it is necessary to deenergize the brake 714 on reel 701. This is done by means of points of the rewind relay 576*d* which open to break the circuit between the power supply and the brake coil 714. Thus the tape can now be withdrawn from the right column. It is also necessary to retract the capstan plate 800 into the position shown in Fig. 28. This is done by means of the circuit from the power supply through the relay point 574*d* now closed, to the capstan relay coil 857. Energization of the capstan relay 857 completes a circuit from the power supply, through points 857*a*, to energize the capstan solenoid coil 814, thus raising the capstan plate. At this time the tape will also be pulled from the left-hand column.

As the tape is being taken out of the columns by means of the take-up mechanisms, the tape will be pulled from the right-hand column first and when it leaves this column its right lower vacuum switch RLV will be opened, thus deenergizing the relay coil 868. As the take-up continues to operate, the tape will be pulled from the left-hand vacuum column, and when the tape is entirely out of the left-hand column, the left lower vacuum switch point LLV2 will close. At the time the slow take-up solenoid 792 was energized, the contact 160 shown in Fig. 14 will be transferred. This will complete a circuit from the power supply through the now closed relay points 574*c* (Fig. 29*p*), through the take-up solenoid switch 160 which was transferred mechanically, to the lower left vacuum point 2 (LLV2), through relay point 868*b* which is closed, to energize relay coils 859 and 860. These coils remain energized through the relay point 859*c* via relay point 574*b* to the power source. The energization of coil 860 opens the circuit for the coil 869 via 860*b* points, thus deenergizing the slow take-up solenoid coil 792. At this point the machine will start its high-speed rewind.

A circuit is completed through point 859*d* just closed, through point 590*a*, through the resistor 863 and from there to the rewind clutch coil 725. Thus, the left-hand reel 700 in Fig. 11 will now rotate in a counterclockwise direction pulling tape from the reel 701 back to its original reel. The brake of reel 701 has been deenergized due to the fact that relay point 576*d* has been opened. The high-speed rewind will end when the machine reel follower arm 820 (Fig. 11) sinks low enough in the machine reel 701 to close its contacts MRS (Fig. 14). When the machine reel switch MRS is closed, a circuit is completed from the power supply through the relay point 860*c* (Fig. 29*p*), through the MRS switch to energize relay coil 590. Relay coil 590 will maintain itself through its points 590*b*, through points 860*c* and back to the power source. Relay coil 592 will also pick up at this time by means of the relay 590, through relay 594*c* (Fig. 29*m*) which is energized since this is the run relay, back to the coil of relay 592, thus energizing it. Energization of the relay 590 allows a circuit to be completed from the power supply through the relay points 859*d*, through the relay point 590*a* now transferred, through the resistor 864, through right reel release button 867, to the brake coil 714, thus causing the rewind reel 700 to stop.

Upon the energization of the end rewind relay 592, a circuit is completed from one side of the power supply through the points 592*a* (Fig. 29*n*) to energize a time delay motor 870. The rewinding operation is ended when relay coils 590 and 592 are energized. Reload and other tape operations are, however, delayed until the tape reels have had a chance to come to a complete stop since the stop is not instantaneous. The time delay motor 870 provides a delay between the time the end of rewind is sensed and further operations, such as loading tape, are performed. At this time, the timing motor switch 870*a* (Fig. 29*p*) opens. Thus, the circuit from the power supply through the thread handle switch 572, through the relay points 855*b*, through the timing motor switch 870*a* to relay point 876*b*, which maintains the relay coils 574 and 576 in the energized state, is broken by opening of the timing motor switch 870*a*. Deenergization of the relay coils 574 and 576 forces the deenergization of relay coils 859 and 860 which have been maintained via points 859*c* and through the points 574*b* which have just opened. The capstan relay 857 is deenergized since points 574*b* are now open. Thus, the capstan plate 800 will be allowed to assume its normal position.

Upon the initiation of the rewind just completed, relay 859 was energized and maintained itself through to the end of the rewind operation. When relay 859 was energized during the rewind, it completed its circuit from the power supply, through the thread handle switch 572, through the relay point 859*a* to energize relay coil 566. Relay coil 566 maintains itself energized after 589*a* is deenergized by means of its points 566*a*, the lower left vacuum switch LLV, through the 855*d* point, through the thread handle switch 572, to the power supply. Thus the machine remembers by means of relay coil 566 to reload itself, making it unnecessary to depress the load switch at the end of every rewind operation.

Heretofore there has been described a manual depression of the reload switch 858 which is effective to initiate certain operations including the feeding of the tape into the tape columns and related operations for initiating a sorting pass. Energization of the relay 566 results in the same reloading conditions as manual depression of the reload switch 858. Consequently the same operation now follows that followed the manual depression of that switch. It can be assumed at this point, therefore, that the tape drives are now operating to drive the tapes through the second pass of the first sorting operation. This drive will continue until once again the tape mark is sensed at the end of the tape.

As we have seen, when the rewind following the first pass of the tape during the first sort was initiated, relay points 552*d* (Fig. 29*m*) were closed, whereas relay points 556*d* were open. This resulted in the closure and operation of the rewind circuits of tape drive #1. At the end of the second pass it is required, however, to rewind both tapes, i. e. the tape in tape drive #1, and also the tape in tape drive #2. Consequently, at this point relay points 552*d* and 556*d* (Fig. 29*m*) will be closed when the tape mark is sensed. This comes about in the following fashion and results in the following operation of the tape drive mechanisms #1 and #2.

Upon completion of the first rewind, the trigger 162 (Fig. 29*f*) was operated by contact 288*c*. The operation of the trigger 162 emits a pulse at its output pin and operates the trigger 164. Thus at the end of the first rewind operation, trigger 164 received one impulse and remembers this as a count of one. Actuation of the trigger 164 operates the inverter 168 which in turn energizes the relay 186. The circuit, therefore, is now completed from the power source to the commutator 188*a*, through the commutator brush 180*b*, via segment 188*c* to the contact 186*c*, and through the 186*d* side and back to inverter 548 (Fig. 29*m*). This inverter operates relay coil 554. Previously relay coil 556 had been energized, and so at the end of the first rewind, relay point 556*d* was opened and prevented the rewind of tape #2. However, upon completion of the first rewind, relay 566 is no longer energized but relay 554 is energized.

Upon the reception of a tape mark from tape in tape drive #1 on the second pass, the rewind instructions to the drives will be identical, as previously described, with the addition that since relay point 556*d* is closed, both tape drives #1 and #2 will be rewound. As previously described, a circuit from 572*b* (Fig. 29*p*) furnishes power to relay points 288*a*, to relay points 552*d* (Fig. 29*m*) and from there back to Fig. 29*p*, where the relay coils 574 and 576 were energized, to initiate rewind of tape drive #1.

Tape drive #2 is identical in every respect. The circuit is completed from the voltage source, through 584 to points 288*b* (Fig. 29*m*), through the relay points 556*d*, and back to energize relay coils 586 and 588 (Fig. 29*r*). The relays 586 and 588 are to tape drive #2 as relay coils 574 and 576 are to tape drive #1, in both cases initiating rewind of their respective drives.

During the rewind following the second pass of the first sort, there is an option to either retain the source material on the file reel 700 or to erase these records so that the file reel may be used during further sorting operations. It has been mentioned heretofore that if the plugboard is wired to remove the file reel at the end of the first complete pass, the drive #1 will stop at the end of the rewind following the second half pass of the first bit sort so that the file reel may be removed. If the plugboard is not so wired, then the second bit sort starts automatically and in the process the master information is destroyed.

Here I shall first point out the operation of the tape drive control circuit when the plugboard is wired to remove the file reel, and thereafter I shall point out the operation of the tape drive controls, if such wiring is omitted and it is intended to erase the record on the file reel.

If the control panel is wired to save the file reel, i. e. source material, upon completion of the entire first pass, relay coil 552 (Fig. 29*m*) is energized as previously explained, therefore, completing a circuit from one side of the power source to "remove file reel" control panel hubs 614, to and through relay points 552*a*, to and through relay point 580*a*, to energize relay coil 582. Upon energization of relay coil 582, relay point 582*c* is transferred, thus interrupting the hold circuit for the start relay 594. When the relay 594 is deenergized, the machine will stop.

When relay point 582*b* closes, a circuit is completed from one side of the power source through the points 582*b*, through the points 598*a*, to energize the relay coil 580. When the relay coil 580 is energized, relay point 580*a* transfers and breaks the pick-up circuit for relay coil 582. Relay coil 580 remains energized until the completion of the entire sorting operation. Thus it is impossible to reenergize relay coil 582 a second time.

The file reel may now be removed by the operator, and upon completion of this operation the operator will depress the start key once again. Relay coil 596 will be energized when relay point 582*a* is closed, completing a circuit from one side of the power supply through the points 582*a* to energize the relay coil 596. Relay coil 596 will remain energized until such time as the start key is once again depressed. A circuit is completed through relay points 598*b* from one side of the power source through these relay points, through the light bulb 606 and to the other side of the power source, thus causing a light to indicate to the operator that the file reel is to be removed.

Under these conditions the data on the file reel will not be erased because the "removed file reel" circuits just described hold up further operation of the sorter which would have involved the erasure of the master tape in the next succeeding operation.

During the rewind itself, relay coil 562 in Fig. 29*m* is not energized and, as a consequence, relay 600 is deenergized. Thus, during rewind, since relay point 600*a* is open, the erase circuits from relay point 600*a* (Fig. 29*m*), to relay points 142*a* and 144*b* (Fig. 29) are inactive. Consequently, no erasure takes place during rewind. Since the "remove file reel" control was inserted in the plugboard, the machine run relay coil 594 has been deenergized by the "remove file reel" circuits. As a consequence, when the rewind operation ends and the relay coil 562 is energized, relay coil 600 cannot be energized because the circuit to the power source from relay 600 is broken at relay point 594*b*. Therefore, the machine ends rewinding, stops, and does not turn on any of the erase heads until operation is resumed by the depression of the start key.

Let it now be assumed that the "remove file reel" hubs were not wired and that the file reel is to be used during the subsequent sorting process. At the end of the rewind operations, relay coil 562 (Fig. 29*m*) will be energized. Relay coil 600 will now complete its circuits from the power supply through the relay coil 600, through the relay points 562*b*, to and through relay points 594*b* to the other side of the line. The activation of relay points 600*c* (Fig. 29*m*) transmits a signal to the trigger 404 (Fig. 29*e*). This trigger, being operated, will cause the sorter to restart the readers and writers as previously described.

The tape drive control circuits will continue to operate through the several passes of a complete sorting operation, as hereinabove described, until the sorting process is completed, at which time the sorting operation and the tape drives will be brought to a stop in the following manner.

The program level selected as being the end of the sorting operation is wired from the stop hubs of the plugboard (Fig. 56) to the stop hubs 871 from where power is transmitted to the inverter 602 (Fig. 29*m*). The inverter 602 energizes relay 598. Upon energization of relay coil 598, the relay points 598*a* interrupt the circuit that has maintained memory of having removed the file reel. The points 598*b* close and connect from the power supply through points 598*b* to light bulb 606 and to the other side of the source of power, signalling to the operator that the sort is completed. The machine is stopped by the opening of relay points 598*c* which interrupts the hold circuit of the run relay 594, which deenergizes and the sorter comes to a stop.

The relay coil 562, mentioned in the preceding paragraphs, acts as an interlock to prevent tapes from rewinding as long as an erase head is on in either drive. Thus, in order to pick up relay coil 288 through the thyratron 560, as previously mentioned, it is necessary first to transfer the points of relay 562. Relay coil 562 is energized by the connection from the power source through to relay point 570*b* (Fig. 29*n*), through relay point 568*f*, through relay point 566*f*, relay point 564*c*, to relay 562, in Fig. 29*m*. This relay, when energized, indicates to the sorter that it is ready to run in a forward direction. Thus when start relay coil 594 is energized, a circuit for relay coil 600 is completed from the power supply through relay coil 600, to relay point 562*b*, to relay point 594*b*, to the other side of the power source. As long as relay 562 is deenergized, relay coil 600 cannot be energized and the erase heads cannot be energized.

What is claimed is:

1. In a sorter for characters recorded on an input tape in random fashion by means of a code composed of a plurality of bits each of which is adapted to produce in the sorter either a first or a second functional signal and in which the data is sorted in a plurality of sorting operations corresponding in number to the bits comprising the character representing code, and in which each sorting operation consists of a first and a second pass of the input tape through its read-write station; an input tape and an output tape, a read-write station for each of said tapes, means for driving said tapes through their respective read-write stations, means for sensing the first bit of each character code during two successive passes of said input tape through its read-write station, means responsive during the first pass of said input tape to an input tape bit generated first functional signal for transferring the character codes containing such signal generating bit from said input tape to said output tape, means responsive during the second pass of said input tape to bit generated second functional signals for transferring the character codes containing such bits from said input tape to said output tape, means for rewinding said tapes following each sorting operation, means for counting the sorting operations, and means responsive to said sorting operations counting means for effecting sorting operations on each of successive bits comprising the character code.

2. In a sorter for rearranging data magnetically recorded in random sequence on record tapes by means of a multi-bit character representing code and in which each sorting operation consists of a first and a second pass of the input tape through its read-write head; a first magnetic tape and a second magnetic tape, magnetically recorded data on said first tape each character of which is represented by a multi-bit code adapted to produce in the sorter either a first or a second functional signal, a read-write head for each of said tapes, means for driving said tape through their respective read-write heads, a rewind reel for each of said tapes, means for driving said reels to rewind tape thereon, means for initiating a sorting operation, a code bit counter for maintaining a plurality of data sorting operations corresponding in number to the bits of the character representing code, means for energizing said reel driving means for rewinding said tapes following each sorting operation, means for alternately recognizing one of said tapes as the input tape and the other as the output tape, means for erasing the input tape following each sorting operation to condition it as an output tape, means responsive during the first pass of the input tape to an input tape bit generated first functional signal for transferring the character codes containing such signal generating bit from the input tape to the output tape, means responsive during the second pass of the input tape to bit generated second functional signals for transferring the character code containing such bits from the input tape to the output tape, and means responsive to said code bit counter for halting sorter operation when a sorting operation has been completed.

3. In a machine for sorting data recorded in random sequence on record tapes by means of a multi-bit character representing code and on which the data is arranged in a plurality of fields each containing a plurality of characters; a first tape and a second tape, record data to be sorted on one of said tapes, a read-write station for each of said tapes, means for driving said tapes through their respective read-write stations, a rewind reel for each of said tapes, means for driving said reels to rewind tape thereon, means for initiating and maintaining a plurality of sorting operations equal to the number of bits of the character representing code, means effective during each of said sorting operations for transferring the data from one tape to the other in a rearranged sequence, and means operative to energize said reel driving means to rewind said tapes at the end of each sorting operation.

4. In a sorter for data recorded on a tape in random fashion by means of a code composed of a pluralitv of bits each of which is adapted to produce in the sorter either a first or a second functional signal, an input tape read-write station, an output tape read-write station, an input tape and mechanism for driving the same through said input tape read-write station, an output tape and mechanism for driving the same through said output tape read-write station, means responsive to an input tape bit generated first functional signal for causing the code embracing said signal generating bit to be recorded on the output tape, means under control of said first functional signal for energizing said output tape drive mechanism, means responsive to an input tape generated control signal for reversing said input tape drive mechanism, means under control of a second input tape generated control signal for once again reversing the direction of said input tape drive mechanism, means thereafter responsive to input tape bit generated second functional signals for causing the codes embracing said signal generating bits to be recorded on the same output tape in said output tape read-write station, and means under control of the same second functional signals for energizing said output tape drive mechanism for advancing said output tape through said output tape read-write station.

5. In a machine for sorting and rearranging data recorded in random sequence on record tapes by means of a multi-bit code representative of each character and in which a complete data sort is adapted to be performed in a plurality of sorting cycles; a pair of magnetic record tapes between which the data to be sorted is transferred during each sorting cycle, a reading and writing station for each of said tapes, means for driving each of said tapes through its reading and writing station, means for sensing a bit of the code representing each character comprising the data to be sorted from one of said tapes, means under control of a bit being sensed on one of said tapes adapted to determine whether the code containing such bit is to be transferred to the other of said tapes, means for transferring character representing codes from said first named tape to said second named tape under control of said bit controlled means, means for rewinding said first named tape after transfer of character representing codes to said second named tape under control of said bit controlled means, means thereafter operative for transferring any remaining codes from said first named tape to said second named tape, means for rewinding both of said tapes following operation of said last named means, and means for sensing said tapes alternately and causing repetition of the sorting cycle on each successive bit of the character representing code until all bits thereof have been sorted.

6. In a machine for performing a sorting and rearranging cycle on data recorded in random sequence on a record tape by means of a multi-bit code, each bit of which is adapted to produce in said machine either a first or a second functional manifestation comprising; an input tape having coded data recorded thereon, an output tape, means for continuously driving said input tape through a tape reading station, means for intermittently driving said output tape through a recording station, means under control of an input tape originated first functional manifestation for causing said output tape drive to operate, means operative during said output tape drive and under control of said first functional manifestation to cause transfer to said output tape of the character representing code being read from said input tape, means for rewinding said input tape after a pass thereof through said reading station, means for reenergizing said input tape drive for driving said tape through said reading station a second time, means under control of an input tape originated second functional manifestation for causing said output tape drive to operate during the second pass of said input tape, and means operative during such output tape drive and under control of said second functional manifestation to cause transfer to said output tape of the character representing codes causing said second functional manifestation during the second pass of said input tape through said reading station.

7. In a machine adapted to sense data recorded on an input tape in the form of a multi-bit code each bit of which is adapted to produce in said machine either a first or a second functional manifestation and transfer sensed data to an output tape in a predetermined order; a first and a second tape reading station for an input tape, means for driving an input tape through said stations, a record reproducing station for an output tape, means for intermittently driving an output tape through said reproducing station, means for discriminating between input tape originated first and second functional manifestations, means under control of said discriminating means upon recognition of a tape bit generated first functional manifestation thereby effective to energize said output tape drive, said second tape reading station, and said reproducing station, and means responsive to the reading of the same bit embracing code in said second reading station to cause said reproducing station to record on an output tape therein the code in which said bit is embraced.

8. In a sorter for tape recorded data adapted to transfer recorded data from a first tape to a second tape during each of a number of sorting operations and in which each sorting operation includes two passes of the first tape through a tape reading station; a first tape and a second tape, winding means for each of said tapes, a first tape reading station and means for continuously driving said first tape therethrough, a second tape writing station and means for intermittently driving said second tape therethrough, means for transferring certain data from said first tape to said second tape during the first pass of said first tape through said reading station, means for transferring other data from said first tape to said second tape during the second pass of said first tape through said reading station, means for counting each first and second pass of said first tape through said reading station, means for initiating rewinding of each of said tapes, and means under control of said counting means for energizing the first tape rewind means only at the end of the first pass of said first tape through said reading station and both of said tape rewinding means at the end of each second pass of said first tape through said reading station.

9. In a machine adapted to sense data magnetically recorded in random order on an input tape in which each character is represented in the form of a multi-bit code, each bit of which is adapted to produce in said machine either a first or a second functional manifestation and transfer sensed data of different values to an output tape in response to said functional manifestations; a magnetic input tape and a magnetic output tape, a reading station for said input tape, tape reading means in said reading station, means for driving said input tape through said reading station, a record reproducing station for said output tape, magnetic tape recording means in said output station, means for driving said output tape through said reproducing station, means for discriminating between input tape first and second functional manifestations, means operative under control of said discriminating means upon recognition of a tape bit generated first functional manifestation to energize said magnetic tape recording means effectively to record on said output tape a sequence of records having different values, and means operative under control of said discriminating means upon recognition of a tape bit generated second functional manifestation to suppress the operation of said magnetic tape recording means and thereby avoid the recording of a different sequence of records on said output tape.

10. In a machine adapted to sense data magnetically recorded in random order on an input tape in which each character is represented in the form of a multi-bit code, each bit of which is adapted to produce in said machine either a first or a second functional manifestation and transfer sensed data of different values to an output tape in response to said functional manifestations; a magnetic input tape and a magnetic output tape, a reading station for said input tape, tape reading means in said reading station, means for driving said input tape through said reading station, a record reproducing station for said output tape, magnetic tape recording means and said output station, means for driving said output tape through said reproducing station, means for discriminating between input tape first and second functional manifestations, means operative under control of said discriminating means upon recognition of a tape bit generated first functional manifestation to energize said magnetic tape recording means effectively to record on said output tape a sequence of records having different values, means operative under control of said discriminating means upon recognition of a tape bit generated second functional manifestation to suppress the operation of said magnetic tape recording means and thereby avoid the recording of a different sequence of records on said output tape, and means for selectively determining the length of the character field on which the sorting operation is to be performed.

11. In a machine adapted to sense data magnetically recorded in random order on an input tape in which each character is represented in the form of a multi-bit code, each bit of which is adapted to produce in said machine either a first or a second functional manifestation and transfer sensed data of different values to an output tape in response to said functional manifestations; a magnetic input tape and a magnetic output tape, a reading station for said input tape, tape reading means in said reading station, means for driving said input tape through said reading station, a record reproducing station for said output tape, magnetic tape recording means in said output station, means for driving said output tape through said reproducing station, means for discriminating between input tape first and second functional manifestations, means operative under control of said discriminating means upon recognition of a tape bit generated first functional manifestation to energize said magnetic tape recording means effectively to record on said output tape a sequence of records having different values, means operative under control of said discriminating means upon recognition of a tape bit generated second functional manifestation to suppress the operation of said magnetic tape recording means and thereby avoid the recording of a different sequence of records on said output tape, and means for selecting the character in a field of characters on which the sorting operation is to be initiated.

12. In a machine adapted to sense data magnetically recorded in random order on an input tape in which each character is represented in the form of a multi-bit code, each bit of which is adapted to produce in said machine either a first or a second functional manifestation and transfer sensed data of different values to an output tape in response to said functional manifestations; a magnetic input tape and a magnetic output tape, a reading station for said input tape, tape reading means in said reading station, means for driving said input tape through said reading station, a record reproducing station for said output tape, magnetic tape recording means in said output station, means for driving said output tape through said reproducing station, means for discriminating between input tape first and second functional manifestations, means operative under control of said discriminating means upon recognition of a tape bit generated first functional manifestation to energize said magnetic tape recording means effectively to record on said output tape a sequence of records having different values, means operative under control of said discriminating means upon recognition of a tape bit generated second functional manifestation to suppress the operation of said magnetic tape recording means and thereby avoid the recording of a different sequence of records on said output tape, and means for programming the operation of said sorter to sort a plurality of data fields in preselected sequence.

13. In a machine adapted to sense data magnetically recorded in random order on an input tape in which each character is represented in the form of a multi-bit code, each bit of which is adapted to produce in said machine either a first or a second functional manifestation and transfer sensed data of different values to an output tape in response to said functional manifestations; a magnetic input tape and a magnetic output tape, a reading station for said input tape, tape reading means in said reading station, means for driving said input tape through said reading station, a record reproducing station for said output tape, magnetic tape recording means in said output station, means for driving said output tape through said reproducing station, means for discriminating between input tape first and second functional manifestations, means operative under control of said discriminating means upon recognition of a tape bit generated first functional manifestation to energize said magnetic tape recording means effectively to record on said output tape a sequence of records having different values, means operative under control of said discriminating means upon recognition of a tape bit generated second functional manifestation to suppress the operation of said magnetic tape recording means and thereby avoid the recording of a different sequence of records on said output tape, and means for conditioning said sorter for sorting either alphabetic or numeric data.

14. In a machine adapted to sense data magnetically recorded in random order on an input tape in which each character is represented in the form of a multi-bit code, each bit of which is adapted to produce in said machine either a first or a second functional manifestation and transfer sensed data of different values to an output tape in response to said functional manifestations; a magnetic input tape and a magnetic output tape, a reading station for said input tape, tape reading means in said reading station, means for driving said input tape through said reading station, a record reproducing station for said output tape, magnetic tape recording means in said output station, means for driving said output tape through said reproducing station, means for discriminating between input tape first and second functional manifestations, means operative under control of said discriminating means upon recognition of a tape bit generated first functional manifestation to energize said magnetic tape recording means effectively to record on said output tape a sequence of records having different values, means operative under control of said discriminating means upon recognition of a tape bit generated second functional manifestation to suppress the operation of said magnetic tape recording means and thereby avoid the recording of a different sequence of records on said output tape, and means for conditioning said sorter for sorting data into either ascending or descending order.

15. In a machine adapted to sense data magnetically recorded in random order on an input tape in which each character is represented in the form of a multibit code, each bit of which is adapted to produce in said machine either a first or a second functional manifestation and transfer sensed data of different values to an output tape in response to said functional manifestations; a magnetic input tape and a magnetic output tape, a reading station for said input tape, tape reading means in said reading station, means for driving said input tape through said reading station, a record reproducing station for said output tape, magnetic tape recording means in said output station, means for driving said output tape through said reproducing station, means for discriminating between input tape first and second functional manifestations, means operative under control of said discriminating means upon recognition of a tape bit generated first functional manifestation to energize said magnetic tape recording means effectively to record on said output tape a sequence of records having different values, means operative under control of said discriminating means upon recognition of a tape bit generated second functional manifestation to suppress the operation of said magnetic tape recording means and thereby avoid the recording of a different sequence of records on said output tape, and operator settable means adapted to halt operation of the sorter following the first sorting operation to permit removal of the input tape and the substitution of a blank tape.

References Cited in the file of this patent

UNITED STATES PATENTS

| | | |
|---|---|---|
| 2,563,545 | Moreland | Aug. 7, 1951 |
| 2,609,457 | Thurm | Sept. 2, 1952 |
| 2,617,704 | Mallina | Nov. 11, 1952 |
| 2,703,714 | Demby | Mar. 8, 1955 |

OTHER REFERENCES

National Bureau of Standards Report, No. 1519, available in 235–61.3 publication.